United States Patent
Pourreza et al.

(10) Patent No.: US 11,638,025 B2
(45) Date of Patent: Apr. 25, 2023

(54) MULTI-SCALE OPTICAL FLOW FOR LEARNED VIDEO COMPRESSION

(71) Applicant: QUALCOMM Incorporated, San Diego, CA (US)

(72) Inventors: Reza Pourreza, San Diego, CA (US); Amir Said, San Diego, CA (US); Yang Yang, San Diego, CA (US); Yinhao Zhu, La Jolla, CA (US); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/207,244

(22) Filed: Mar. 19, 2021

(65) Prior Publication Data
US 2022/0303568 A1    Sep. 22, 2022

(51) Int. Cl.
*H04N 19/51* (2014.01)
*H04N 19/172* (2014.01)
(Continued)

(52) U.S. Cl.
CPC .............. *H04N 19/51* (2014.11); *G06N 3/08* (2013.01); *H04N 19/107* (2014.11);
(Continued)

(58) Field of Classification Search
CPC .... H04N 19/51; H04N 19/107; H04N 19/137; H04N 19/172; H04N 19/593; G06N 3/08
See application file for complete search history.

(56) References Cited

U.S. PATENT DOCUMENTS

| 5,177,608 A | * | 1/1993 | Ohki | H04N 19/61 348/420.1 |
| 10,699,129 B1 | * | 6/2020 | Jiang | G06N 3/0445 |

(Continued)

FOREIGN PATENT DOCUMENTS

WO    2014120374 A1    8/2014

OTHER PUBLICATIONS

International Search Report and Written Opinion—PCT/US2022/017062—ISA/EPO—dated May 25, 2022.
(Continued)

*Primary Examiner* — Zaihan Jiang
(74) *Attorney, Agent, or Firm* — Polsinelli LLP

(57) ABSTRACT

Systems and techniques are described for encoding and/or decoding data based on motion estimation that applies variable-scale warping. An encoding device can receive an input frame and a reference frame that depict a scene at different times. The encoding device can generate an optical flow identifying movements in the scene between the two frames. The encoding device can generate a weight map identifying how finely or coarsely the reference frame can be warped for input frame prediction. The encoding device can generate encoded video data based on the optical flow and the weight map. A decoding device can generate a reconstructed optical flow and a reconstructed weight map from the encoded data. A decoding device can generate a prediction frame by warping the reference frame based on the reconstructed optical flow and the reconstructed weight map. The decoding device can generate a reconstructed input frame based on the prediction frame.

30 Claims, 17 Drawing Sheets

(51) Int. Cl.
*H04N 19/137* (2014.01)
*H04N 19/107* (2014.01)
*H04N 19/593* (2014.01)
*G06N 3/08* (2006.01)

(52) U.S. Cl.
CPC ......... *H04N 19/137* (2014.11); *H04N 19/172* (2014.11); *H04N 19/593* (2014.11)

(56) References Cited

U.S. PATENT DOCUMENTS

| | | | | |
|---|---|---|---|---|
| 2008/0225946 | A1* | 9/2008 | Yin | H04N 19/895 375/E7.246 |
| 2010/0246680 | A1* | 9/2010 | Tian | H04N 19/23 375/E7.123 |
| 2013/0176445 | A1* | 7/2013 | Streeter | H04N 5/23254 348/208.1 |
| 2014/0269903 | A1* | 9/2014 | McCarthy | H04N 19/176 375/240.03 |
| 2020/0036995 | A1* | 1/2020 | Rippel | G06V 10/774 |
| 2020/0154145 | A1* | 5/2020 | Du | G06V 10/765 |
| 2020/0265567 | A1 | 8/2020 | Hu et al. | |
| 2021/0051339 | A1* | 2/2021 | Liu | H04N 19/521 |
| 2021/0067776 | A1* | 3/2021 | Reuze | H04N 19/139 |
| 2021/0097715 | A1* | 4/2021 | Li | G06T 15/205 |
| 2021/0227250 | A1* | 7/2021 | Liu | H04N 19/105 |
| 2021/0352326 | A1* | 11/2021 | Lim | H04N 19/176 |
| 2021/0377525 | A1* | 12/2021 | Lim | H04N 19/119 |

OTHER PUBLICATIONS

Lu G., et al., "DVC: An End-To-End Deep Video Compression Framework", 2019 IEEE/CVF Conference on Computer Vision and Pattern Recognition (CVPR), IEEE, Jun. 15, 2019, XP033686979, pp. 10998-11007, DOI: 10.1109/CVPR.2019.01126 [retrieved on Jan. 8, 2020], Abstract, Section 2.3, subsection "Introduction of Notations" in Section 3, Sections 3.2-3.4, Figures 2-4, the whole document.

Ma S., et al., "Image and Video Compression with Neural Networks: A Review", Arxiv.org, IEEE Transactions on Circuits and Systems for Video Technology, Cornell University Library, 201 OLIN Library Cornell University Ithaca, NY, 14853, Apr. 10, 2019, XP081165996, pp. 1-16, abstract.

Wang S.S., et al., "Deep Neural Networks in Image and Video Compression", 130. MPEG Meeting, Apr. 20, 2020-Apr. 24, 2020, Alpbach, (Motion Picture Expert Group or ISO/IEC JTC1/SC29/WG11), No. m53700, Apr. 10, 2020 (Apr. 10, 2020), XP030287403, 11 Pages, the whole document.

* cited by examiner

MULTI-SCALE OPTICAL FLOW FOR LEARNED VIDEO COMPRESSION

FIELD

This application is related to data processing. More specifically, this application relates to technologies and techniques for using multi-scale optical flow for learned video compression.

BACKGROUND

Data compression is the process of encoding information for data using fewer bits than an original representation of the data. Lossless data compression compresses data without losing any information from the original data file in the compression process, for instance by removing redundancies. Lossy data compression techniques can sometimes compress data more than lossless data compression techniques, but lossy data compression techniques lose some information from the original data file. A device that performs data compression is referred to as an encoder. A device that reverses the data compression process (decompression) to recreate data from the original data file as closely as possible is referred to as a decoder.

Video compression can compress a video based on intra-frame coding, inter-frame coding, or both. Intra-frame coding compresses individual video frames using still image compression techniques. Inter-frame coding compresses the video based on which areas in a video frame change, and which areas remain unchanged, relative to a previous video frame. Motion estimation is an inter-frame coding technique that can reduce redundancy in storing a portion of video data that appears in multiple frames, but whose position changes between frames. Motion estimation can determine a direction and/or a distance that a portion of a scene moves from one video frame to the next video frame. However, traditional motion estimation techniques can be inaccurate in scenes with uncertainty in motion estimation, such as scenes with occlusions or scenes in which fine details move (e.g., billowing smoke). Encoding videos of such scenes typically involves storing both complex motion estimates and complex residuals, since the motion estimates end up being inaccurate. This complexity can be expensive to store. Thus, traditional motion estimation techniques can be inefficient for compressing videos of scenes with uncertainty in motion estimation.

SUMMARY

Systems and techniques are described herein for data encoding and/or decoding based on multi-scale optical flow. For example, in multi-scale optical flow, an encoding device can apply warping to a reference frame at a variable scale depending on the uncertainty in optical flow estimation. In some examples, the encoding device can receive video data that includes an input frame and a reference frame. For instance, the input frame depicts a scene at a first time, while the reference frame depicts the scene at a second time. The encoding device can generate an optical flow based on the input frame and the reference frame. The optical flow identifies how different areas of the scene move between the reference frame and the input frame. In some aspects, the encoding device can generate the optical flow using a trained neural network. The encoding device can generate a weight map based on the input frame and the reference frame. The weight map can identify a fineness or coarseness of scale at which the reference image is to be warped to estimate the input image. In some aspects, the encoding device can generate the optical flow using a trained neural network. The encoding device can generate encoded video data at least by encoding the video data based on the optical flow and the weight map. A decoding device can receive the encoded video. The decoding device can generate, from the encoded video, a reconstructed optical flow. The reconstructed optical flow can be a reconstructed version of the optical flow generated by the encoding device. The decoding device can generate, from the encoded video, a reconstructed weight map. The reconstructed weight map can be a reconstructed version of the weight map generated by the encoding device. The decoding device can generate a prediction frame, for instance by warping the reference frame (or a reconstruction of the reference frame) based on the reconstructed optical flow and the reconstructed weight map. The decoding device can generate a reconstructed input frame based on the prediction frame, and in some examples based on a reconstructed residual. The reconstructed input frame can be a reconstructed version of the input frame received by the encoding device.

In one example, an apparatus for data encoding is provided. The apparatus includes a memory and one or more processors (e.g., implemented in circuitry) coupled to the memory. The one or more processors are configured to and can: receive video data including an input frame that depicts a scene at a first time and a reference frame that depicts the scene at a second time; generate an optical flow based on the input frame and the reference frame, the optical flow identifying one or more movements in one or more areas of the scene between the reference frame and the input frame; generate a weight map based on the reference frame and the input frame; and generate encoded video data at least in part by encoding the video data based on the optical flow and the weight map.

In another example, a method of data encoding is provided. The method includes receiving video data including an input frame that depicts a scene at a first time and a reference frame that depicts the scene at a second time. The method includes generating an optical flow based on the input frame and the reference frame, the optical flow identifying one or more movements in one or more areas of the scene between the reference frame and the input frame. The method includes generating a weight map based on the reference frame and the input frame. The method includes generating encoded video data at least in part by encoding the video data based on the optical flow and the weight map.

In another example, a non-transitory computer-readable medium is provided that has stored thereon instructions that, when executed by one or more processors, cause the one or more processors to: receive video data including an input frame that depicts a scene at a first time and a reference frame that depicts the scene at a second time; generate an optical flow based on the input frame and the reference frame, the optical flow identifying one or more movements in one or more areas of the scene between the reference frame and the input frame; generate a weight map based on the reference frame and the input frame; and generate encoded video data at least in part by encoding the video data based on the optical flow and the weight map.

In another example, an apparatus for data encoding is provided. The apparatus includes means for receiving video data including an input frame that depicts a scene at a first time and a reference frame that depicts the scene at a second time. The apparatus includes means for generating an optical flow based on the input frame and the reference frame, the optical flow identifying one or more movements in one or more areas of the scene between the reference frame and the input frame. The apparatus includes means for generating a weight map based on the reference frame and the input frame. The apparatus includes means for generating encoded video data at least in part by encoding the video data based on the optical flow and the weight map.

In one example, an apparatus for data decoding is provided. The apparatus includes a memory and one or more processors (e.g., implemented in circuitry) coupled to the memory. The one or more processors are configured to and can: receive encoded video data; generate, from the encoded video data, a reconstructed optical flow identifying one or more movements in one or more areas of a scene between a reference frame and an input frame, the reference frame and the input frame depicting the scene at different times; generate, from the encoded video data, a reconstructed weight map; generate a prediction frame at least in part by warping the reference frame based on the reconstructed optical flow and the reconstructed weight map; and generate, based on the prediction frame, a reconstructed input frame that is based on the input frame.

In another example, a method of data decoding is provided. The method includes receiving encoded video data. The method includes generating, from the encoded video data, a reconstructed optical flow identifying one or more movements in one or more areas of a scene between a reference frame and an input frame, the reference frame and the input frame depicting the scene at different times. The method includes generating, from the encoded video data, a reconstructed weight map. The method includes generating a prediction frame at least in part by warping the reference frame based on the reconstructed optical flow and the reconstructed weight map. The method includes generating, based on the prediction frame, a reconstructed input frame that is based on the input frame.

In another example, a non-transitory computer-readable medium is provided that has stored thereon instructions that, when executed by one or more processors, cause the one or more processors to: receive encoded video data; generate, from the encoded video data, a reconstructed optical flow identifying one or more movements in one or more areas of a scene between a reference frame and an input frame, the reference frame and the input frame depicting the scene at different times; generate, from the encoded video data, a reconstructed weight map; generate a prediction frame at least in part by warping the reference frame based on the reconstructed optical flow and the reconstructed weight map; and generate, based on the prediction frame, a reconstructed input frame that is based on the input frame.

In another example, an apparatus for data decoding is provided. The apparatus includes means for generating, from the encoded video data, a reconstructed optical flow identifying one or more movements in one or more areas of a scene between a reference frame and an input frame, the reference frame and the input frame depicting the scene at different times. The apparatus includes means for generating, from the encoded video data, a reconstructed weight map. The apparatus includes means for generating a prediction frame at least in part by warping the reference frame based on the reconstructed optical flow and the reconstructed weight map. The apparatus includes means for generating, based on the prediction frame, a reconstructed input frame that is based on the input frame.

In some aspects, the first time is after the second time. In some aspects, the reference frame is encoded as an intra-coded frame in the encoded video data, wherein the input frame is encoded as an inter-coded frame in the encoded video data.

In some aspects, the methods, apparatuses, and computer-readable medium described above further comprise: generating a prediction frame at least in part by warping the reference frame based on the optical flow and the weight map; and generating a residual based on a difference between the input frame and the prediction frame, wherein encoding the video data based on the optical flow and the weight map includes encoding the video data based on the residual. In some aspects, warping the reference frame based on the optical flow and the weight map includes warping the reference frame using one or more trained neural networks based on the optical flow and the weight map. In some aspects, warping the reference frame based on the optical flow and the weight map includes: generating at least a first differentially indexed weight map and a second differentially indexed weight map based on the weight map; generating a first warped frame at least in part by warping the reference frame based on the optical flow; generating a second warped frame at least in part by warping a downscaled variant of the reference frame based on a downscaled variant of the optical flow; determining a first product of the first warped frame and the first differentially indexed weight map; determining a second product of the second warped frame and the second differentially indexed weight map; and determining a sum of the first product and an upscaled variant of the second product.

In some aspects, the methods, apparatuses, and computer-readable medium described above further comprise: generating a reconstructed optical flow based on the optical flow; generating a reconstructed weight map based on the weight map; generating a prediction frame at least in part by warping the reference frame based on the reconstructed optical flow and the reconstructed weight map; and generating a residual based on a difference between the input frame and the prediction frame, wherein encoding the video data based on the optical flow and the weight map includes encoding the video data based on the residual. In some aspects, generating the reconstructed optical flow based on the optical flow includes generating the reconstructed optical flow based on the optical flow using an autoencoder. In some aspects, warping the reference frame based on the reconstructed optical flow and the reconstructed weight map includes warping the reference frame using one or more trained neural networks based on the reconstructed optical flow and the reconstructed weight map. In some aspects, warping the reference frame based on the reconstructed optical flow and the reconstructed weight map includes: generating at least a first differentially indexed weight map and a second differentially indexed weight map based on the reconstructed weight map; generating a first warped frame at least in part by warping the reference frame based on the optical flow; generating a second warped frame at least in part by warping a downscaled variant of the reference frame based on a downscaled variant of the reconstructed optical flow; determining a first product of the first warped frame and the first differentially indexed weight map; determining a second product of the second warped frame and the second differentially indexed weight map; and determining a sum of the first product and an upscaled variant of the second product.

In some aspects, the weight map includes values greater than a threshold for a first region of the reference frame, wherein the weight map includes values less than a threshold for a second region of the reference frame, wherein the encoded video data includes data corresponding to the first region encoded at a fine level of detail, and wherein the encoded video data includes data corresponding to the second region encoded at a coarse level of detail.

In some aspects, the optical flow is a two-dimensional optical flow, and the one or more movements are along a plane having two perpendicular dimensions. In some aspects, the optical flow identifies a direction of movement and an amplitude of movement for each pixel of the input frame. In some aspects, the optical flow is identified using an optical flow image, wherein the direction of movement is identified based on a hue in the optical flow image, and wherein the amplitude of movement is identified based on a saturation in the optical flow image.

In some aspects, generating the optical flow based on the input frame and the reference frame includes generating the optical flow using one or more trained neural networks based on the input frame and the reference frame. In some aspects, generating the weight map based on the reference frame and the input frame includes generating the weight map using one or more trained neural networks based on the reference frame and the input frame.

In some aspects, the encoded video data is decodable using a decoder compliant with one or more video decoder standards. In some aspects, encoding the video data based on the optical flow and the weight map includes compressing the video data based on the optical flow and the weight map.

In some aspects, the apparatuses described above include a camera, and the video data is captured by the camera.

In some aspects, the methods, apparatuses, and computer-readable medium described above further comprise: generating, from the encoded video data, a reconstructed residual that is based on a residual, wherein generating the reconstructed input frame includes generating the reconstructed input frame based on the prediction frame and the reconstructed residual. In some aspects, the residual is based on a difference between the input frame and the prediction frame. In some aspects, the residual based on a difference between the input frame and a second prediction frame, wherein the second prediction frame is a variant of the reference frame that is warped based on an optical flow and a weight map, the optical flow and the weight map having been generated based on the reference frame and the input frame.

In some aspects, warping the reference frame based on the reconstructed optical flow and the reconstructed weight map includes: generating at least a first differentially indexed weight map and a second differentially indexed weight map based on the reconstructed weight map; generating a first warped frame at least in part by warping the reference frame based on the reconstructed optical flow; generating a second warped frame at least in part by warping a downscaled variant of the reference frame based on a downscaled variant of the reconstructed optical flow; determining a first product of the first warped frame and the first differentially indexed weight map; determining a second product of the second warped frame and the second differentially indexed weight map; and determining a sum of the first product and an upscaled variant of the second product.

In some aspects, warping the reference frame based on the reconstructed optical flow and the reconstructed weight map includes warping the reference frame using one or more trained neural networks based on the reconstructed optical flow and the reconstructed weight map. In some aspects, generating the reconstructed optical flow from the encoded video data includes generating the reconstructed optical flow from the encoded video data using one or more trained neural networks. In some aspects, generating the reconstructed weight map from the encoded video data includes generating the reconstructed weight map from the encoded video data using one or more trained neural networks.

In some aspects, the apparatus comprises a camera, a mobile device, a mobile telephone, a smart phone, a mobile handset, a portable gaming device, a wireless communication device, a smart watch, a wearable device, a head-mounted display (HMD), an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image. In some aspects, the apparatus further includes a display for displaying the image, one or more notifications (e.g., associated with processing of the image), and/or other displayable data. In some aspects, the display displays the image after the one or more processors process the image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
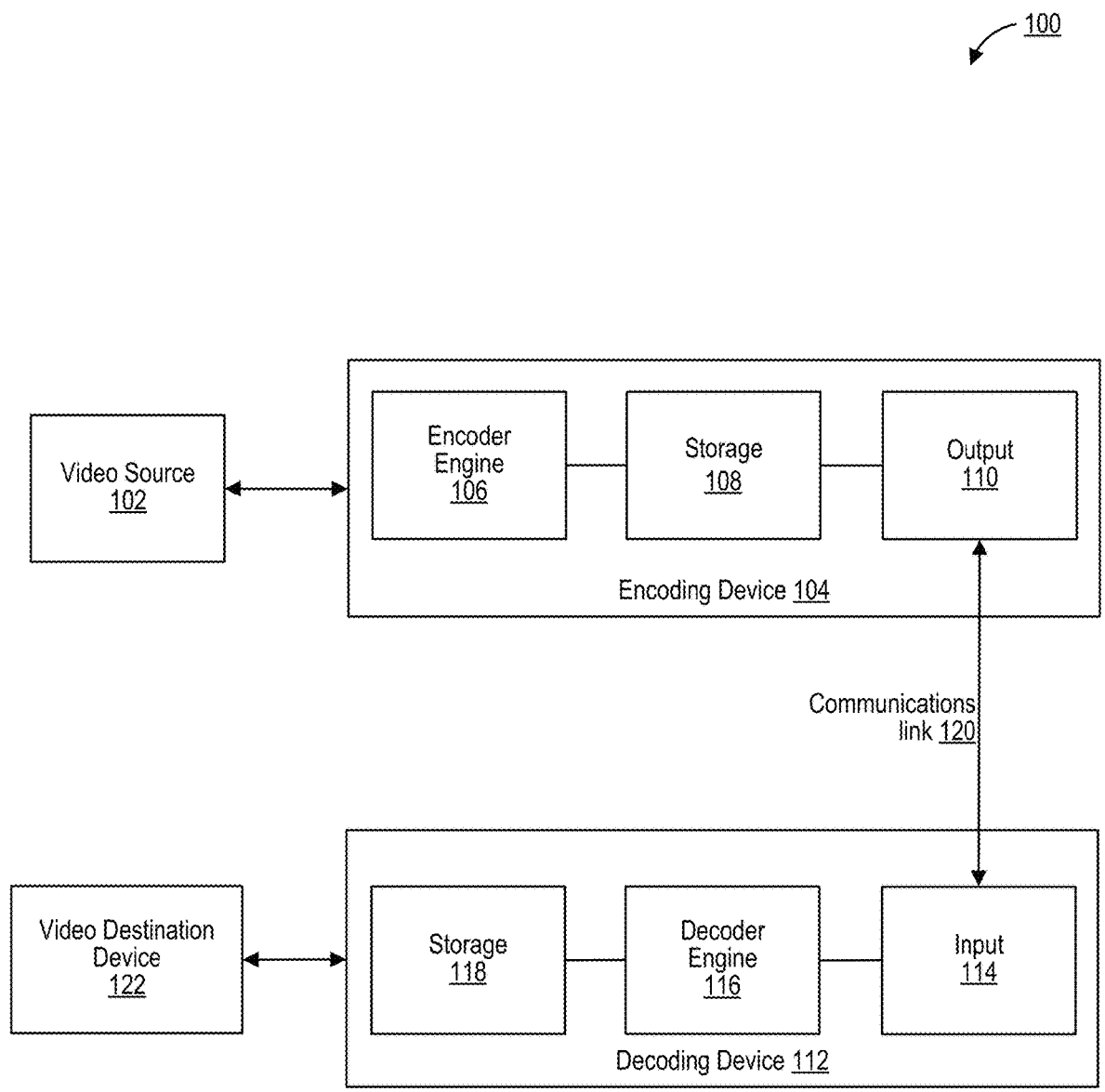
FIG. 1 is a block diagram illustrating an example of a system including an encoding device and a decoding device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and directs the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position. A video may refer to a sequence of consecutive images, which may be referred to as "video frames." Displaying a video refers to displaying the video frames of the video sequentially. A video may depict one or more objects in motion.

Data compression is the process of encoding information for data using fewer bits than an original representation of the data. Lossless data compression compresses data without losing any information from the original data file in the compression process, for instance by removing redundancies. Lossy data compression techniques can sometimes compress data more than lossless data compression techniques. However, lossy data compression techniques lose some information from the original data file, such as information that a data compression algorithm deems to be less necessary or important. A device that performs data compression is referred to as an encoder. A device that reverses the data compression process (decompression) to recreate data from the original data file as closely as possible is referred to as a decoder.

Video compression can compress a video based on intra-frame coding, inter-frame coding, or both. Intra-frame coding, also known as spatial compression, refers to compressing individual video frames of the video using still image compression techniques. Inter-frame coding, also known as temporal compression, refers to compressing the video based on image data in multiple video frames of the video. For instance inter-frame coding can be used to identify which areas in a video frame change, and which areas remain unchanged, relative to a reference video frame (e.g., a previous video frame).

Motion estimation is an inter-frame coding technique that can reduce redundant storage of image data that matches between video frames, but that also moves between video frames. Motion estimation can determine a motion vector with a direction and/or a distance that a particular portion of a scene moves from a first video frame to second video frame. Optical flow is a form of motion estimation that provides motion vectors (with directions and/or distances) describing how a particular pixel moves from the first video frame to the second video frame. Traditional optical flow techniques can be referred to as two-dimensional (2D) optical flow, since these motion vectors provide directions and/or distances along a 2D planar surface corresponding to the surface of the first video frame and the second video frame. Dense optical flow provides motion vectors for every pixel of the video frames. Sparse optical flow provides motion vectors for a subset of the pixels of the video frames, such as pixels representing visual features in the scene (e.g., corners, edges, ridges, and/or blobs). Encoders and/or decoders can warp a first frame into a prediction frame predicting a second frame based on use optical flows between the two frames. A residual can identify a difference, or error, between the prediction frame and the second frame.

However, traditional optical flow techniques can be inaccurate in scenes that produce uncertainty in optical flow estimation. For example, optical flow estimation can be inaccurate for scenes depicting occlusions occluding parts of the scene that are in motion and/or for scenes in which fine details move (e.g., billowing smoke, explosions, flames, fireworks, liquids, confetti, dust, rain, bubbles, bokeh effects, particle effects, or combinations thereof). Encoding videos of scenes with uncertainty in optical flow estimation can involve generating and storing complex optical flows. Such complex optical flows can be computationally expensive to generate, can be memory-intensive to store, can end up being inaccurate, are expensive to transmit (e.g., have a high bandwidth cost), or a combination thereof. Because of the inaccuracy in the optical flows, encoding videos of scenes with uncertainty in optical flow can also involve generating and storing complex residuals. The complex residuals can also be memory-intensive to store and transmit. Encoded video data may thus end up including both memory-intensive complex optical flows and memory-intensive complex residuals. Thus, traditional optical flow techniques can be inefficient for compressing videos of scenes with uncertainty in motion estimation.

Systems and techniques are described herein for performing data encoding based on multi-scale optical flow. In multi-scale optical flow, an encoding device receives an input frame and a reference frame and generates both an optical flow and a weight map based on the input frame and the reference frame. As with 2D optical flow, the multi-scale optical flow can identify motion vectors (with directions and/or distances) describing how a particular pixel moves from the reference video frame to the input video frame. The encoding device can warp the reference frame based on the optical flow and the weight map to generate a prediction frame that predicts the input image.

Figure 5:
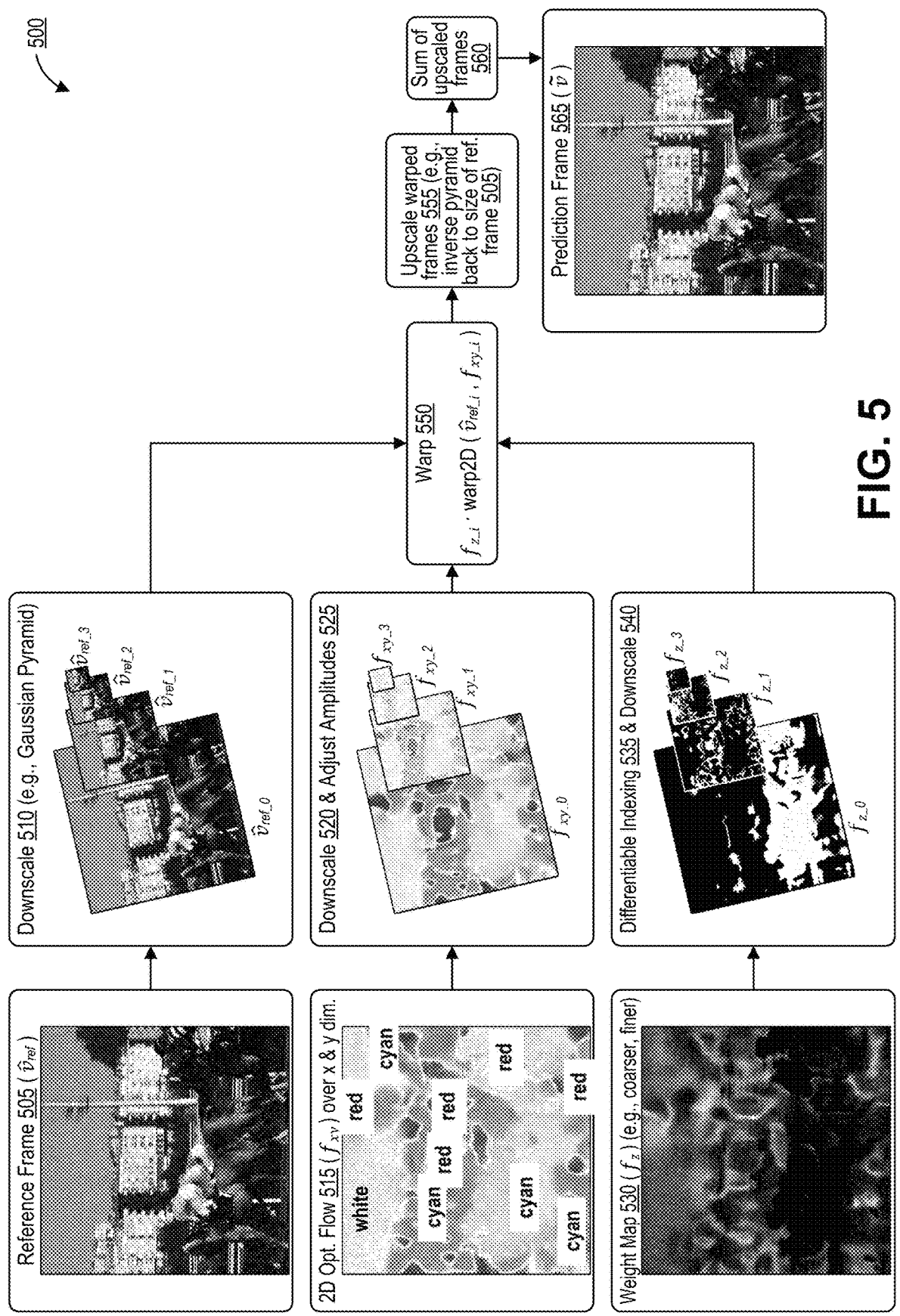
FIG. 5 is a conceptual diagram illustrating generating a prediction frame using downscaled variants of a reference frame, an optical flow, and a differentially indexed weight map.
Figure 6:
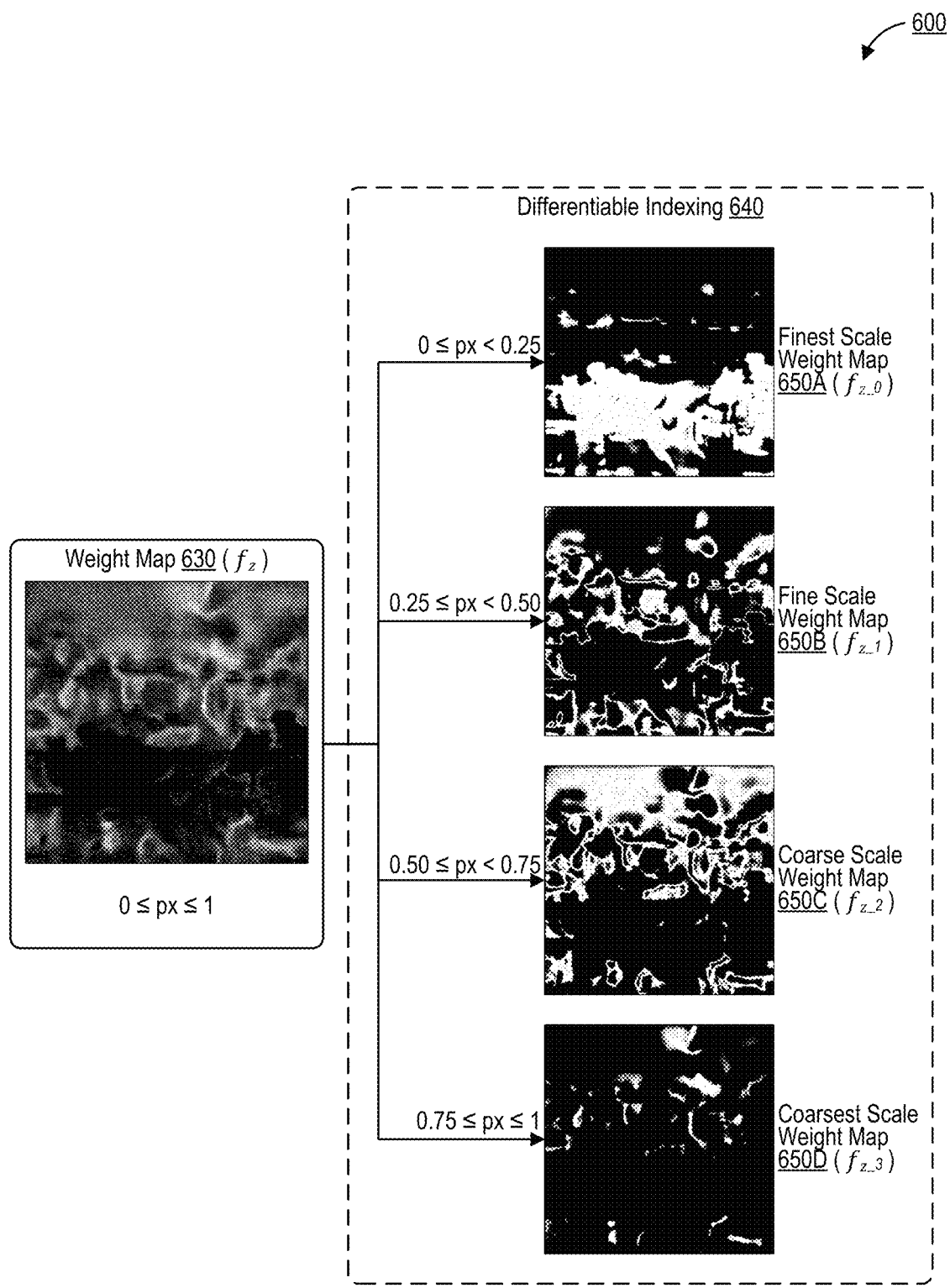
FIG. 6 is a conceptual diagram illustrating differentiable indexing of a weight map.

The weight map can identify a scale of certainty to uncertainty in the optical flow estimation. Different pixels in the reference image may correspond to different weight values within a predetermined range (e.g., from zero to one) in the weight map. In some examples, lower weight values in the weight map correspond to higher degrees of certainty in the optical flow estimation, while higher weight values in the weight map correspond to lower degrees of certainty in the optical flow estimation. Exemplary weight maps are illustrated in FIG. 5 and FIG. 6, with black corresponding to a weight value of zero, white corresponding to a weight value of one, and shades of grey between black and white corresponding to a weight values between zero and one.

The weight map can also identify a fineness or coarseness of scale at which the reference image is to be warped to generate the prediction frame predicting the input image. In some examples, lower numbers in the weight map correspond to warping of the reference image at finer detail level (e.g., weighted to a larger scale), while higher numbers in the weight map correspond to warping of the reference image using a coarser detail level (e.g., weighted to a smaller scale). At finer detail levels, the encoding device can warp the reference frame at its original size, or a slightly downscaled variant of the reference frame (e.g., half of the original size). At coarser detail levels, the encoding device can warp a more significantly downscaled variant of the reference frame (e.g., a quarter of the original size, an eighth of the original size, a sixteenth of the original size, a $32^{nd}$ of the original size, a $64^{th}$ of the original size, a $128^{th}$ of the original size, a $256^{th}$ of the original size, a $512^{th}$ of the original size, an even more downscaled size, or a size between any two of the previously listed sizes). The warped frames can be upscaled back to the original size of the reference frame and merged together at weights corresponding to the weight map.

Generating the prediction frame by warping the reference frame using both the optical flow and the weight map provides for superior video compression than using just the optical flow without the weight map. The encoding device warps a first area of the reference frame at a fine level of detail where the encoding device has estimated movement(s) for the first area with a high degree of certainty. The encoding device warps a second area of the reference frame at a coarse level of detail where the encoding device has estimated movement(s) for the first area with a low degree of certainty. An encoding device can generate a merged optical flow by merging different scales of the optical flow based on the weight map. The merged optical flow can be smoother and less complex than the original optical flow, particularly in areas with high uncertainty in optical flow estimation. Thus, the merged optical flow is less memory-intensive to store than the original optical flow. Details can be corrected using residuals. Using multi-scale optical flow, residuals can have a similar level of complexity compared to residuals using 2D optical flow. As discussed previously, 2D optical flow results in inaccuracies in areas with high uncertainty in optical flow estimation that require complex residuals to correct. In some cases, residuals using multi-scale optical flow can even have a reduced level of complexity compared to residuals using 2D optical flow. For instance, an inaccurate detailed estimate may ultimately result in warping errors that cover a larger area in the image and is thus more complex to correct than a coarser-level estimate.

The encoding device can generate encoded video data corresponding to the input frame based on the optical flow and the weight map. In some aspects, the encoding device generates the optical flow using one or more artificial intelligence (AI) algorithms, trained one or more machine learning (ML) models, one or more trained neural networks (NNs), or a combination thereof. In some aspects, the encoding device generates the weight map using one or more AI algorithms, one or more trained ML models, one or more trained NNs, or a combination thereof. In some aspects, the encoding device warps the reference frame to generate the prediction frame based on the optical flow and the weight map using one or more AI algorithms, one or more trained ML models, one or more trained NNs, or a combination thereof.

The techniques described herein can be applied to existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model). A new video coding standard developed by JVET is known as Versatile Video Coding (VVC). VVC may be referred to as H.266, MPEG-I Part 3, or Future Video Coding.

HEVC was finalized by the Joint Collaboration Team on Video Coding (JCT-VC) of ITU-T Video Coding Experts Group (VCEG) and ISO/IEC Motion Picture Experts Group (MPEG) in 2013. The Joint Video Experts Team (JVET), a collaborative team formed by MPEG and ITU-T Study Group 16's VCEG, finalized the new VVC video coding standard in 2020. VVC provides a significant improvement in compression performance over the existing HEVC standard, aiding in deployment of higher-quality video services and emerging applications (e.g., such as 365° omnidirectional immersive multimedia, high-dynamic-range (HDR) video, among others).

Many embodiments described herein provide examples using the JEM model, VVC, the HEVC standard, and/or extensions thereof. However, as noted above, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard. Likewise, while some of the techniques and systems described herein may be described with reference to video and image encoding and decoding, one of ordinary skill in the art will appreciate that the description may also apply to data encoding and data decoding for other types of data than video data and/or image data, such as audio data, text data, or multimedia data.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice. A picture coded as an I slice can be referred to as an I-frame. A picture that includes an I slice can be referred to as an I-frame. A picture coded as a P slice can be referred to as a P-frame. A picture that includes a P slice can be referred to as a P-frame. A picture coded as a B slice can be referred to as a B-frame. A picture that includes a B slice can be referred to as a B-frame.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $\text{refIdx}_0$ and $\Delta x_1$, $y_1$, $\text{refIdx}_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. In some cases, an encoding device 104 can perform features discussed herein as performed by the decoding device 112, or vice versa.

The example system shown in FIG. 1 is one illustrative example that can be used to encode and/or decode data. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Figure 2:
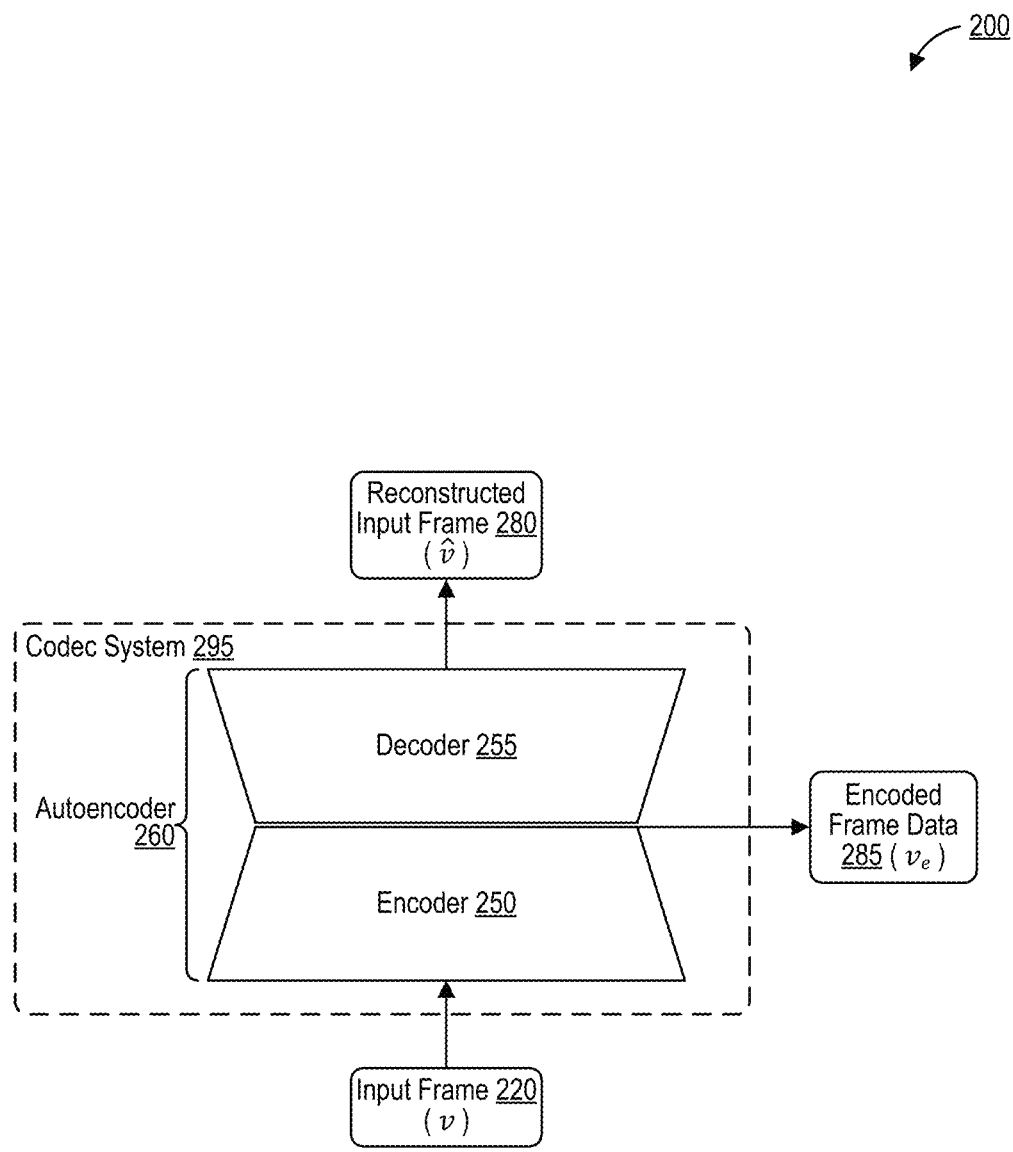
FIG. 2 is a conceptual diagram illustrating encoding and decoding of an intra-coded frame of video data.

In some cases, data can be encoded and/or decoded using a machine learning-based system (e.g., using one or more neural networks). FIG. 2 is a conceptual diagram 200 illustrating encoding and decoding of an intra-coded frame (also referred to as an I-frame) of video data. A codec system 295 with an autoencoder 260 is illustrated. The autoencoder 260 receives the input frame 220 ($v$). The autoencoder 260 includes an encoder 250 and a decoder 255. The encoder 250 can encode the input frame 220 ($v$) to generate encoded frame data 285 ($v_e$). The decoder 255 can decode the encoded frame data 285 ($v_e$) to generate a reconstructed input frame 280 ($\hat{v}$). The reconstructed input frame 280 ($\hat{v}$) is a reconstructed and/or decoded version of the input frame 220 ($v$).

The encoded frame data 285 ($v_e$) of FIG. 2 is an intra-coded frame of video data, which can also be referred to as an I-frame or as an intra-coded frame. A subscript letter "e" (as in encoded frame data 285 $v_e$) is used herein to refer to encoded data that has been encoded by an encoder, such as the encoder 250. Intra-frame coding, also known as spatial compression, refers to compressing individual video frames of the video using still image compression techniques. As an I-frame, the encoded frame data 285 ($v_e$) stores frame data through which the decoder 255 can reconstruct the entire input frame 220 ($v$) into the reconstructed input frame 280 ($\hat{v}$), without reference to any other frame. The encoder 250 may use intra-frame coding to generate the encoded frame data 285 ($v_e$). In some examples, the encoder 250 may use one or more AI algorithms, one or more trained ML models, and/or one or more trained NNs to encode the encoded frame data 285 ($v_e$) based on the input frame 220 ($v$). In some examples, the encoded frame data 285 ($v_e$) may be a latent space representation of the input frame 220 ($v$). In some examples, the decoder 255 may use one or more AI algorithms, one or more trained ML models, and/or one or more trained NNs to reconstruct the reconstructed input frame 280 ($\hat{v}$) based on the encoded frame data 285 ($v_e$).

In some examples, the encoder 250 uses lossless compression to generate the encoded frame data 285 ($v_e$). In examples where the encoder 250 uses lossless compression to generate the encoded frame data 285 ($v_e$), the reconstructed input frame 280 ($\hat{v}$) can be identical to the input frame 220 ($v$). In some examples, the encoder 250 uses lossy compression to generate the encoded frame data 285 ($v_e$). In examples where the encoder 250 uses lossy compression to generate the encoded frame data 285 ($v_e$), the reconstructed input frame 280 ($\hat{v}$) can be similar to the input frame 220 ($v$). In examples where the encoder 250 uses lossy compression to generate the encoded frame data 285 ($v_e$), the reconstructed input frame 280 ($\hat{v}$) can include some differences compared to the input frame 220 ($v$). A hat over a letter (as in reconstructed input frame 280 $\hat{v}$) is used herein to refer to reconstructed data that has been decoded and/or reconstructed with the help of a decoder, such as the decoder 255.

In some examples, the encoder 250 includes a transform coder that performs transformation coding on the input frame 220 ($v$) and/or on blocks thereof. In some examples, the transformation coding can include a discrete cosine transform (DCT), a modified discrete cosine transform (MDCT), a discrete sine transform (DST), a fast Fourier transform (FFT), a wavelet transform, or a combination thereof. In some examples, the encoder 250 includes a quantizer that performs quantization on the input frame 220 ($v$) and/or on blocks thereof, in some cases following transformation coding. A degree of quantization performed by the quantizer of the encoder 250 during the quantization can be based on a quantization parameter (QP), and can be modified by adjusting the QP. The QP can indicates a quantization step size for the input frame 220 ($v$) during quantization, and can control how much spatial detail is retained from the captured image after quantization. In some examples, the encoder 250 includes an entropy encoder that performs entropy coding, in some cases following transformation coding and/or quantization. Entropy coding may include, for example, context-adaptive binary arithmetic coding (CABAC), arithmetic coding, Golomb coding, Huffman coding, range coding, Shannon coding, Shannon-Fano coding, Shannon-Fano-Elias coding, Tunstall coding, unary coding, universal coding, or a combination thereof.

In some examples, the decoder 255 includes an inverse quantizer that performs inverse quantization on the encoded frame data 285 ($v_e$) and/or on blocks thereof. In some examples, the decoder 255 includes an inverse transform coder that performs an inverse transform on the encoded frame data 285 ($v_e$) and/or on blocks thereof, in some cases following inverse quantization.

Figure 3A:
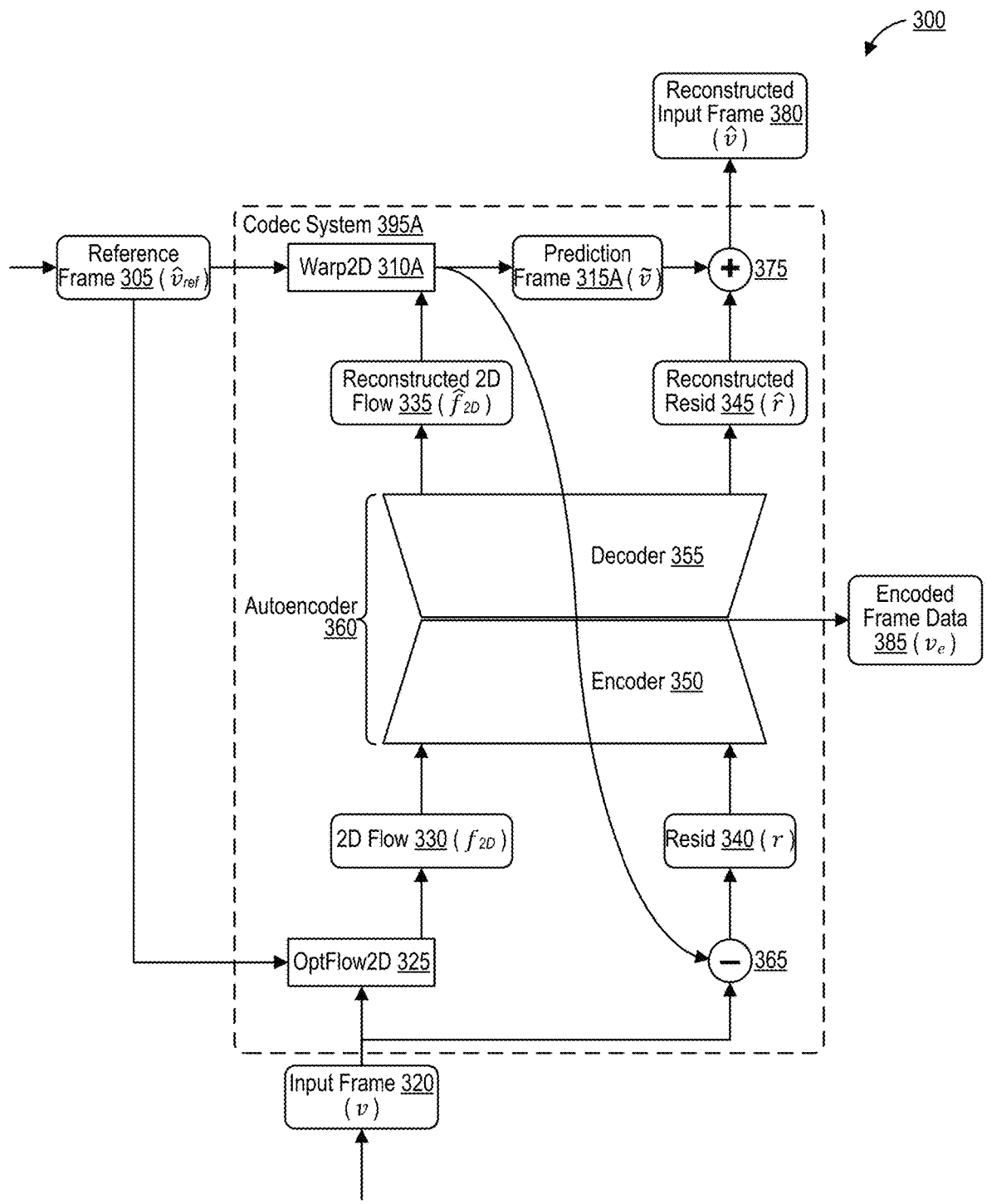
FIG. 3A is a conceptual diagram illustrating encoding and decoding of an inter-coded frame of video data using 2-dimensional (2D) optical flow and 2D warping.

FIG. 3A is a conceptual diagram 300 illustrating encoding and decoding of an inter-coded frame of video data using 2-dimensional (2D) optical flow and 2D warping. A codec system 395A with a Warp2D engine 310A, an OptFlow2D engine 325, and an autoencoder 360 is illustrated. The autoencoder 360 includes an encoder 350 and a decoder 355. The codec system 395A receives a reference frame 305 ($\hat{v}_{ref}$) and an input frame 320 ($v$). The codec system 395A can generate and/or output encoded frame data 385 ($v_e$) that encodes data corresponding to the input frame 320 ($v$). The encoded frame data 385 ($v_e$) of FIG. 3A is an inter-coded frame. Inter-frame coding, also known as temporal compression, refers to compressing a frame in a video by referencing redundancies in the frame from one or more other frames in the video. The inter-coded frame can be referred to as a P-frame, a predicted frame, a B-frame, a bidirectional predicted frame, or a combination thereof. In the case of the encoded frame data 385 ($v_e$), the input frame 320 ($v$) is encoded and/or compressed by referencing redundancies in the input frame 320 ($v$) from at least the reference frame 305 ($\hat{v}_{ref}$). The codec system 395A can decode the encoded frame data 385 ($v_e$) based on data in the reference frame 305 ($\hat{v}_{ref}$) and the encoded frame data 385 ($v_e$) to generate a reconstructed input frame 380 ($\hat{v}$).

In some examples, the reference frame 305 ($\hat{v}_{ref}$) depicts a scene at a first time, while the input frame 320 ($v$) depicts the same scene at a second time. The first time can be before the second time, in which case the reference frame 305 ($\hat{v}_{ref}$) is arranged before the input frame 320 ($v$) in a video. The first time can be after the second time, in which case the reference frame 305 ($\hat{v}_{ref}$) is arranged after the input frame 320 ($v$) in a video. The reference frame 305 ($\hat{v}_{ref}$) can be an intra-coded frame. As suggested by the hat symbol, the reference frame 305 ($\hat{v}_{ref}$) can be a reconstructed frame, such as the reconstructed input frame 280 ($\hat{v}$) of FIG. 2.

The OptFlow2D engine 325 receives the reference frame 305 ($\hat{v}_{ref}$) and the input frame 320 ($v$). The OptFlow2D engine 325 generates a 2D optical flow 330 ($f_{2D}$) based on the reference frame 305 ($\hat{v}_{ref}$) and the input frame 320 ($v$). The OptFlow2D engine 325 can include, and/or can generate the 2D optical flow 330 ($f_{2D}$) using, one or more one or more AI algorithms, one or more trained ML models, one or more trained NNs, or a combination thereof. The OptFlow2D engine 325 can use a neural network (NN) such as the NN 800 of FIG. 8, a convolutional neural network (CNN) such as the CNN 900 of FIG. 9, a deep CNN, a NN with fully connected layers, a CNN with fully connected layers, a deep CNN with fully connected layers, another type of NN, or a combination thereof. The OptFlow2D engine 325 can use FlowNet 1.0, FlowNet 2.0, FlowNetSimple, FlowNetCorr, FlowNetS, FlowNetLite, another optical flow estimation method, or a combination thereof.

The OptFlow2D engine 325 compares the reference frame 305 ($\hat{v}_{ref}$) to the input frame 320 ($v$). The OptFlow2D engine 325 can identify unchanged areas that do not change between the reference frame 305 ($\hat{v}_{ref}$) and the input frame 320 ($v$). The OptFlow2D engine 325 can identify moved areas that are present in both the reference frame 305 ($\hat{v}_{ref}$) and the input frame 320 ($v$), but that move between the reference frame 305 ($\hat{v}_{ref}$) and the input frame 320 ($v$).

In one illustrative example, the reference frame 305 ($\hat{v}_{ref}$) and the input frame 320 ($v$) can depict a scene of a person walking in front of a stationary and unchanging background. In this illustrative example, the OptFlow2D engine 325 can identify that the depictions of the stationary and unchanging background in the reference frame 305 ($\hat{v}_{ref}$) and the input frame 320 ($v$) represent an unchanged area. In this illustrative example, the OptFlow2D engine 325 can identify that the depictions of the person the reference frame 305 ($\hat{v}_{ref}$) and the input frame 320 ($v$) represent a moved area.

The 2D optical flow 330 ($f_{2D}$) generated by the OptFlow2D engine 325 can identify, for each of a set of one or more pixels in the reference frame 305 ($\hat{v}_{ref}$) corresponding to a moved area, a motion vector. In some examples, the 2D optical flow 330 ($f_{2D}$) can identify a motion vector for every pixel of the reference frame 305 ($\hat{v}_{ref}$). Each motion vector can identify a direction and/or a distance that the element depicted by the pixel moves between the reference frame 305 ($\hat{v}_{ref}$) and the input frame 320 ($v$). The direction can be a direction along the 2D image plane of the reference frame 305 ($\hat{v}_{ref}$). The distance can be a distance along the 2D image plane of the reference frame 305 ($\hat{v}_{ref}$). The distance can be a linear distance, a Euclidean distance, or a combination thereof. The 2D image plane can have two perpendicular dimensions. In some examples, the two perpendicular dimensions are referred to as the horizontal dimension (x) and the vertical dimension (y), respectively. The distance may be referred to as the amplitude of the motion vector. In unchanged areas, the 2D optical flow 330 ($f_{2D}$) can identify a distance or amplitude of zero.

Dense optical flow provides motion vectors for every pixel of the video frames. The 2D optical flow 330 ($f_{2D}$) can be a dense optical flow. Sparse optical flow provides motion vectors for a subset of the pixels of the video frames, such as pixels representing visual features in the scene (e.g., corners, edges, ridges, and/or blobs). The 2D optical flow 330 ($f_{2D}$) can be a sparse optical flow.

In some examples, the 2D optical flow 330 ($f_{2D}$) is generated by the OptFlow2D engine 325 as an optical flow image. In some examples, the optical flow image identifies the direction of the motion vector for a pixel in the reference frame 305 ($\hat{v}_{ref}$) based on a hue of a corresponding pixel in the optical flow image. In some examples, the optical flow image identifies the distance (or amplitude) of the motion vector for a pixel in the reference frame 305 ($\hat{v}_{ref}$) based on a saturation or chroma of a corresponding pixel in the optical flow image. In one illustrative example, cyan represents a left direction, blue represents a diagonal left-up direction, violet represents an up direction, fuchsia represents a diagonal right-up direction, red represents a right direction, orange represents a diagonal right-down direction, yellow represents a down direction, green represents a diagonal left-down direction, and any color in between any two of the listed colors represents a direction between the two directions corresponding to those two colors. In one illustrative example, white represents a motion vector amplitude of zero, with higher saturations or chroma values representing higher motion vector amplitudes. An example of an optical flow image using this hue and saturation coding scheme is illustrated as the 2D flow 515 of FIG. 5.

The encoder 350 of the autoencoder 360 of the codec system 395A can encode the 2D optical flow 330 ($f_{2D}$) generated by the OptFlow2D engine 325 to produce an encoded 2D optical flow ($f_{2D\_e}$), which may be part of the encoded frame data 385 ($v_e$). The decoder 355 of the autoencoder 360 of the codec system 395A can decode or reconstruct the encoded 2D optical flow ($f_{2D\_e}$) to produce the reconstructed 2D optical flow 335 ($\hat{f}_{2D}$). The decoder 355 can pass the reconstructed 2D optical flow 335 ($\hat{f}_{2D}$) to the Warp2D engine 310A of the codec system 395A.

The Warp2D engine 310A of the codec system 395A can receive the reference frame 305 ($\hat{v}_{ref}$) and the reconstructed 2D optical flow 335 ($\hat{f}_{2D}$). The Warp2D engine 310A of the codec system 395A can generate a prediction frame 315A ($\tilde{v}$) by warping the reference frame 305 ($\hat{v}_{ref}$) based on the motion vectors in the reconstructed 2D optical flow 335 ($\hat{f}_{2D}$). The prediction frame 315A ($\tilde{v}$) represents a prediction of the input frame 320 ($v$) based on the reconstructed 2D optical flow 335 ($\hat{f}_{2D}$). For instance, unchanged areas in the reconstructed 2D optical flow 335 ($\hat{f}_{2D}$) (e.g., areas with zero amplitude) remain the same in the prediction frame 315A ($\tilde{v}$) as they are in the reference frame 305 ($\hat{v}_{ref}$). Moved areas in the reconstructed 2D optical flow 335 ($\hat{f}_{2D}$) (e.g., areas with nonzero amplitude) are moved from their positions in the reference frame 305 ($\hat{v}_{ref}$) to their new positions in the prediction frame 315A ($\tilde{v}$) based on the direction and amplitude of their respective motion vectors in the reconstructed 2D optical flow 335 ($\hat{f}_{2D}$). A tilde over a letter (as in prediction frame 315A $\tilde{v}$) is used herein to refer to predicted data generated by a Warp engine, such as the Warp2D engine 310A, by warping reference data according to an optical flow. The Warp2D engine 310A can pass the prediction frame 315A ($\tilde{v}$) to a subtractor 365 of the codec system 395A and/or to an adder 375 of the codec system 395A.

The subtractor 365 of the codec system 395A can receive the prediction frame 315A ($\tilde{v}$) and the input frame 320 ($v$). The subtractor 365 of the codec system 395A can generate a residual 340 ($r$) by subtracting the prediction frame 315A ($\tilde{v}$) from the input frame 320 ($v$), or vice versa. A residual can identify a difference, or error, between two frames. The residual 340 ($r$) thus identifies one or more differences between the input frame 320 ($v$) and the prediction frame 315A ($\tilde{v}$). The encoder 350 of the autoencoder 360 of the codec system 395A can encode the residual 340 ($r$) generated by the subtractor 365 to produce an encoded residual ($r_e$), which may be part of the encoded frame data 385 ($v_e$). The decoder 355 of the autoencoder 360 of the codec system 395A can decode or reconstruct the encoded residual ($r_e$) to produce the reconstructed residual 345 ($\hat{r}$). The decoder 355 can pass the reconstructed residual 345 ($\hat{r}$) to the adder 375 of the codec system 395A.

The adder 375 of the codec system 395A can receive the prediction frame 315A (3) and the reconstructed residual 345 ($\hat{r}$). The adder 375 of the codec system 395A can generate a reconstructed input frame 380 ($\hat{v}$) by adding the reconstructed residual 345 ($\hat{r}$) to the prediction frame 315A ($\tilde{v}$), or vice versa. The reconstructed input frame 380 ($\hat{v}$) is a reconstructed and/or decoded version of the encoded frame data 385 ($v_e$) that attempts to reconstruct the input frame 320 ($v$) as closely as possible.

In some examples, the encoder 350 uses lossless compression to generate the encoded frame data 385 ($v_e$). In examples where the encoder 350 uses lossless compression to generate the encoded frame data 385 ($v_e$), the reconstructed input frame 380 ($\hat{v}$) can include all of the video data of the input frame 320 ($v$), the reconstructed 2D optical flow 335 ($\hat{f}_{2D}$) can include all of the optical flow data of the 2D optical flow 330 ($f_{2D}$), and/or the reconstructed residual 345 ($\hat{r}$) can include all of the residual data of the residual 340 ($r$). In examples where the encoder 350 uses lossy compression to generate the encoded frame data 385 ($v_e$), the reconstructed input frame 380 ($\hat{v}$) can include similar video data to that of the input frame 320 ($v$), the reconstructed 2D optical flow 335 ($\hat{f}_{2D}$) can include similar optical flow data to that of the 2D optical flow 330 ($f_{2D}$), and/or the reconstructed residual 345 ($\hat{r}$) can include similar residual data to that of the residual 340 ($r$). In examples where the encoder 350 uses lossy compression to generate the encoded frame data 385 ($v_e$), the reconstructed input frame 380 ($\hat{v}$) can include one or more differences in video data compared to that of the input frame 320 ($v$), the reconstructed 2D optical flow 335 ($\hat{f}_{2D}$) can include one or more differences in optical flow data compared to that of the 2D optical flow 330 ($f_{2D}$), and/or the reconstructed residual 345 ($\hat{r}$) can include one or more differences in residual data compared to that of the residual 340 ($r$).

In some examples, the encoder 350 includes a transform coder that performs transformation coding on the input frame 320 ($v$) and/or on blocks thereof. In some examples, the transformation coding can be based on the residual 340 ($r$) in addition to the input frame 320 ($v$). In some examples, the transformation coding can include a discrete cosine transform (DCT), a modified discrete cosine transform (MDCT), a discrete sine transform (DST), a fast Fourier transform (FFT), a wavelet transform, or a combination thereof. In some examples, the encoder 350 includes a quantizer that performs quantization on the input frame 320 ($v$) and/or on blocks thereof, in some cases following transformation coding. A degree of quantization performed by the quantizer of the encoder 350 during the quantization can be based on a quantization parameter (QP), and can be modified by adjusting the QP. The QP can indicates a quantization step size for the input frame 320 ($v$) during quantization, and can control how much spatial detail is retained from the captured image after quantization. In some examples, the encoder 350 includes an entropy encoder that performs entropy coding, in some cases following transformation coding and/or quantization. Entropy coding may include, for example, context-adaptive binary arithmetic coding (CABAC), arithmetic coding, Golomb coding, Huffman coding, range coding, Shannon coding, Shannon-Fano coding, Shannon-Fano-Elias coding, Tunstall coding, unary coding, universal coding, or a combination thereof.

In some examples, the decoder 355 includes an inverse quantizer that performs inverse quantization on the encoded frame data 385 ($v_e$) and/or on blocks thereof. In some examples, the decoder 355 includes an inverse transform coder that performs an inverse transform on the encoded frame data 385 ($v_e$) and/or on blocks thereof, in some cases following inverse quantization.

In some examples, the autoencoder 360 of the codec system 395A may be split into two or more autoencoders. In an illustrative example, the autoencoder 360 of the codec system 395A can include a first autoencoder and a second autoencoder. The first autoencoder receives the 2D optical flow 330 ($f_{2D}$) and outputs the reconstructed 2D optical flow 335 ($\hat{f}_{2D}$). An encoder of the first autoencoder can output a first portion of the encoded frame data 385 ($v_e$). The second autoencoder receives the residual 340 ($r$) and outputs the reconstructed residual 345 ($\hat{r}$). An encoder of the second autoencoder can output a second portion of the encoded frame data 385 ($v_e$).

Figure 3B:
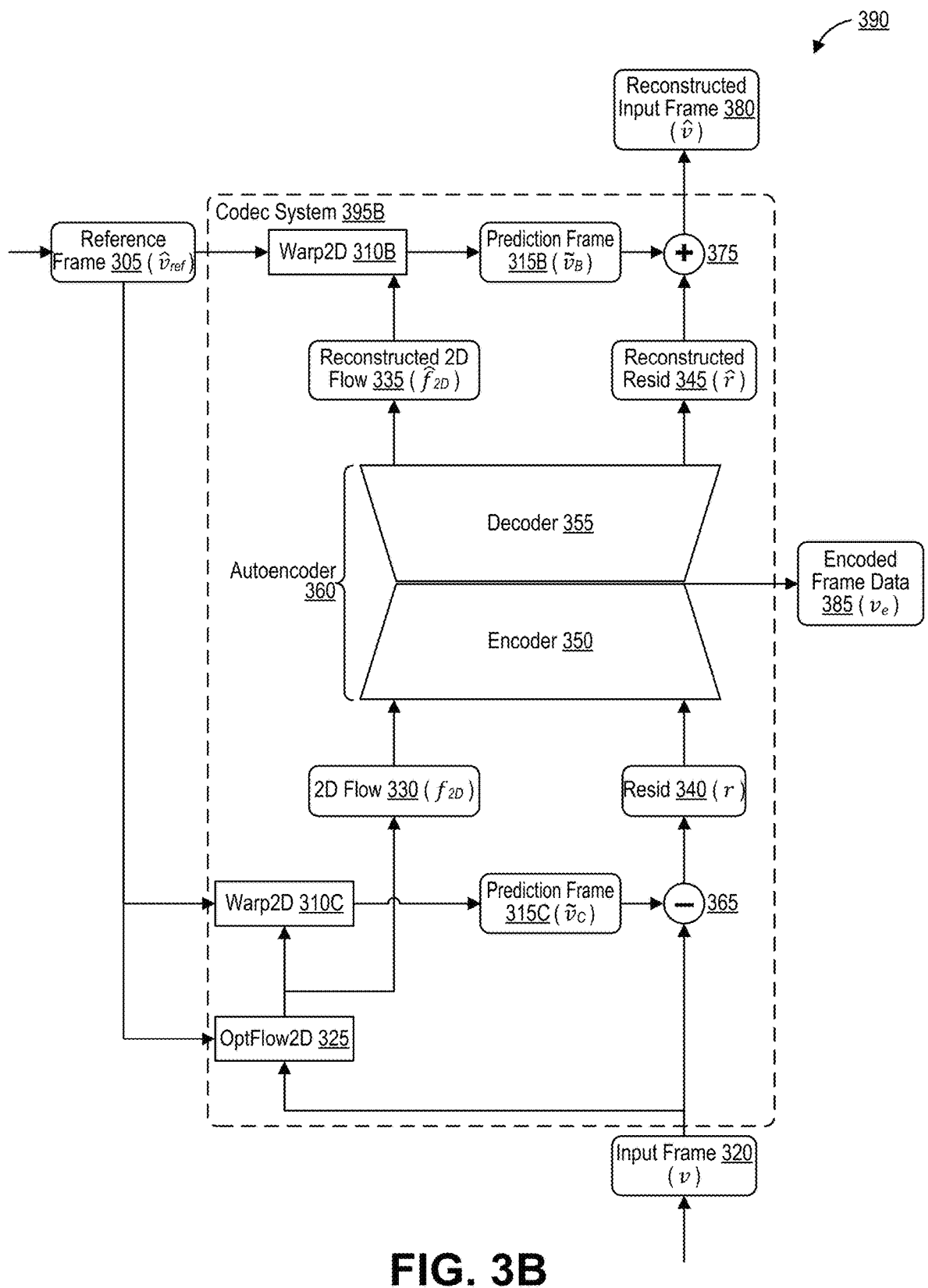
FIG. 3B is a conceptual diagram illustrating encoding and decoding of an inter-coded frame of video data using 2-dimensional (2D) optical flow and 2D warping.

FIG. 3B is a conceptual diagram 390 illustrating encoding and decoding of an inter-coded frame of video data using 2-dimensional (2D) optical flow and 2D warping. A codec system 395B with a Warp2D engine 310B, a Warp2D engine 310C, an OptFlow2D engine 325, and an autoencoder 360 is illustrated. The codec system 395B of FIG. 3B is similar to the codec system 395A of FIG. 3A, but includes the Warp2D engine 310B and the Warp2D engine 310C in place of the Warp2D engine 310A of the codec system 395A of FIG. 3A.

The Warp2D engine 310C of the codec system 395B can receive the reference frame 305 ($\hat{v}_{ref}$) and the 2D optical flow 330 ($f_{2D}$). The Warp2D engine 310C of the codec system 395B can generate a prediction frame 315C ($\hat{v}_C$) by warping the reference frame 305 ($\hat{v}_{ref}$) based on the motion vectors in the optical flow 330 ($f_{2D}$). The prediction frame 315C ($\hat{v}_C$) represents a prediction of the input frame 320 ($v$) based on the optical flow 330 ($f_{2D}$). The prediction frame 315C ($\hat{v}_C$) of FIG. 3B can differ from the prediction frame 315A ($\hat{v}$) of FIG. 3A because the prediction frame 315C ($\hat{v}_C$) of FIG. 3B is generated using the optical flow 330 ($f_{2D}$), while the prediction frame 315A ($\hat{v}$) of FIG. 3A is generated using the reconstructed 2D optical flow 335 ($\hat{f}_{2D}$). The Warp2D engine 310C can pass the prediction frame 315C ($\hat{v}_C$) to the subtractor 365 of the codec system 395B. The subtractor 365 of the codec system 395B can receive the prediction frame 315C ($\hat{v}_C$) and the input frame 320 ($v$). The subtractor 365 of the codec system 395B can generate a residual 340 ($r$) by subtracting the prediction frame 315C ($\hat{v}_C$) from the input frame 320 ($v$), or vice versa. Because the prediction frame 315C ($\hat{v}_C$) of FIG. 3B may be different from the prediction frame 315A ($\hat{v}$) of FIG. 3A, the residual 340 ($r$) of FIG. 3B may also be different from the residual 340 ($r$) of FIG. 3A.

The Warp2D engine 310B of the codec system 395B can receive the reference frame 305 ($\hat{v}_{ref}$) and the reconstructed 2D optical flow 335 ($\hat{f}_{2D}$), more similarly to the Warp2D engine 310A of the codec system 395A. The Warp2D engine 310B of the codec system 395B can generate a prediction frame 315B ($\hat{v}_B$) by warping the reference frame 305 ($\hat{v}_{ref}$) based on the motion vectors in the reconstructed 2D optical flow 335 ($\hat{f}_{2D}$). The prediction frame 315B ($\hat{v}_B$) represents a prediction of the input frame 320 ($v$) based on the reconstructed 2D optical flow 335 ($\hat{f}_{2D}$). The prediction frame 315B ($\hat{v}_B$) can differ from the prediction frame 315C ($\hat{v}_C$) because the prediction frame 315B ($\hat{v}_B$) is generated using the reconstructed 2D optical flow 335 ($\hat{f}_{2D}$), while the prediction frame 315C ($\hat{v}_C$) is generated using the optical flow 330 ($f_{2D}$). The Warp2D engine 310B can pass the prediction frame 315B ($\hat{v}_B$) to the adder 375 of the codec system 395B. The adder 375 of the codec system 395B can receive the prediction frame 315B ($\hat{v}_B$) and the reconstructed residual 345 ($\hat{r}$). The adder 375 of the codec system 395B can generate a reconstructed input frame 380 ($\hat{v}$) by adding the reconstructed residual 345 ($\hat{r}$) to the prediction frame 315B ($\hat{v}_B$), or vice versa. The reconstructed input frame 380 ($\hat{v}$) is a reconstructed and/or decoded version of the encoded frame data 385 ($v_e$) that attempts to reconstruct the input frame 320 ($v$) as closely as possible. In some examples, the Warp2D engine 410C can be used in place of the Warp2D engine 410B, so that the prediction frame 415C ($\hat{v}_C$) (which is based on the 2D optical flow 330 $f_{2D}$) is sent to the adder 475 instead of the prediction frame 415B ($\hat{v}_B$) (which is based on the reconstructed 2D optical flow 335 $\hat{f}_{2D}$).

In some examples, the autoencoder 360 of the codec system 395B may be split into two or more autoencoders. In an illustrative example, the autoencoder 360 of the codec system 395A can include a first autoencoder and a second autoencoder. The first autoencoder receives the 2D optical flow 330 ($f_{2D}$) and outputs the reconstructed 2D optical flow 335 ($\hat{f}_{2D}$). An encoder of the first autoencoder can output a first portion of the encoded frame data 385 ($v_e$). The second autoencoder receives the residual 340 ($r$) and outputs the reconstructed residual 345 ($\hat{r}$). An encoder of the second autoencoder can output a second portion of the encoded frame data 385 ($v_e$).

Figure 4A:
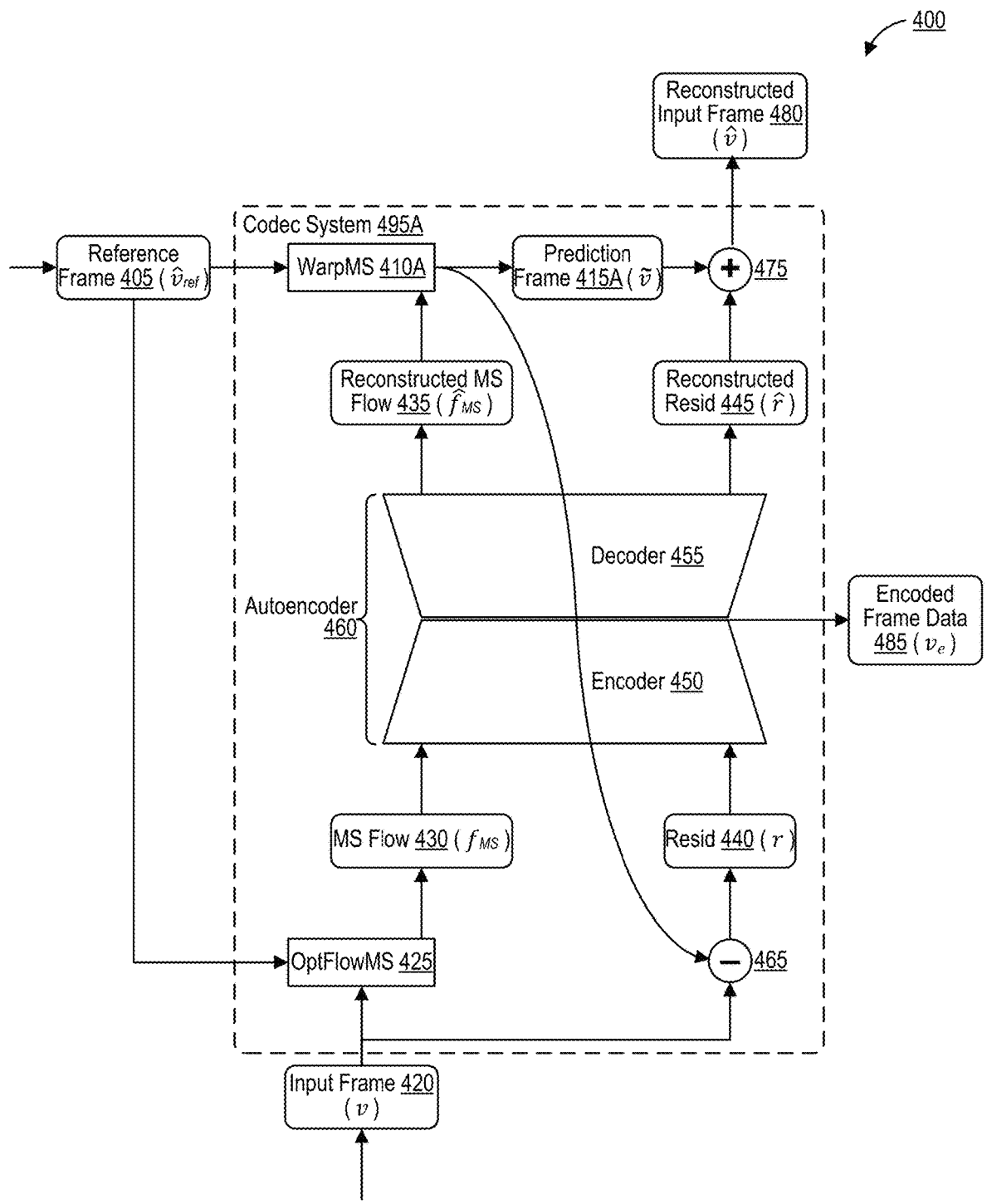
FIG. 4A is a conceptual diagram illustrating encoding and decoding of an inter-coded frame of video data using mutli-scale (MS) optical flow and MS warping.

FIG. 4A is a conceptual diagram 400 illustrating encoding and decoding of an inter-coded frame of video data using multi-scale (MS) optical flow and MS warping. A codec system 495A with a WarpMS engine 410A, an OptFlowMS engine 425, and an autoencoder 460 is illustrated. The autoencoder 460 includes an encoder 450 and a decoder 455. The codec system 495A of FIG. 4A includes a similar architecture to the codec system 395A of FIG. 3A, but with the Warp2D engine 310A replaced with the WarpMS engine 410A and the OptFlow2D engine 325 replaced with the OptFlowMS engine 425.

The codec system 495A receives a reference frame 405 ($\hat{v}_{ref}$) and an input frame 420 ($v$). Like the reference frame 305 ($\hat{v}_{ref}$) and an input frame 320 ($v$), the reference frame 405 ($\hat{v}_{ref}$) and an input frame 420 ($v$) can depict the same scene at different times. The reference frame 405 ($\hat{v}_{ref}$) can be an intra-coded frame.

The OptFlowMS engine 425 receives the reference frame 405 ($\hat{v}_{ref}$) and the input frame 420 ($v$). The OptFlowMS engine 425 generates a MS optical flow 430 ($f_{MS}$) based on the reference frame 405 ($\hat{v}_{ref}$) and the input frame 420 ($v$). The OptFlowMS engine 425 can include, and/or can generate the MS optical flow 430 ($f_{MS}$) using, one or more one or more AI algorithms, one or more trained ML models, one or more trained NNs, or a combination thereof. The OptFlowMS engine 425 can use a neural network (NN) such as the NN 800 of FIG. 8, a convolutional neural network (CNN) such as the CNN 900 of FIG. 9, a deep CNN, a NN with fully connected layers, a CNN with fully connected layers, a deep CNN with fully connected layers, another type of NN, or a combination thereof.

To generate the MS optical flow 430 ($f_{MS}$), the OptFlowMS engine 425 can generate a 2D optical flow (as discussed with respect to the 2D optical flow 330 $f_{MS}$) as well as a weight map representing a third dimension. Weight may be referred to as the z dimension. The 2D optical flow component of the MS optical flow 430 ($f_{MS}$) may be referred to as the flow related to the x and y dimensions, which may be written as $f_{xy}$. The weight map component of the MS optical flow 430 ($f_{MS}$) may be referred to as the flow related to the z dimension, which may be written as L. To generate the 2D optical flow component ($f_{xy}$) of the MS optical flow 430 ($f_{MS}$), the OptFlowMS engine 425 can use any systems and techniques discussed herein with respect to the 2D optical flow 330 ($f_{2D}$), modified to generate multi-scale flow. For example, the OptFlowMS engine 425 can use modified versions (modified for multi-scale flow) of techniques such as FlowNet 1.0, FlowNet 2.0, FlowNetSimple, FlowNetCorr, FlowNetS, FlowNetLite, another optical flow estimation method, or a combination thereof. The weight map component ($f_z$) of the MS optical flow 430 ($f_{MS}$) can include a weight value corresponding to each pixel of the reference frame 405 ($\hat{v}_{ref}$) and/or corresponding to each pixel of the 2D optical flow component ($f_{xy}$) of the MS optical flow 430 ($f_{MS}$).

The weight map component ($f_z$) of the MS optical flow 430 ($f_{MS}$) can identify a scale of certainty to uncertainty in the optical flow estimation of the 2D optical flow component ($f_{xy}$) of the MS optical flow 430 ($f_{MS}$). In some cases, certainty may be referred to as confidence. Different pixels in the reference frame 405 ($\hat{v}_{ref}$) may correspond to different weight values within a predetermined range (e.g., from zero to one) in the weight map. An example of the weight map component of the MS optical flow 430 ($f_{MS}$) is illustrated as the weight map 530 ($f_z$) of FIG. 5 and as the weight map 630 ($f_z$) of FIG. 6. In the exemplary weight map 530 ($f_z$) of FIG. 5 and the exemplary weight map 630 ($f_z$) of FIG. 6, black corresponds to a weight value of zero, white corresponds to a weight value of one, and shades of grey between black and white correspond to weight values between zero and one. In some examples, lower weight values in the weight map (e.g., lower than a predetermined weight threshold) correspond to higher degrees of certainty in the optical flow estimation (e.g., higher than a predetermined certainty threshold) and/or to lower degrees of uncertainty in the optical flow estimation (e.g., lower than a predetermined uncertainty threshold). In some examples, higher weight values in the weight map (e.g., higher than a predetermined weight threshold) correspond to lower degrees of certainty in the optical flow estimation (e.g., lower than a predetermined certainty threshold) and/or to higher degrees of uncertainty in the optical flow estimation (e.g., higher than a predetermined uncertainty threshold). In some examples, the weight values may have the opposite relationship to certainty values and/or to uncertainty values. In some examples, weight maps may use the opposite relationship between weight value and shade of grey, with white corresponding to a weight value of one and black corresponding to a weight value of zero.

The encoder 450 of the autoencoder 460 of the codec system 495A can encode the MS optical flow 430 ($f_{MS}$) generated by the OptFlowMS engine 425 to produce an encoded MS optical flow ($f_{MS\_e}$), which may be part of the encoded frame data 485 ($v_e$). The decoder 455 of the autoencoder 460 of the codec system 495A can decode or reconstruct the encoded MS optical flow ($f_{MS\_e}$) to produce the reconstructed MS optical flow 435 ($\hat{f}_{MS}$). The decoder 455 can pass the reconstructed MS optical flow 435 ($\hat{f}_{MS}$) to the WarpMS engine 410A of the codec system 495A.

The WarpMS engine 410A of the codec system 495A can receive the reference frame 405 ($\hat{v}_{ref}$) and the reconstructed MS optical flow 435 ($\hat{f}_{MS}$). The WarpMS engine 410A of the codec system 495A can generate a prediction frame 415A ($\hat{v}$) by warping the reference frame 405 ($\hat{v}_{ref}$) based on the motion vectors in the reconstructed 2D optical flow component ($\hat{f}_{xy}$) of the reconstructed MS optical flow 435 ($\hat{f}_{MS}$) and based on the weight values in the reconstructed weight map component ($\hat{f}_z$) of the reconstructed MS optical flow 435 ($\hat{f}_{MS}$). The prediction frame 415A ($\hat{v}$) represents a prediction of the input frame 420 ($v$) based on the reconstructed MS optical flow 435 ($\hat{f}_{MS}$). The WarpMS engine 410A can pass the prediction frame 415A ($\hat{v}$) to the subtractor 465 of the codec system 495A and/or to the adder 475 of the codec system 495A.

The weight map component ($f_z$) of the MS optical flow 430 ($f_{MS}$) can identify a fineness or coarseness of scale at which the reference frame 405 ($\hat{v}_{ref}$) is to be warped to generate the prediction frame 415A ($\hat{v}$) predicting the input frame 420 ($v$). In some examples, lower weight values in the weight map (e.g., lower than a predetermined weight threshold) correspond to warping of the corresponding part of the reference frame 405 ($\hat{v}_{ref}$) at finer detail level. In some examples, higher weight values in the weight map (e.g., higher than a predetermined weight threshold) correspond to warping of the corresponding part of the reference frame 405 ($\hat{v}_{ref}$) using a coarser detail level. In some examples, the weight values may have the opposite relationship to fineness and/or coarseness of warping. At finer detail levels, the WarpMS engine 410A of the codec system 495A can warp the reference frame 405 ($\hat{v}_{ref}$) at the original size (e.g., dimensions and/or resolution) of the reference frame 405 ($\hat{v}_{ref}$), or a slightly downscaled variant of the reference frame 405 ($\hat{v}_{ref}$) (e.g., half of the original size). At coarser detail levels, the WarpMS engine 410A of the codec system 495A can warp a more significantly downscaled variant of the reference frame 405 ($\hat{v}_{ref}$) (e.g., a quarter of the original size, an eighth of the original size, a sixteenth of the original size, a $32^{nd}$ of the original size, a $64^{th}$ of the original size, a $128^{th}$ of the original size, a $256^{th}$ of the original size, a $512^{th}$ of the original size, an even more downscaled size, or a size between any two of the previously listed sizes). The warped regions of the reference frame 405 ($\hat{v}_{ref}$) can be upscaled back to the original size of the reference frame 405 ($\hat{v}_{ref}$) and merged together based on weights corresponding to the weight map. An example of the warping of the reference frame 405 ($\hat{v}_{ref}$) based on the reconstructed MS optical flow 435 ($\hat{f}_{MS}$) by the WarpMS engine 410A of the codec system 495A to generate the prediction frame 415A ($\hat{v}$) is illustrated in FIG. 5.

The subtractor 465 of the codec system 495A can receive the prediction frame 415A ($\hat{v}$) and the input frame 420 ($v$). The subtractor 465 of the codec system 495A can generate a residual 440 ($r$) by subtracting the prediction frame 415A ($\hat{v}$) from the input frame 420 ($v$), or vice versa. The residual 440 ($r$) thus identifies one or more differences between the input frame 420 ($v$) and the prediction frame 415A ($\hat{v}$). Because the prediction frame 415A ($\hat{v}$) of FIG. 4A may be different from the prediction frame 315A ($\hat{v}$) of FIG. 3A, the residual 440 ($r$) of FIG. 4A may also be different from the residual 340 ($r$) of FIG. 3A.

The encoder 450 of the autoencoder 460 of the codec system 495A can encode the residual 440 ($r$) generated by the subtractor 465 to produce an encoded residual ($r_e$), which may be part of the encoded frame data 485 ($v_e$). The decoder 455 of the autoencoder 460 of the codec system 495A can decode or reconstruct the encoded residual ($r_e$) to produce the reconstructed residual 445 ($\hat{r}$). The decoder 455 can pass the reconstructed residual 445 ($\hat{r}$) to the adder 475 of the codec system 495A.

The adder 475 of the codec system 495A can receive the prediction frame 415A ($\hat{v}$) and the reconstructed residual 445 ($\hat{r}$). The adder 475 of the codec system 495A can generate a reconstructed input frame 480 ($\hat{v}$) by adding the reconstructed residual 445 ($\hat{r}$) to the prediction frame 415A ($\hat{v}$), or vice versa. The reconstructed input frame 480 ($\hat{v}$) is a reconstructed and/or decoded version of the encoded frame data 485 ($v_e$) that attempts to reconstruct the input frame 420 ($v$) as closely as possible.

The codec system 495A can generate and/or output encoded frame data 485 ($v_e$) that encodes data corresponding to the input frame 420 ($v$). The encoded frame data 485 ($v_e$) of FIG. 4A is an inter-coded frame, such as a P-frame and/or a B-frame. The encoded frame data 485 ($v_e$) can include, for example, the encoded residual ($r_e$) and/or the encoded MS optical flow ($f_{MS\_e}$).

In some examples, the encoder 450 uses lossless compression to generate the encoded frame data 485 ($v_e$). In examples where the encoder 450 uses lossless compression to generate the encoded frame data 485 ($v_e$), the reconstructed input frame 480 ($\hat{v}$) can include all of the video data of the input frame 420 ($v$), the reconstructed MS optical flow 435 ($\hat{f}_{MS}$) can include all of the optical flow data of the MS optical flow 430 ($f_{MS}$), and/or the reconstructed residual 445

($\hat{r}$) can include all of the residual data of the residual 440 ($r$). In examples where the encoder 450 uses lossy compression to generate the encoded frame data 485 ($v_e$), the reconstructed input frame 480 ($\hat{v}$) can include similar video data to that of the input frame 420 ($v$), the reconstructed MS optical flow 435 ($\hat{f}_{MS}$) can include similar optical flow data to that of the MS optical flow 430 ($f_{MS}$), and/or the reconstructed residual 445 ($\hat{r}$) can include similar residual data to that of the residual 440 ($r$). In examples where the encoder 450 uses lossy compression to generate the encoded frame data 485 ($v_e$), the reconstructed input frame 480 ($\hat{v}$) can include one or more differences in video data compared to that of the input frame 420 ($v$), the reconstructed MS optical flow 435 ($\hat{f}_{MS}$) can include one or more differences in optical flow data compared to that of the MS optical flow 430 ($f_{MS}$), and/or the reconstructed residual 445 ($\hat{r}$) can include one or more differences in residual data compared to that of the residual 440 ($r$).

In some examples, the encoder 450 includes a transform coder that performs transformation coding on the input frame 420 ($v$) and/or on blocks thereof. In some examples, the transformation coding can be based on the residual 440 ($r$) in addition to the input frame 420 ($v$). In some examples, the transformation coding can include a discrete cosine transform (DCT), a modified discrete cosine transform (MDCT), a discrete sine transform (DST), a fast Fourier transform (FFT), a wavelet transform, or a combination thereof. In some examples, the encoder 450 includes a quantizer that performs quantization on the input frame 420 ($v$) and/or on blocks thereof, in some cases following transformation coding. A degree of quantization performed by the quantizer of the encoder 450 during the quantization can be based on a quantization parameter (QP), and can be modified by adjusting the QP. The QP can indicates a quantization step size for the input frame 420 ($v$) during quantization, and can control how much spatial detail is retained from the captured image after quantization. In some examples, the encoder 450 includes an entropy encoder that performs entropy coding, in some cases following transformation coding and/or quantization. Entropy coding may include, for example, context-adaptive binary arithmetic coding (CABAC), arithmetic coding, Golomb coding, Huffman coding, range coding, Shannon coding, Shannon-Fano coding, Shannon-Fano-Elias coding, Tunstall coding, unary coding, universal coding, or a combination thereof.

In some examples, the decoder 455 includes an inverse quantizer that performs inverse quantization on the encoded frame data 485 ($v_e$) and/or on blocks thereof. In some examples, the decoder 455 includes an inverse transform coder that performs an inverse transform on the encoded frame data 485 ($v_e$) and/or on blocks thereof, in some cases following inverse quantization.

In some examples, the autoencoder 460 of the codec system 495A may be split into two or more autoencoders. In an illustrative example, the autoencoder 460 of the codec system 495A can include a first autoencoder and a second autoencoder. The first autoencoder receives the MS optical flow 430 ($f_{MS}$) and outputs the reconstructed MS optical flow 435 ($\hat{f}_{MS}$). An encoder of the first autoencoder can output a first portion of the encoded frame data 485 ($v_e$). The second autoencoder receives the residual 440 ($r$) and outputs the reconstructed residual 445 ($\hat{r}$). An encoder of the second autoencoder can output a second portion of the encoded frame data 485 ($v_e$).

Figure 4B:
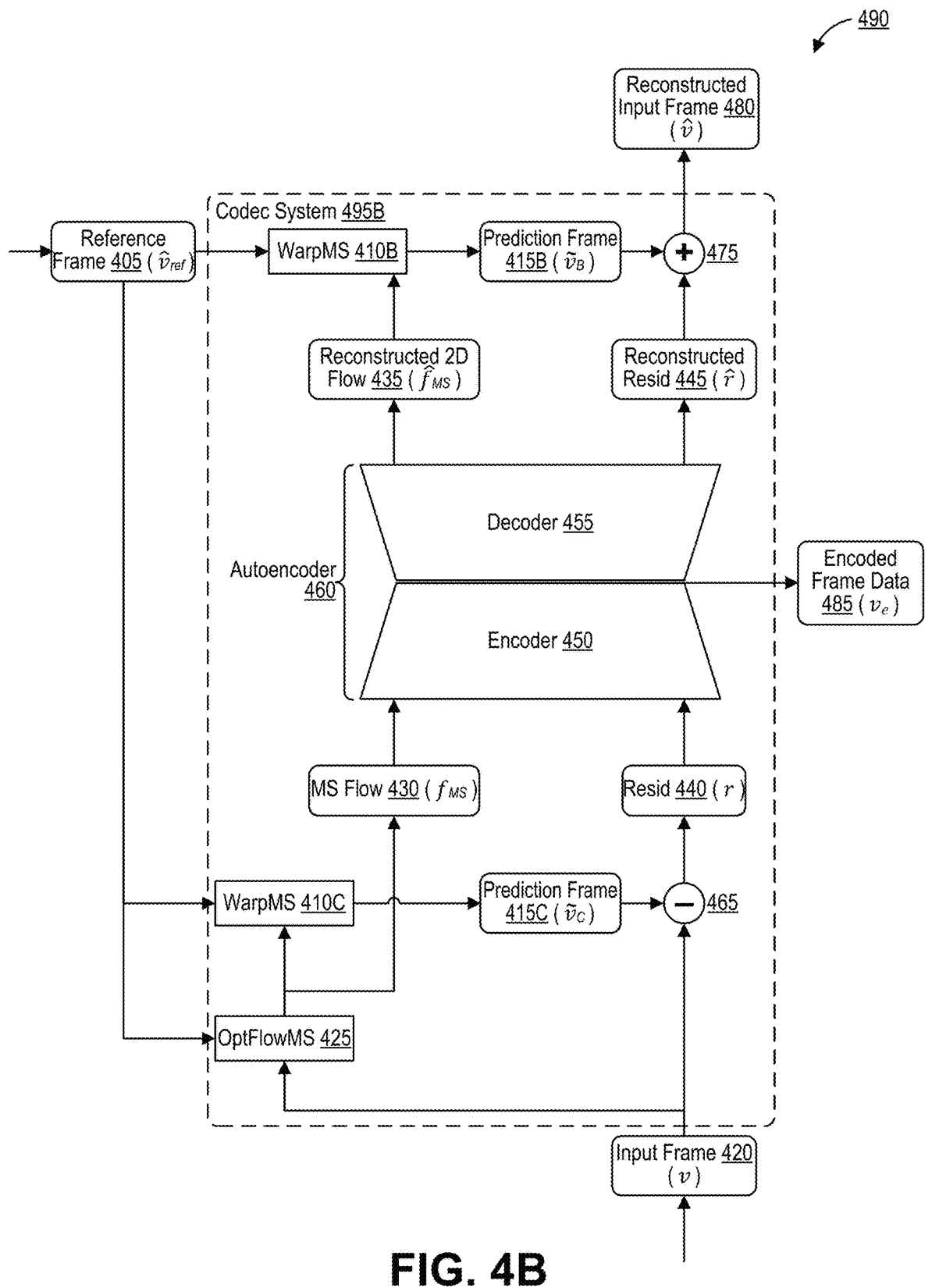
FIG. 4B is a conceptual diagram illustrating encoding and decoding of an inter-coded frame of video data using mutli-scale (MS) optical flow and MS warping.

FIG. 4B is a conceptual diagram 490 illustrating encoding and decoding of an inter-coded frame of video data using mutli-scale (MS) MSoptical flow and MSMS warping. A codec system 495B with a WarpMS engine 410B, a WarpMS engine 410C, an OptFlowMS engine 425, and an autoencoder 460 is illustrated. The codec system 495B of FIG. 4B is similar to the codec system 495A of FIG. 4A, but includes the WarpMS engine 410B and the WarpMS engine 410C in place of the WarpMS engine 410A of the codec system 495A of FIG. 4A.

The WarpMS engine 410C of the codec system 495B can receive the reference frame 405 ($\hat{v}_{ref}$) and the MS optical flow 430 ($f_{MS}$). The WarpMS engine 410C of the codec system 495B can generate a prediction frame 415C ($\hat{v}_C$) by warping the reference frame 405 ($\hat{v}_{ref}$) based on the motion vectors in the optical flow 430 ($f_{MS}$). The prediction frame 415C ($\hat{v}_C$) represents a prediction of the input frame 420 ($v$) based on the optical flow 430 ($f_{MS}$). The prediction frame 415C ($\hat{v}_C$) of FIG. 4B can differ from the prediction frame 415A ($\hat{v}$) of FIG. 4A because the prediction frame 415C ($\hat{v}_C$) of FIG. 4B is generated using the optical flow 430 ($f_{MS}$), while the prediction frame 415A ($\hat{v}$) of FIG. 4A is generated using the reconstructed MS optical flow 435 ($\hat{f}_{MS}$). The WarpMS engine 410C can pass the prediction frame 415C ($\hat{v}_C$) to the subtractor 465 of the codec system 495B. The subtractor 465 of the codec system 495B can receive the prediction frame 415C ($\hat{v}_C$) and the input frame 420 ($v$). The subtractor 465 of the codec system 495B can generate a residual 440 ($r$) by subtracting the prediction frame 415C ($\hat{v}_C$) from the input frame 420 ($v$), or vice versa. Because the prediction frame 415C ($\hat{v}_C$) of FIG. 4B may be different from the prediction frame 415A ($\hat{v}$) of FIG. 4A, the residual 440 ($r$) of FIG. 4B may also be different from the residual 440 ($r$) of FIG. 4A. An example of the warping of the reference frame 405 ($\hat{v}_{ref}$) based on the MS optical flow 430 ($f_{MS}$) by the WarpMS engine 410C of the codec system 495B to generate the prediction frame 415C ($\hat{v}_C$) is illustrated in FIG. 5.

The WarpMS engine 410B of the codec system 495B can receive the reference frame 405 ($\hat{v}_{ref}$) and the reconstructed MS optical flow 435 ($\hat{f}_{MS}$), more similarly to the WarpMS engine 410A of the codec system 495A. The WarpMS engine 410B of the codec system 495B can generate a prediction frame 415B ($\hat{v}_B$) by warping the reference frame 405 ($\hat{v}_{ref}$) based on the motion vectors in the reconstructed MS optical flow 435 ($\hat{f}_{MS}$). The prediction frame 415B ($\hat{v}_B$) represents a prediction of the input frame 420 ($v$) based on the reconstructed MS optical flow 435 ($\hat{f}_{MS}$). The prediction frame 415B ($\hat{v}_B$) can differ from the prediction frame 415C ($\hat{v}_C$) because the prediction frame 415B ($\hat{v}_B$) is generated using the reconstructed MS optical flow 435 ($\hat{f}_{MS}$), while the prediction frame 415C ($\hat{v}_C$) is generated using the optical flow 430 ($f_{MS}$) The WarpMS engine 410B can pass the prediction frame 415B ($\hat{v}_B$) to the adder 475 of the codec system 495B. The adder 475 of the codec system 495B can receive the prediction frame 415B ($\hat{v}_B$) and the reconstructed residual 445 ($\hat{r}$). The adder 475 of the codec system 495B can generate a reconstructed input frame 480 ($\hat{v}$) by adding the reconstructed residual 445 ($\hat{r}$) to the prediction frame 415B ($\hat{v}_B$), or vice versa. The reconstructed input frame 480 ($\hat{v}$) is a reconstructed and/or decoded version of the encoded frame data 485 ($v_e$) that attempts to reconstruct the input frame 420 ($v$) as closely as possible. An example of the warping of the reference frame 405 ($\hat{v}_{ref}$) based on the reconstructed MS optical flow 435 ($\hat{f}_{MS}$) by the WarpMS engine 410B of the codec system 495B to generate the prediction frame 415B ($\hat{v}_B$) is illustrated in FIG. 5. In some examples, the WarpMS engine 410C can be used in place of the WarpMS engine 410B, so that the prediction frame 415C ($\hat{v}_C$) (which is based on the MS optical flow 430 $f_{MS}$) is sent to the adder 475 instead of the prediction frame 415B ($\hat{v}_B$) (which is based on the reconstructed MS optical flow 435 $\hat{f}_{MS}$).

In some examples, the autoencoder 460 of the codec system 495B may be split into two or more autoencoders. In an illustrative example, the autoencoder 460 of the codec system 495B can include a first autoencoder and a second autoencoder. The first autoencoder receives the MS optical flow 430 ($f_{MS}$) and outputs the reconstructed MS optical flow 435 ($\hat{f}_{MS}$). An encoder of the first autoencoder can output a first portion of the encoded frame data 485 ($v_e$). The second autoencoder receives the residual 440 ($r$) and outputs the reconstructed residual 445 ($\hat{r}$). An encoder of the second autoencoder can output a second portion of the encoded frame data 485 ($v_e$).

FIG. 5 is a conceptual diagram 500 illustrating generating a prediction frame 565 using downscaled variants of a reference frame 505, an optical flow 515, and a differentially indexed weight map 530. The operations illustrated in FIG. 5 can be performed by a WarpMS engine of a codec device, such as the WarpMS engine 410A of the codec system 495A, the WarpMS engine 410B of the codec system 495B, and/or the WarpMS engine 410C of the codec system 495B. The WarpMS engine of the codec device receives the reference frame 505 ($\hat{v}_{ref}$) as an input. The left side of the conceptual diagram 500 shows a reference frame 505 ($\hat{v}_{ref}$), which may be an example of the reference frame 405 ($\hat{v}_{ref}$) of FIG. 4A and FIG. 4B.

The WarpMS engine of the codec device can perform one or more downscaling 510 operations on the reference frame 505 ($\hat{v}_{ref}$). In some examples, each of the downscaling 510 operations may include downscaling, downsampling, subsampling, Gaussian averaging, Gaussian blurring, Gaussian filtering, or a combination thereof. The downscaling 510 operations can be performed repeatedly to generate an image pyramid, a Gaussian pyramid, a Laplacian pyramid, a steerable pyramid, or a combination thereof. An example of an image pyramid is illustrated under the downscaling 510 label. The image pyramid includes the reference frame 505 ($\hat{v}_{ref}$) itself (or a copy thereof), labeled as the $0^{th}$ scale of the reference frame $\hat{v}_{ref\_0}$. The size of the $0^{th}$ scale of the reference frame $\hat{v}_{ref\_0}$ is the original size of the reference frame 505 ($\hat{v}_{ref}$). The image pyramid includes a copy of the reference frame 505 ($\hat{v}_{ref}$) that is downscaled using the downscaling 510, which is labeled as the $1^{st}$ scale of the reference frame $\hat{v}_{ref\_1}$ The image pyramid includes a copy of the $1^{st}$ scale of the reference frame $\hat{v}_{ref\_1}$ that is downscaled using the downscaling 510, which is labeled as the $2^{nd}$ scale of the reference frame $\hat{v}_{ref\_2}$ The image pyramid includes a copy of the $2^{nd}$ scale of the reference frame $\hat{v}_{ref\_2}$ that is downscaled using the downscaling 510, which is labeled as the $3^{rd}$ scale of the reference frame $\hat{v}_{ref\_3}$. In one illustrative example, each downscaling 510 cuts frame size in half. Thus, the size of the $1^{st}$ scale of the reference frame $\hat{v}_{ref\_1}$ is half of the original size of the reference frame 505 ($\hat{v}_{ref}$), the size of $2^{nd}$ scale the reference frame $\hat{v}_{ref\_2}$ is one fourth of the original size of the reference frame 505 ($\hat{v}_{ref}$), and the size of the $3^{rd}$ scale of the reference frame $\hat{v}_{ref\_3}$ is one eighth of the original size of the reference frame 505 ($\hat{v}_{ref}$). Each subsequent scale of the reference frame has a coarser level of detail than the previous one at least because each subsequent downscaling 510 reduces frame resolution (by reducing frame size). In some cases, each subsequent scale of the reference frame has a coarser level of detail than the previous one also because each downscaling 510 also smooths out the details using a Gaussian averaging, a Gaussian blur, and/or a Gaussian filter.

The WarpMS engine of the codec device receives a MS optical flow ($f_{MS}$) and/or a reconstructed MS optical flow ($\hat{f}_{MS}$) as an input. Either or both of a MS optical flow ($f_{MS}$) and/or a reconstructed MS optical flow ($\hat{f}_{MS}$) can be referred to as the MS optical flow ($f_{MS}$) with respect to FIG. 5. The MS optical flow ($f_{MS}$) of FIG. 5 can thus be an example of the MS optical flow 430 ($f_{MS}$) and/or of the reconstructed MS optical flow 435 ($\hat{f}_{MS}$) of FIG. 4A and/or FIG. 4B. The MS optical flow ($f_{MS}$) of FIG. 5 includes a 2D optical flow component over the x and y dimensions, referred to as the 2D optical flow 515 ($f_{xy}$). The 2D optical flow 515 ($f_{xy}$) of FIG. 5 may be an example of the 2D optical flow component ($f_{xy}$) of the MS optical flow 430 ($f_{MS}$) and/or of the reconstructed 2D optical flow component ($\hat{f}_{xy}$) of the reconstructed MS optical flow 435 ($\hat{f}_{MS}$) of FIG. 4A and/or FIG. 4B. The MS optical flow ($f_{MS}$) of FIG. 5 includes a weight map component over the z dimension, referred to as the weight map 530 ($f_z$). The weight map 530 ($f_z$) of FIG. 5 may be an example of the weight map component ($f_z$) of the MS optical flow 430 ($f_{MS}$) and/or of the reconstructed weight map component ($\hat{f}_z$) of the reconstructed MS optical flow 435 ($\hat{f}_{MS}$) of FIG. 4A and/or FIG. 4B.

The reference frame 505 ($\hat{v}_{ref}$) illustrates a horse race with four jockeys visible, each riding a respective horse. The horses and jockeys are in the foreground, with a background behind them. The background includes plants, buildings, fences, a metal post, and the sky. A large area of the 2D optical flow 515 ($f_{xy}$) corresponding to the sky (part of the background) is white, meaning that motion vectors corresponding to the sky (part of the background) have zero amplitude and/or direction of movement. The white area in the 2D optical flow 515 ($f_{xy}$) is labeled with text reading "white." The 2D optical flow 515 ($f_{xy}$) includes certain areas colored cyan and red, with varying saturation and/or chroma levels. Some of the cyan areas in the 2D optical flow 515 ($f_{xy}$) are labeled with text reading "cyan." Some of the red areas in the 2D optical flow 515 ($f_{xy}$) are labeled with text reading "red." These color labels are used so that color can still be expressed despite FIG. 5 being illustrated in monochrome. The varying saturation and/or chroma levels are expressed as varying darkness levels so that FIG. 5 so that FIG. 5 can be illustrated in monochrome, with darker areas in FIG. 5 corresponding to higher saturation and/or chroma levels in the 2D optical flow 515 ($f_{xy}$) and brighter areas in FIG. 5 corresponding to lower saturation and/or chroma levels in the 2D optical flow 515 ($f_{xy}$).

For example, an area of the 2D optical flow 515 ($f_{xy}$) corresponding to the leftmost horse and jockey in the reference frame 505 ($\hat{v}_{ref}$) is generally cyan, with varying saturation and/or chroma levels in different parts. The color cyan in the 2D optical flow 515 ($A_y$) indicates that the directions of the motion vectors for the pixels in areas colored cyan point to the left. Thus, the leftmost horse and jockey in the reference frame 505 ($\hat{v}_{ref}$) are moving to the left in a subsequent frame after the reference frame 505 ($\hat{v}_{ref}$), relative to the positions of the leftmost horse and jockey in the reference frame 505 ($\hat{v}_{ref}$). An area of the 2D optical flow 515 ($f_{xy}$) corresponding to the rightmost horse and jockey in the reference frame 505 ($\hat{v}_{ref}$) is generally red, with varying saturation and/or chroma levels in different parts. The color red in the 2D optical flow 515 ($f_{xy}$) indicates that the directions of the motion vectors for the pixels in areas colored cyan point to the right. Thus, the rightmost horse and jockey in the reference frame 505 ($\hat{v}_{ref}$) are moving to the right in a subsequent frame after the reference frame 505 ($\hat{v}_{ref}$), relative to the positions of the rightmost horse and jockey in the reference frame 505 ($\hat{v}_{ref}$). Essentially, the leftmost horse and jockey in the reference frame 505 ($\hat{v}_{ref}$) are pulling even further ahead, while the rightmost horse and jockey in the reference frame 505 ($\hat{v}_{ref}$) are falling even further behind. Parts of the 2D optical flow 515 ($f_{xy}$) that correspond to the plants, fences, buildings, and post in the reference frame 505 ($\hat{v}_{ref}$) are mostly cyan, with patches of red, with varying saturation and/or chroma levels in different parts. Thus, these portions of the background are most likely mostly moving to the left in a subsequent frame after the reference frame 505 ($\hat{v}_{ref}$), relative to the positions of these portions of the background in the reference frame 505 ($\hat{v}_{ref}$). The patches of red may indicate that certain portions of the background are moving to the right in a subsequent frame after the reference frame 505 ($\hat{v}_{ref}$), relative to the positions of these portions of the background in the reference frame 505 ($\hat{v}_{ref}$).

The WarpMS engine of the codec device can perform one or more downscaling 520 operations on the 2D optical flow 515 ($f_{xy}$). The downscaling 520 operations can include downscaling, downsampling, subsampling, Gaussian averaging, Gaussian blurring, Gaussian filtering, or a combination thereof. Like the downscaling 510 operations, the downscaling 520 operations can be performed repeatedly to generate an image pyramid, a Gaussian pyramid, a Laplacian pyramid, a steerable pyramid, or a combination thereof. An example of an image pyramid is illustrated under the downscaling 520 label. The image pyramid includes the 2D optical flow 515 ($f_{xy}$) itself (or a copy thereof), labeled as the $0^{th}$ scale of the 2D optical flow $f_{xy\_0}$. The size of the $0^{th}$ scale of the 2D optical flow $f_{xy\_0}$ is the original size of the 2D optical flow 515 ($f_{xy}$). The image pyramid includes a copy of the 2D optical flow 515 ($f_{xy}$) that is downscaled using the downscaling 520, which is labeled as the $1^{st}$ scale of the 2D optical flow $f_{xy\_1}$. The image pyramid includes a copy of the $1^{st}$ scale of the 2D optical flow $f_{xy\_1}$ that is downscaled using the downscaling 520, which is labeled as the $2^{nd}$ scale of the 2D optical flow $f_{xy\_2}$. The image pyramid includes a copy of the 2nd scale of the 2D optical flow $f_{xy\_2}$ that is downscaled using the downscaling 520, which is labeled as the 3rd scale of the 2D optical flow $f_{xy\_3}$. In one illustrative example, each downscaling 520 cuts the size of the optical flow in half. Thus, the size of the $1^{st}$ scale of the 2D optical flow $f_{xy\_1}$ is half of the original size of the 2D optical flow 515 ($f_{xy}$), the size of the $2^{nd}$ scale of the 2D optical flow $f_{xy\_2}$ is one fourth of the original size of the 2D optical flow 515 ($f_{xy}$), and the size of the 3rd scale of the 2D optical flow $f_{xy\_3}$ is one eighth of the original size of the 2D optical flow 515 ($f_{xy}$). Each subsequent scale of the 2D optical flow has a coarser level of detail than the previous one at least because each subsequent downscaling 520 reduces frame resolution (by reducing frame size). In some cases, each subsequent scale of the reference frame has a coarser level of detail than the previous one also because each downscaling 520 also smooths out the details using a Gaussian averaging, a Gaussian blur, and/or a Gaussian filter.

The WarpMS engine of the codec device can also perform one or more amplitude adjustment 525 operations on the 2D optical flow 515 ($f_{xy}$). The amplitude adjustment 525 operations may reduce the amplitudes of the motion vectors in the 2D optical flow at the same scale as the corresponding downscaling 520 operation reduces the scale of the 2D optical flow. The amplitude adjustment 525 may be performed by reducing saturation and/or chroma across each downscaled 2D optical flow by the same scale as the corresponding downscaling 520 operation reduces the scale of the 2D optical flow. In an illustrative example, if the Pt scale of the 2D optical flow $f_{xy\_1}$ is half of the original size of the 2D optical flow 515 ($f_{xy}$), then the amplitude adjustment 525 can reduce the saturation and/or chroma of all pixels in the $1^{st}$ scale of the 2D optical flow $f_{xy\_1}$ by half compared to the saturation and/or chroma of the 2D optical flow 515 ($f_{xy}$). Because higher saturation and/or chroma are illustrated as darker image areas in FIG. 5, and lower saturation and/or chroma are illustrated as brighter image areas in FIG. 5, the Pt scale of the 2D optical flow $f_{xy\_1}$ is illustrated as brighter overall than the $0^{th}$ scale of the 2D optical flow $f_{xy\_0}$. For instance, if the 2D optical flow 515 ($f_{xy}$) includes a pixel with a strongly saturated color that indicates a motion vector amplitude of 4 pixels, then a corresponding pixel in the Pt scale of the 2D optical flow $f_{xy\_1}$ will have a saturation reduced by half that indicates a motion vector amplitude of 2 pixels. Further, if the $2^{nd}$ scale of the 2D optical flow $f_{xy\_2}$ is half of the size of the Pt scale of the 2D optical flow $f_{xy\_1}$, then the amplitude adjustment 525 can reduce the saturation and/or chroma of all pixels in the $2^{nd}$ scale of the 2D optical flow $f_{xy\_2}$ by half compared to the saturation and/or chroma of the Pt scale of the 2D optical flow $f_{xy\_3}$. In the context of FIG. 5, the $2^{nd}$ scale of the 2D optical flow $f_{xy\_2}$ is illustrated as brighter overall than the Pt scale of the 2D optical flow $f_{xy\_1}$. If the 3rd scale of the 2D optical flow $f_{xy\_3}$ is half of the size of the $2^{nd}$ scale of the 2D optical flow $f_{xy\_2}$, then the amplitude adjustment 525 can reduce the saturation and/or chroma of all pixels in the $3^{rd}$ scale of the 2D optical flow $f_{xy\_3}$ by half compared to the saturation and/or chroma of the $2^{nd}$ scale of the 2D optical flow $f_{xy\_2}$. In the context of FIG. 5, the $3^{rd}$ scale of the 2D optical flow $f_{xy\_3}$ is illustrated as brighter overall than the $2^{nd}$ scale of the 2D optical flow $f_{xy\_2}$. The amplitude adjustment 525 operations allow a downscaled reference frame to be warped based on a downscaled 2D optical flow with appropriate motion vector amplitudes for the scale of both the downscaled reference frame and the downscaled 2D optical flow.

The weight map 530 ($f_z$) identifies a scale of certainty to uncertainty (and/or vice versa) in the optical flow estimation of the 2D optical flow 515 ($f_{xy}$). Different pixels in the reference frame 505 ($\hat{v}_{ref}$) and/or the 2D optical flow 515 ($f_{xy}$) may correspond to different weight values within a predetermined range (e.g., from zero to one, inclusive) in the weight map 530 ($f_z$). In the weight map 530 ($f_z$) of FIG. 5, black corresponds to a weight value of zero, white corresponds to a weight value of one, and shades of grey between black and white correspond to weight values between zero and one. In the context of FIG. 5, lower weight values in the weight map (e.g., lower than a predetermined weight threshold) correspond to higher degrees of certainty in the optical flow estimation (e.g., higher than a predetermined certainty threshold) and/or to lower degrees of uncertainty in the optical flow estimation (e.g., lower than a predetermined uncertainty threshold). In the context of FIG. 5, higher weight values in the weight map (e.g., higher than a predetermined weight threshold) correspond to lower degrees of certainty in the optical flow estimation (e.g., lower than a predetermined certainty threshold) and/or to higher degrees of uncertainty in the optical flow estimation (e.g., higher than a predetermined uncertainty threshold). For instance, areas in the weight map 530 ($f_z$) of FIG. 5 that correspond to the horses and jockeys in the reference frame 505 ($\hat{v}_{ref}$) are generally darker than areas in the in the weight map 530 ($f_z$) of FIG. 5 that correspond to the background in the reference frame 505 ($\ddot{v}_{ref}$), indicating that the movements of the horses and jockeys are generally determined to a higher level of certainty than the movements of the background. In some examples, the weight values may have the opposite relationship to certainty values and/or to uncertainty values. In some examples, weight maps may use the opposite relationship between weight value and shade of grey, with white corresponding to a weight value of one and black corresponding to a weight value of zero.

The WarpMS engine of the codec device can perform differentiable indexing 535 on the weight map 530 ($f_z$) to generate multiple differentially indexed weight maps. The multiple differentially indexed weight maps can each be based on a different range of values within the weight map 530 ($f_z$). The differentiable indexing 535 operation can map each range of values in the weight map 530 ($f_z$) to a zero-to-one range in a corresponding differentially indexed weight map. For instance, the differentiable indexing 535 operation can map all pixels having weight values between 0 and 0.25 in the weight map 530 ($f_z$) to a zero-to-one range in a corresponding differentially indexed weight map $f_{z\_0}$. The differentiable indexing 535 operation can map all pixels having weight values between 0.25 and 0.50 in the weight map 530 ($f_z$) to a zero-to-one range in a corresponding differentially indexed weight map $f_{z\_1}$. The differentiable indexing 535 operation can map all pixels having weight values between 0.50 and 0.75 in the weight map 530 ($f_z$) to a zero-to-one range in a corresponding differentially indexed weight map $f_{z\_2}$. The differentiable indexing 535 operation can map all pixels having weight values between 0.75 and 1.00 in the weight map 530 ($f_z$) to a zero-to-one range in a corresponding differentially indexed weight map $f_{z\_3}$. Examples of the differentiable indexing 535 are illustrated in FIG. 6. The differentiable indexing 535 can generate as many differentially indexed weight maps as there are scales in the downscaling 510 image pyramid for the reference frame 505 ($\hat{v}_{ref}$) and/or in the downscaling 520 image pyramid for the 2D optical flow 515 ($f_{xy}$). For example, in FIG. 5, there are four scales in the downscaling 510 image pyramid for the reference frame 505 ($\hat{v}_{ref}$) and in the downscaling 520 image pyramid for the 2D optical flow 515 ($f_{xy}$). Thus, the differentiable indexing 535 generates four differentially indexed weight maps based on four different ranges of weight values in the weight map 530 ($f_z$).

The WarpMS engine of the codec device can perform one or more downscaling 540 operations on at least a subset of the differentially indexed weight maps. The downscaling 540 operations can downscale certain of the differentially indexed weight maps to a size of one of the downscaled reference frames and/or to a size of one of the downscaled 2D optical flows. For example, in FIG. 5, there are three downscaled variants of the reference frame 505 ($\hat{v}_{ref}$) in the downscaling 510 image pyramid, and three downscaled variants of the 2D optical flow 515 ($f_{xy}$) in the downscaling 520 image pyramid. Thus, three of the differentially indexed weight maps are downscaled during the downscaling 540 operations, to match the sizes of the three respective downscaled variants of the reference frame 505 ($\hat{v}_{ref}$) and of the three downscaled variants of the 2D optical flow 515 ($f_{xy}$). The downscaling 540 operations can include downscaling, downsampling, subsampling, Gaussian averaging, Gaussian blurring, Gaussian filtering, or a combination thereof.

The WarpMS engine of the codec device performs a warping operation 550 for each scale i of the reference frame 505 ($\hat{v}_{ref}$), the 2D optical flow 515 ($f_{xy}$), and the weight map 530 ($f_z$). The warping operation 550 for each scale i is performed by the WarpMS engine following the formula $f_{z\_i} \cdot \text{warp2D}(\hat{v}_{ref\_i} \cdot f_{xy\_i})$. In this formula, warp2D ( ) represents a 2D warping operation based on optical flow. For instance, warping at the $0^{th}$ scale is performed based on the formula $f_{z\_0} \cdot \text{warp2D}(\hat{v}_{ref\_0} \cdot f_{xy\_0})$, generating a warped frame at the $0^{th}$ scale. Warping at the $1^{st}$ scale is performed based on the formula $f_{z\_1} \cdot \text{warp2D}(\hat{v}_{ref\_1} \cdot f_{xy\_1})$, generating a warped frame at the $1^{st}$ scale. Warping at the $2^{nd}$ scale is performed based on the formula $f_{z\_2} \cdot \text{warp2D}(\hat{v}_{ref\_2} \cdot f_{xy\_2})$, generating a warped frame at the $2^{nd}$ scale. Warping at the 3rd scale is performed based on the formula $f_{z\_3} \text{ warp2D}(\hat{v}_{ref\_3} \cdot f_{xy\_3})$, generating a warped frame at the $3^{rd}$ scale.

The WarpMS engine of the codec device performs an upscaling 555 operation of all warped frames at scales higher than the $0^{th}$ scale to the size of the warped frame of the $0^{th}$ scale (e.g., to the size of the reference frame 505 $\hat{v}_{ref}$). The upscaling 555 operation may be referred to as an inverse pyramid.

The WarpMS engine of the codec device performs a sum 560 operation of all of the warped frames generated during the warping operation 550, after upscaling during the upscaling 555 operation (for scales greater than 0). The sum 560 operation produces the prediction frame 565 ($\hat{v}$). The prediction frame 565 ($\hat{v}$) of FIG. 5 may be an example of the prediction frame 415A ($\hat{v}$) of FIG. 4A and/or prediction frame 415B ($\hat{v}$) FIG. 4B.

Because of the multiplier effect of the differentially indexed weight maps $f_{z\_i}$, 2D warping operations having a high certainty (and therefore low weight values in the weight map 530 $f_z$) are given a high multiplier for the finer scales (e.g., $0^{th}$ and $1^{st}$ in FIG. 5) and a low multiplier for the coarser scales (e.g., $2^{nd}$ and $3^{rd}$ in FIG. 5). On the other hand, 2D warping operations having a low certainty (and therefore high weight values in the weight map 530 $f_z$) are given a high multiplier for the coarser scales (e.g., $2^{nd}$ and $3^{rd}$ in FIG. 5) and a low multiplier for the finer scales (e.g., $0^{th}$ and $1^{st}$ in FIG. 5).

FIG. 6 is a conceptual diagram 600 illustrating differentiable indexing 640 of a weight map 630. The weight map 630 ($f_z$) of FIG. 6 can be the weight map 530 ($f_z$) of FIG. 5. The weight map 630 ($f_z$) is generated as an image that includes a value between zero to one (the range may be inclusive or exclusive), each of which is illustrated in FIG. 6 as a shade of grey selected from a range of shades of grey from white to black (and in some examples, inclusive of white and/or black). In the exemplary weight map 630 ($f_z$) of FIG. 6, black corresponds to a weight value of zero, white corresponds to a weight value of one, and shades of grey between black and white correspond to weight values between zero and one. In some examples, weight maps may use the opposite relationship between weight value and shade of grey, with white corresponding to a weight value of one and black corresponding to a weight value of zero.

Four differentially indexed weight maps 650A-650D are generated based on the weight map 630 ($f_z$) using differentiable indexing 640. All values ranging from 0 to 0.25 in the weight map 630 ($f_z$) are mapped to a 0 to 1 range in the finest ($0^{th}$) scale weight map 650A ($f_{z\_0}$). All values ranging from 0.25 to 0.5 in the weight map 630 ($f_z$) are mapped to a 0 to 1 range in the fine ($1^{st}$) scale weight map 650B ($f_{z\_1}$). All values ranging from 0.5 to 0.75 in the weight map 630 ($f_z$) are mapped to a 0 to 1 range in the coarse ($2^{nd}$) scale weight map 650C ($f_{z\_2}$). All values ranging from 0.5 to 0.75 in the weight map 630 ($f_z$) are mapped to a 0 to 1 range in the coarsest ($3^{rd}$) scale weight map 650D ($f_{z\_3}$). In the differentially indexed weight maps 650A-650D of FIG. 6, black corresponds to a differentially indexed weight value of zero, white corresponds to a differentially indexed weight value of one, and shades of grey between black and white correspond to differentially indexed weight values between zero and one. In some examples, differentially indexed weight maps 650A-650D may use the opposite relationship between differentially indexed weight value and shade of grey, with white corresponding to a differentially indexed weight value of one and black corresponding to a differentially indexed weight value of zero.

In some examples, values in the weight map 630 ($f_z$) that are less than the range corresponding a particular one of the differentially indexed weight maps 650A-650D are given the value zero in that one of the differentially indexed weight maps 650A-650D. For example, values falling below 0.25 can be given the value zero in the differentially indexed weight map 650B. In some examples, values in the weight map 630 ($f_z$) that are greater than the range corresponding a particular one of the differentially indexed weight maps 650A-650D are given the value zero in that one of the differentially indexed weight maps 650A-650D. For example, values falling below 0.50 can be given the value zero in the differentially indexed weight map 650B. In some examples, values in the weight map 630 ($f_z$) that are greater than the range corresponding a particular one of the differentially indexed weight maps 650A-650D are given the value one in that one of the differentially indexed weight maps 650A-650D. For example, values falling below 0.50 can be given the value one in the differentially indexed weight map 650B. In some examples, the sum of the differentially indexed weight values for a particular pixel location in all four differentially indexed weight maps 650A-650D is one. For instance, for a particular pixel location, the sum of the differentially indexed weight value for that pixel location in the finest ($0^{th}$) scale weight map 650A ($f_{z\_0}$), the differentially indexed weight value for that pixel location in the fine ($1^{st}$) scale weight map 650B ($f_{z\_1}$), the differentially indexed weight value for that pixel location in the coarse ($2^{nd}$) scale weight map 650C ($f_{z\_2}$), and the differentially indexed weight value for that pixel location in the coarsest (3rd) scale weight map 650D ($f_{z\_3}$) is one.

It should be understood that any less than or equal to operator ("≤") in the ranges of FIG. 6 can be replaced by a less than operator ("<"). It should be understood that any less than operator ("<") in the ranges of FIG. 6 can be replaced by a less than or equal to operator ("≤"). For instance, the range for the finest ($0^{th}$) scale weight map 650A ($f_{z\_0}$) is written in FIG. 6 as 0≤px<0.25, but can be 0≤px≤0.25, 0<px<0.25, or 0≤px<0.25, according to some examples. The range for the fine ($1^{st}$) scale weight map 650B ($f_{z\_1}$) is written in FIG. 6 as 0.25≤px<0.50, but can be 0.25≤px≤0.50, 0.25<px≤0.50, or 0.25<px<0.50, according to some examples. The range for the coarse ($2^{nd}$) scale weight map 650C ($f_{z\_2}$) is written in FIG. 6 as 0.50≤px<0.75, but can be 0.50≤px≤0.75, 0.50<px≤0.75, or 0.50<px<0.75, according to some examples. The range for the coarsest (3rd) scale weight map 650D ($f_{z\_3}$) is written in FIG. 6 as 0.75≤px<1.00, but can be 0.75≤px≤1.00, 0.75<px≤1.00, or 0.75<px<1.00, according to some examples. In some examples, the differential indexing 640 may generate less than four differentially indexed weight maps (e.g., 2 or 3 differentially indexed weight maps). In some examples, the differential indexing 640 may generate more than four differentially indexed weight maps (e.g., 5, 6, 7, 8, 9, 10, 11, 12, 13, 14, 15, or more than 15 differentially indexed weight maps).

Figure 7A:
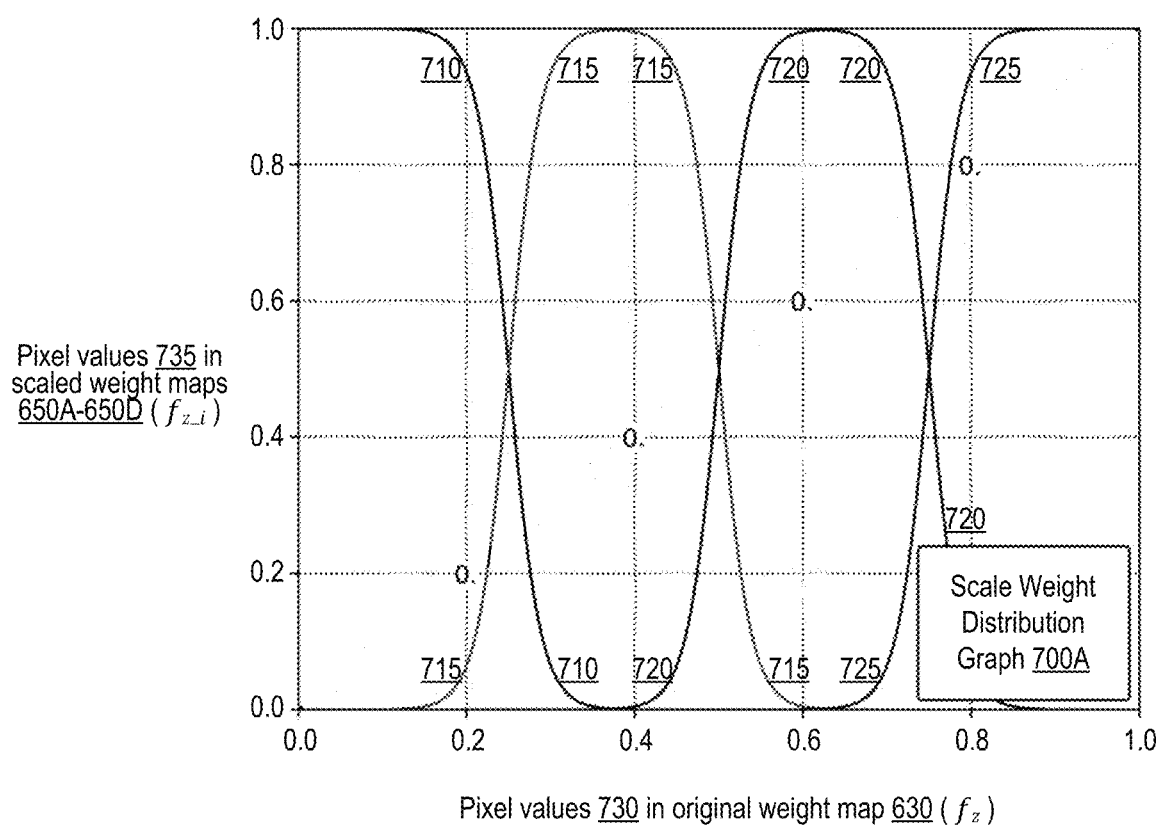
FIG. 7A illustrates a scale weight distribution graph for differentiable indexing of a weight map according to some examples.

FIG. 7A illustrates a scale weight distribution graph 700A for differentiable indexing 640 of a weight map 630 according to some examples. The scale weight distribution graph 700A includes a horizontal axis representing pixel values 730 in the original weight map 630 ($f_z$), ranging from 0 to 1. The scale weight distribution graph 700 includes a vertical axis representing pixel values 735 in the four differentially indexed weight maps 650A-650D. A first curve 710 represents the finest ($0^{th}$) scale weight map 650A ($f_{z\_0}$). A second curve 715 represents the fine ($1^{st}$) scale weight map 650B ($f_{z\_1}$). A third curve 720 represents the coarse ($2^{nd}$) scale weight map 650C ($f_{z\_2}$). A fourth curve 725 represents the coarsest (3rd) scale weight map 650D ($f_{z\_3}$). The scale weight distribution graph 700 identifies how the different ranges of weight values from the original weight map 630 ($f_z$) are mapped to the four differentially indexed weight maps 650A-650D according to some examples.

Figure 7B:
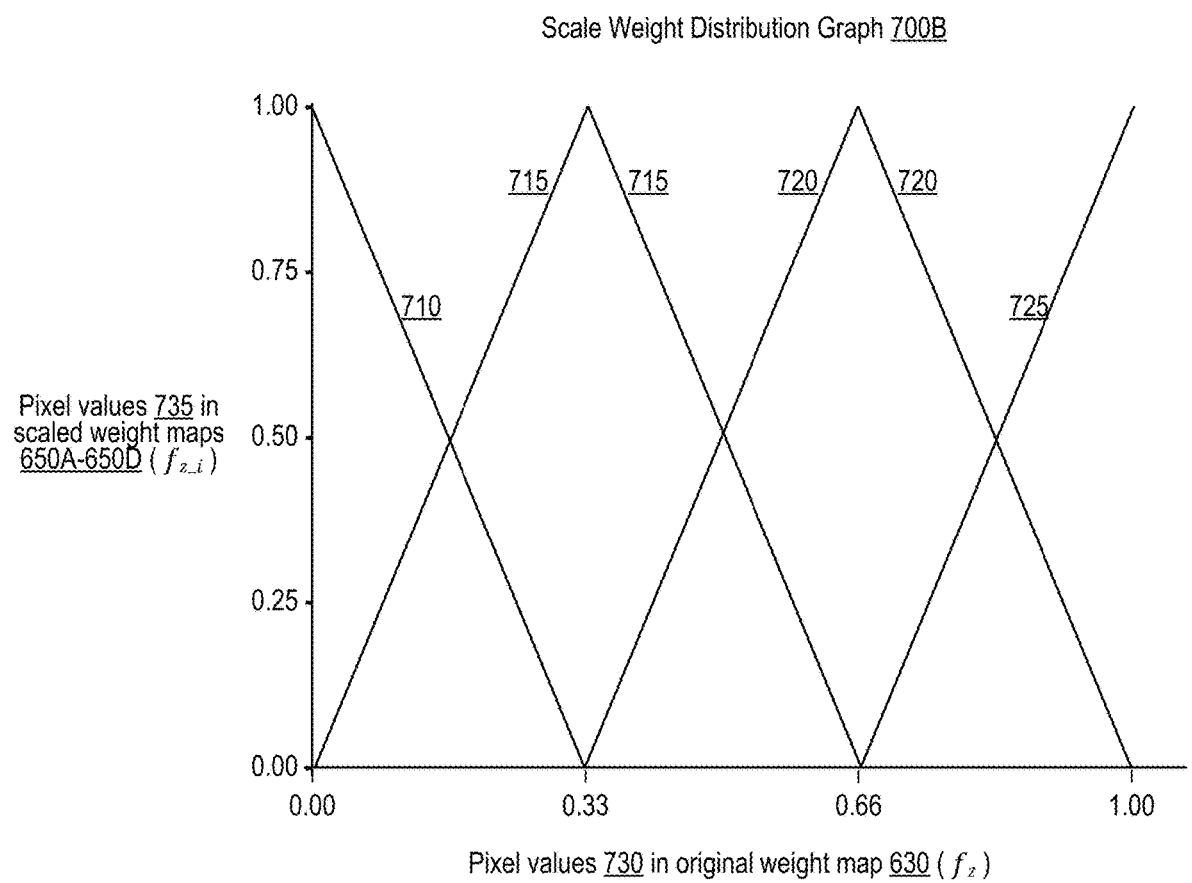
FIG. 7B illustrates a scale weight distribution graph for differentiable indexing of a weight map according to some examples.

FIG. 7B illustrates a scale weight distribution graph 700B for differentiable indexing 640 of a weight map 630 according to some examples. Like the scale weight distribution graph 700A, the scale weight distribution graph 700B includes a horizontal axis representing pixel values 730 in the original weight map 630 ($f_z$) and a vertical axis representing pixel values 735 in the four differentially indexed weight maps 650A-650D. The first curve 710 represents the finest ($0^{th}$) scale weight map 650A ($f_{z\_0}$). The second curve 715 represents the fine ($1^{st}$) scale weight map 650B ($f_{z\_1}$). The third curve 720 represents the coarse ($2^{nd}$) scale weight map 650C ($f_{z\_2}$). The fourth curve 725 represents the coarsest (3rd) scale weight map 650D ($f_{z\_3}$). The scale weight distribution graph 700 identifies how the different ranges of weight values from the original weight map 630 ($f_z$) are mapped to the four differentially indexed weight maps 650A-650D according to some examples.

Figure 8:
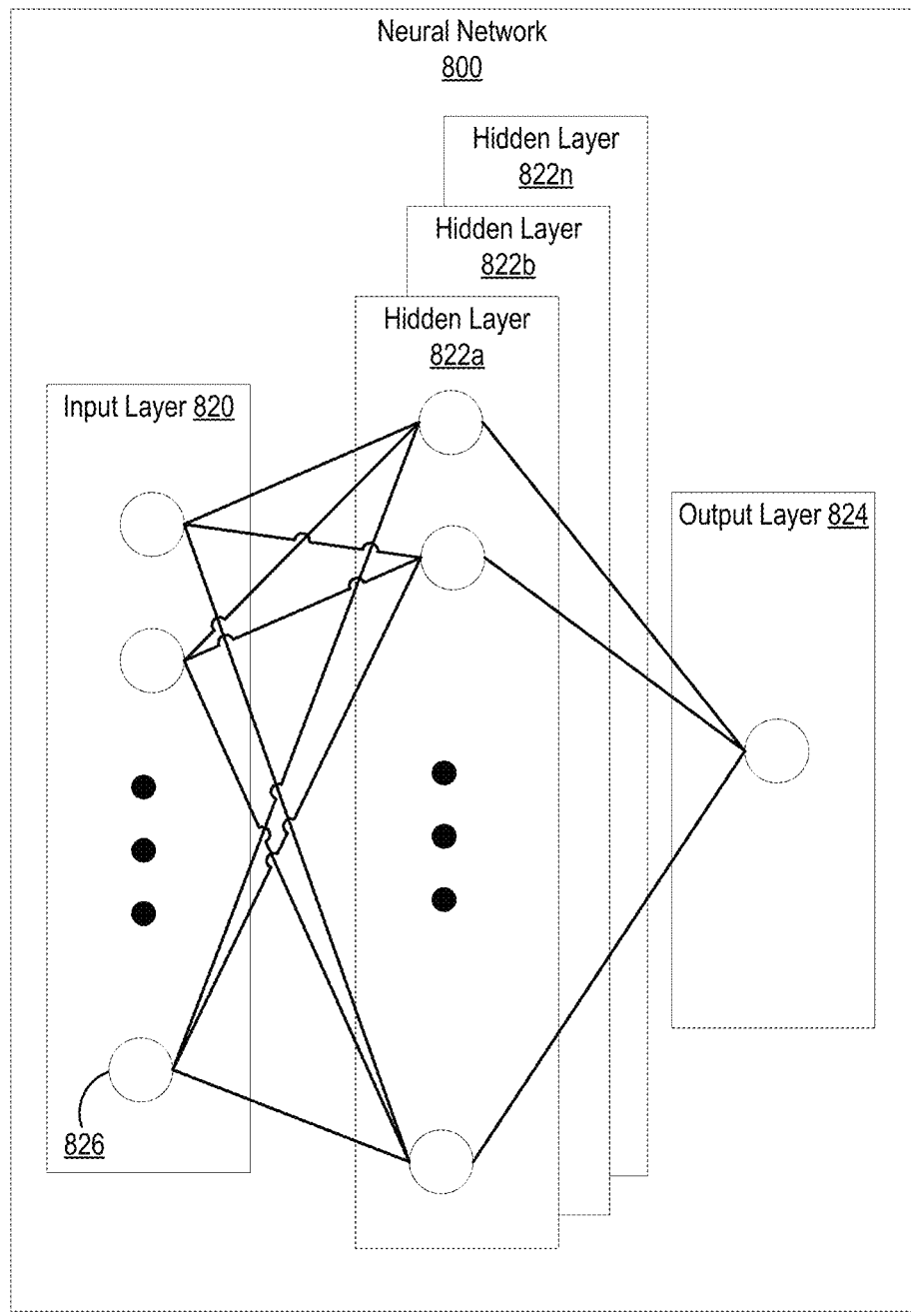
FIG. 8 is a block diagram illustrating an example of a neural network, in accordance with some examples.

FIG. 8 is a block diagram illustrating an example of a neural network 800, in accordance with some examples. As noted above, various aspects of the present disclosure can be performed using an intelligence engine. The intelligence engine may include, for example, one or more artificial intelligence algorithms, one or more machine learning models trained using training data input into one or more machine learning algorithms, one or more neural networks, or a combination thereof. The neural network 800 of FIG. 8 can be used to implement the encoding device 104, the decoding device 112, the codec system 295, the autoencoder 260, the encoder 250, the decoder 255, the codec system 395A, the codec system 395B, the autoencoder 360, the encoder 350, the decoder 355, the OptFlow2D engine 325, the Warp2D engine 310A, the Warp2D engine 310B, the Warp2D engine 310C, the codec system 495A, the codec system 495B, the autoencoder 460, the encoder 450, the decoder 455, the OptFlowMS engine 425, the WarpMS engine 410A, the WarpMS engine 410B, the WarpMS engine 410C, the convolutional neural network (CNN) 900, the multi-scale warping engine 1000A, the multi-scale warping engine 1000B, the codec device discussed with respect to FIG. 11A, the codec device discussed with respect to FIG. 11B, the computing system 1200, or a combination thereof. The neural network 800 of FIG. 8 can be used to implement any operations described herein as performed by any of the above-listed devices, such as generating 2D optical flow, generating MS optical flow, generating a weight map, 2D warping, MS warping, encoding, decoding, generating a prediction frame, or a combination thereof.

An input layer 820 includes input data. In one illustrative example, the input layer 820 can include data representing the pixels of an input image captured by one of the one or more cameras 210. The image may be a video frame. The neural network 800 includes multiple hidden layers 822$a$, 822$b$, through 822$n$. The hidden layers 822$a$, 822$b$, through 822$n$ include "n" number of hidden layers, where "n" is an integer greater than or equal to one. The number of hidden layers can be made to include as many layers as needed for the given application. The neural network 800 further includes an output layer 824 that provides an output resulting from the processing performed by the hidden layers 822a, 822b, through 822n. In one illustrative example, the output layer 824 can provide an optical flow and/or weight map for an object in an input video frame. In one illustrative example, the output layer 824 can provide an encoded version of an input video frame.

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 824, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to generate a 2D optical flow, generate a MS optical flow, generate a weight map, 2D warp a frame based on a 2D optical flow, MS warp a frame based on a MS optical flow, encode data, decode data, generate a prediction frame, or a combination thereof. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 824. In an example in which the neural network 800 is used to identify objects in images, the neural network 800 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying objects in images, the forward pass can include passing a training image through the neural network 800. The weights are initially randomized before the neural network 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 800 is unable to determine low level features and thus cannot make an accurate determination (e.g., of optical flow or weight mapping for a particular area of a frame) might be. A loss function can be used to analyze error in the output. Any suitable loss function definition can be used. One example of a loss function includes a mean squared error (MSE). The MSE is defined as $E_{total}=\Sigma \frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, w denotes the initial weight, and 11 denotes a learning rate. The learning rate can be set to any suitable value, with a high learning rate including larger weight updates and a lower value indicating smaller weight updates.

The neural network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 800 can include any other deep network other than a CNN, such as an autoencoder, a deep belief nets (DBNs), a Recurrent Neural Networks (RNNs), among others.

Figure 9:
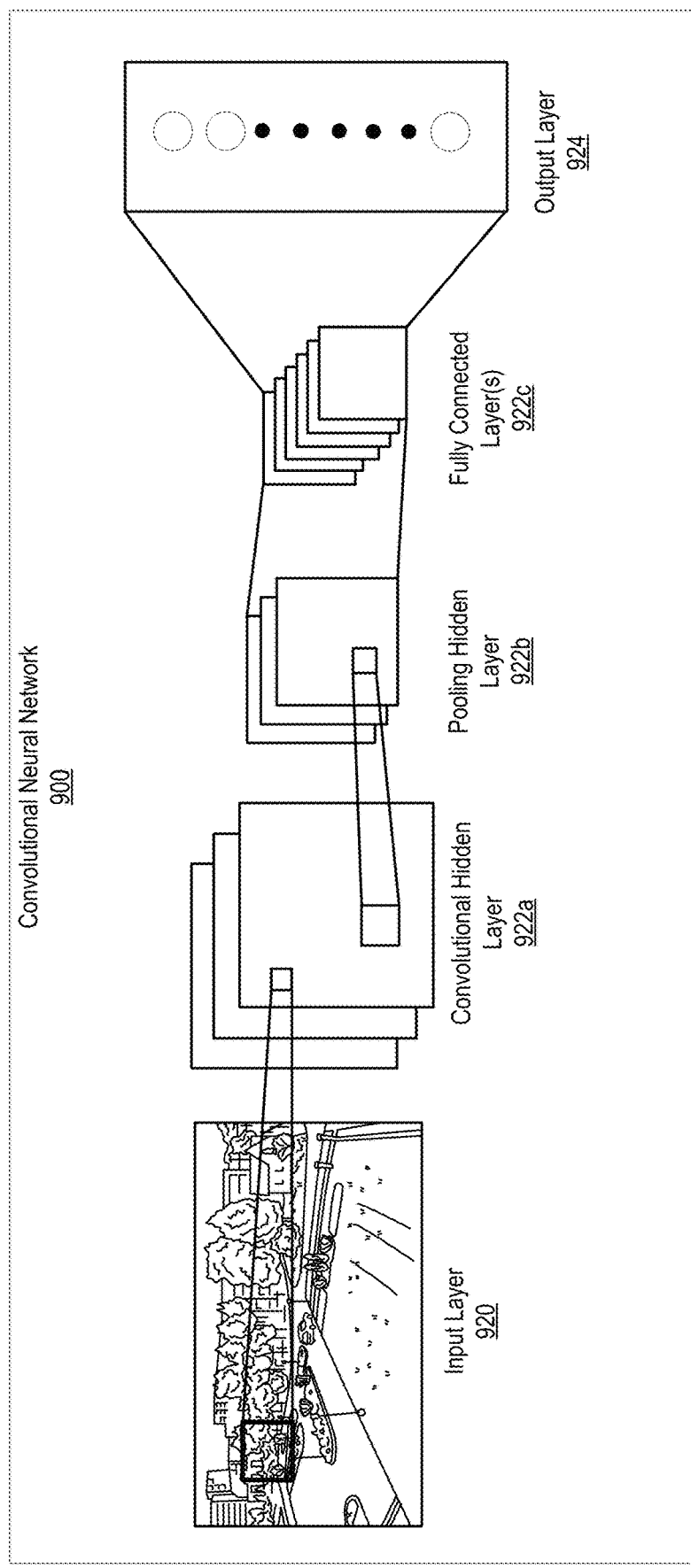
FIG. 9 is a block diagram illustrating an example of a convolutional neural network (CNN), in accordance with some examples.

FIG. 9 is a block diagram illustrating an example of a convolutional neural network (CNN) 900, in accordance with some examples. The input layer 920 of the CNN 900 includes data representing an image, such as an image captured by one of the one or more cameras 210. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922a, an optional non-linear activation layer, a pooling hidden layer 922b, and fully connected hidden layers 922c to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can generate a 2D optical flow, generate a MS optical flow, generate a weight map, 2D warp a frame based on a 2D optical flow, MS warp a frame based on a MS optical flow, encode data, decode data, generate a prediction frame, or a combination thereof.

The first layer of the CNN 900 is the convolutional hidden layer 922a. The convolutional hidden layer 922a analyzes the image data of the input layer 920. Each node of the convolutional hidden layer 922a is connected to a region of nodes (pixels) of the input image called a receptive field. The convolutional hidden layer 922a can be considered as one or more filters (each filter corresponding to a different activation or feature map), with each convolutional iteration of a filter being a node or neuron of the convolutional hidden layer 922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922a. Each connection between a node and a receptive field for that node learns a weight and, in some cases, an overall bias such that each node learns to analyze its particular local receptive field in the input image. Each node of the hidden layer 922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922a is due to each node of the convolutional layer being applied to its corresponding receptive field. For example, a filter of the convolutional hidden layer 922a can begin in the top-left corner of the input image array and can convolve around the input image. As noted above, each convolutional iteration of the filter can be considered anode or neuron of the convolutional hidden layer 922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922a.

The mapping from the input layer to the convolutional hidden layer 922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 922a can include several activation maps in order to identify multiple features in an image. The example shown in FIG. 9 includes three activation maps. Using three activation maps, the convolutional hidden layer 922a can detect three different kinds of features, with each feature being detectable across the entire image.

In some examples, a non-linear hidden layer can be applied after the convolutional hidden layer 922a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 900 without affecting the receptive fields of the convolutional hidden layer 922a.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a stride (e.g., equal to a dimension of the filter, such as a stride of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling hidden layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922c can obtain the output of the previous pooling hidden layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922b to obtain probabilities for the different classes. For example, if the CNN 900 is being used to generate an optical flow high values will be present in the activation maps that represent high-level features of motion of a visual element from one frame to another.

In some examples, the output from the output layer 924 can include an M-dimensional vector (in the prior example, M=10), where M can include data corresponding to possible motion vector directions in an optical flow, possible motion vector amplitudes in an optical flow, possible weight values in a weight map, and the like. In one illustrative example, if a 9-dimensional output vector represents ten different possible values is [0 0 0.05 0.8 0 0.15 0 0 0], the vector indicates that there is a 5% probability of the third value, an 80% probability of the fourth value, and a 15% probability of the sixth value. The probability for a possible value can be considered a confidence level or certainty level for that value (e.g., for that motion vector direction, for that motion vector amplitude, for that weight value, etc.).

Figure 10A:
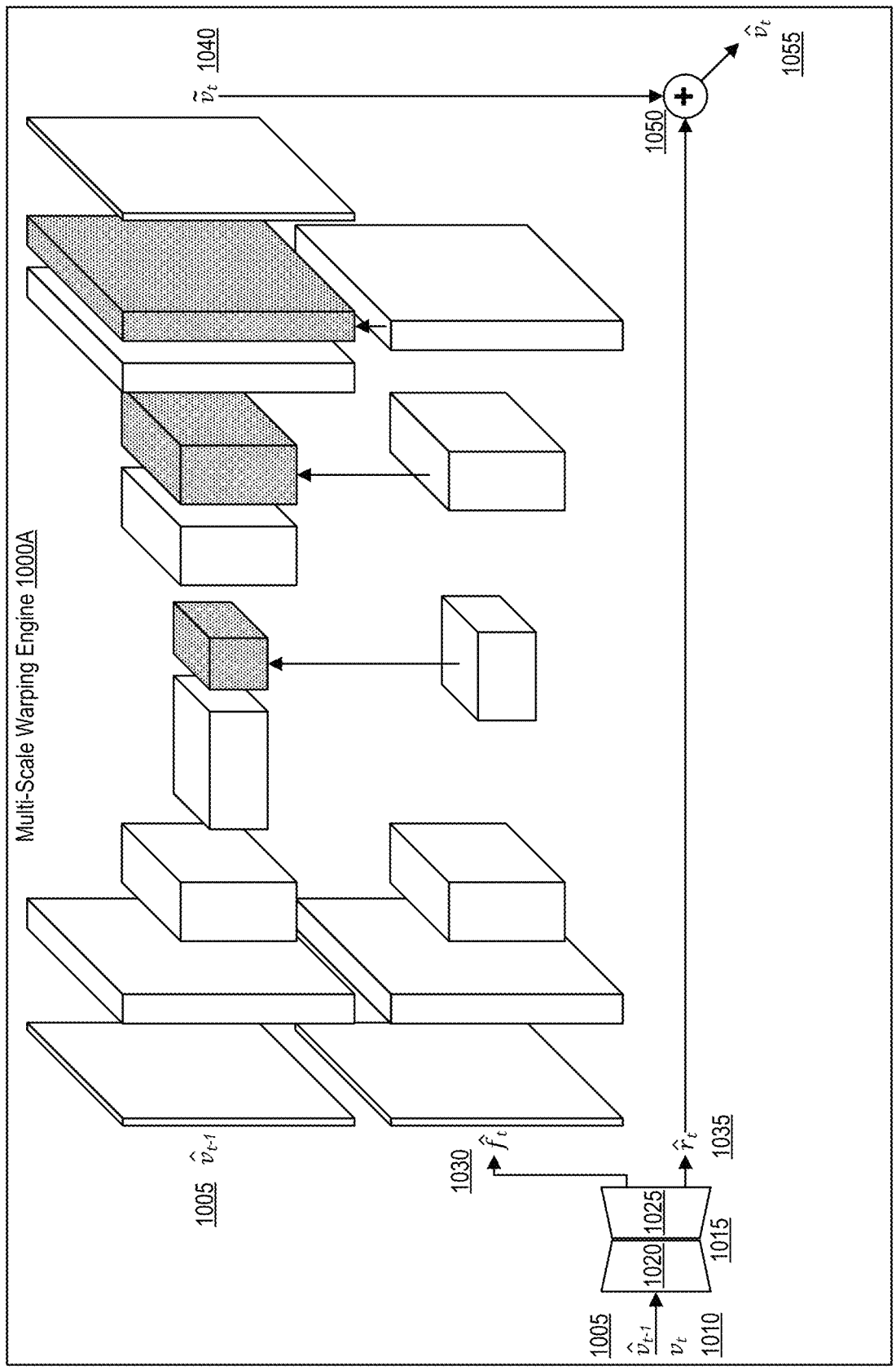
FIG. 10A is a conceptual diagram illustrating a multi-scale warping engine that warps the reference frame in the feature domain using one or more autoencoders based on one or more trained neural networks.

FIG. 10A is a conceptual diagram illustrating a multi-scale warping engine 1000A that warps the reference frame 1005 in the feature domain using one or more autoencoders based on one or more trained neural networks. Data corresponding to an input frame 1010 at time t ($v_t$) and a reference frame 1005 at time t−1 ($v_{t-1}$) are input into an autoencoder 1015 comprising an encoder 1020 and a decoder 1025. The data corresponding to the input frame 1010 ($v_t$) and the reference frame 1005 ($v_{t-1}$) may include a MS optical flow indicating movement from the time t−1 to the time t ($f_t$) (not pictured) and a corresponding residual ($r_t$) (not pictured). The autoencoder 1015 may output a reconstructed optical flow 1030 ($\hat{f}_t$) and a reconstructed residual 1035 ($\hat{r}_t$).

The reference frame 1005 ($v_{t-1}$) is passed through a first autoencoder (represented by a series of blocks that each represent sets of layers in a CNN 900). The reconstructed optical flow 1030 ($\hat{f}_t$) is passed through a second autoencoder (represented by a series of blocks that each represent sets of layers in a second CNN 900). The first autoencoder may include warping blocks in which warping is performed in the feature space. The reconstructed optical flow 1030 ($\hat{f}_t$), as converted into the feature space using the second autoencoder, can be used to perform the warping of the reference frame 1005 ($v_{t-1}$) that has been converted into the feature space by the first autoencoder. The first autoencoder can generate the prediction frame 1040 at time t ($\hat{v}_t$), which may be a prediction of the input frame 1010 ($v_t$). The prediction frame 1040 ($\hat{v}_t$) and the reconstructed residual 1035 ($\hat{r}_t$) can be added together by an adder 1050 to generate the reconstructed input frame 1055 ($\hat{v}_t$). The reconstructed input frame 1055 ($\hat{v}_t$) can be a reconstructed version of the input frame 1010 ($v_t$). The prediction frame 1040 ($\hat{v}_t$) can also be subtracted from the input frame 1010 ($v_t$) by a subtractor (not pictured) to generate the residual ($r_t$).

Figure 10B:
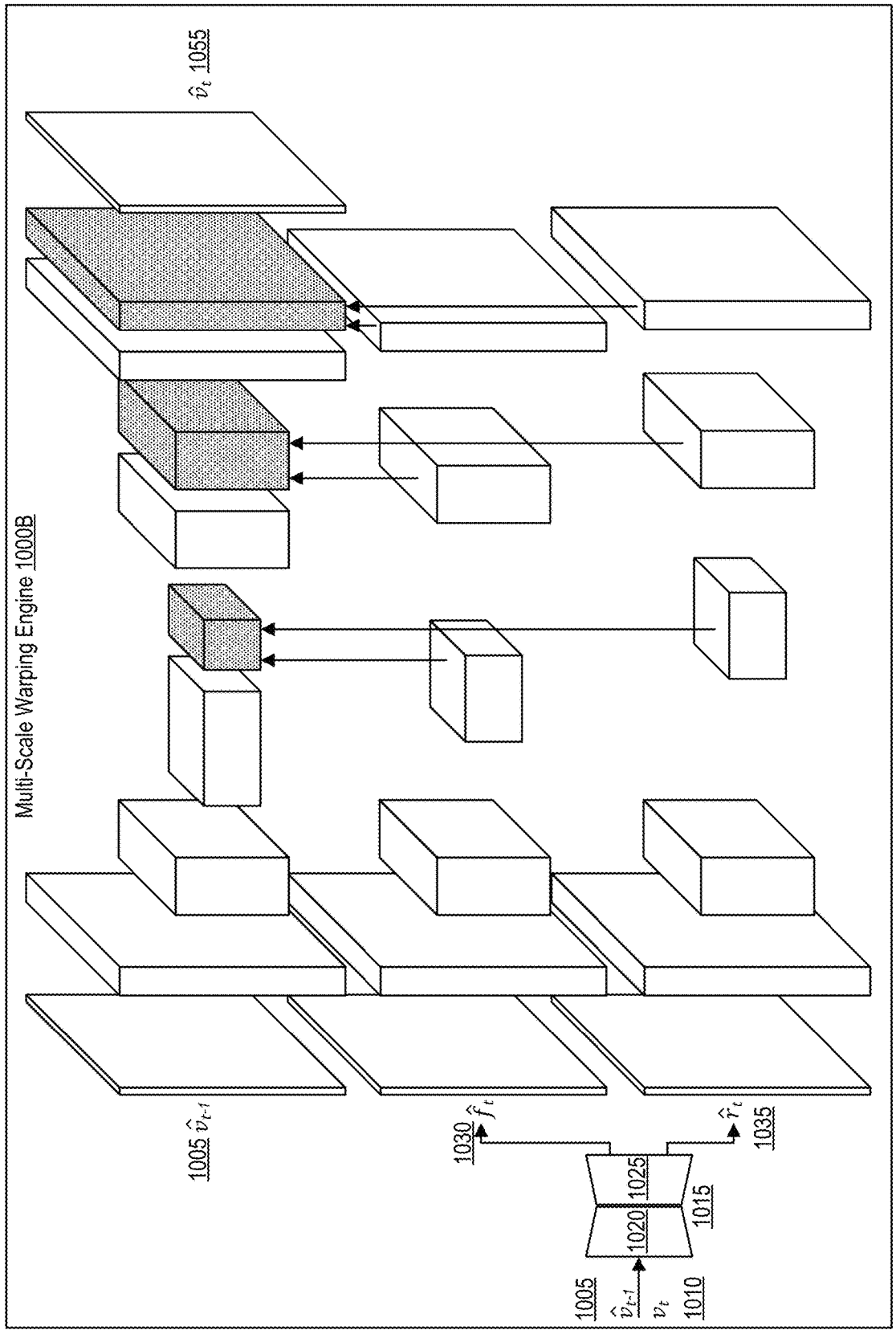
FIG. 10B is a conceptual diagram illustrating a multi-scale warping engine that warps the reference frame in the feature domain and performs residual compensation in the feature domain using one or more autoencoders based on one or more trained neural networks.

FIG. 10B is a conceptual diagram illustrating a multi-scale warping engine 1000B that warps the reference frame 1005 in the feature domain and performs residual compensation in the feature domain using one or more autoencoders based on one or more trained neural networks. The multi-scale warping engine 1000B is similar to the multi-scale warping engine 1000A, but includes a third autoencoder that the reconstructed residual 1035 ($\hat{r}_t$) is passed through. The warping blocks of the first autoencoder receive a feature set version of the reconstructed residual 1035 ($\hat{r}_t$), and the first autoencoder is thus able to generate the reconstructed residual 1035 ($\hat{r}_t$) in the feature space.

The multi-scale warping engine 1000A may be an example of the codec system 495A of FIG. 4A and/or of the codec system 495B of FIG. 4B. The multi-scale warping engine 1000B may be an example of the codec system 495A of FIG. 4A and/or of the codec system 495B of FIG. 4B.

Figure 11A:
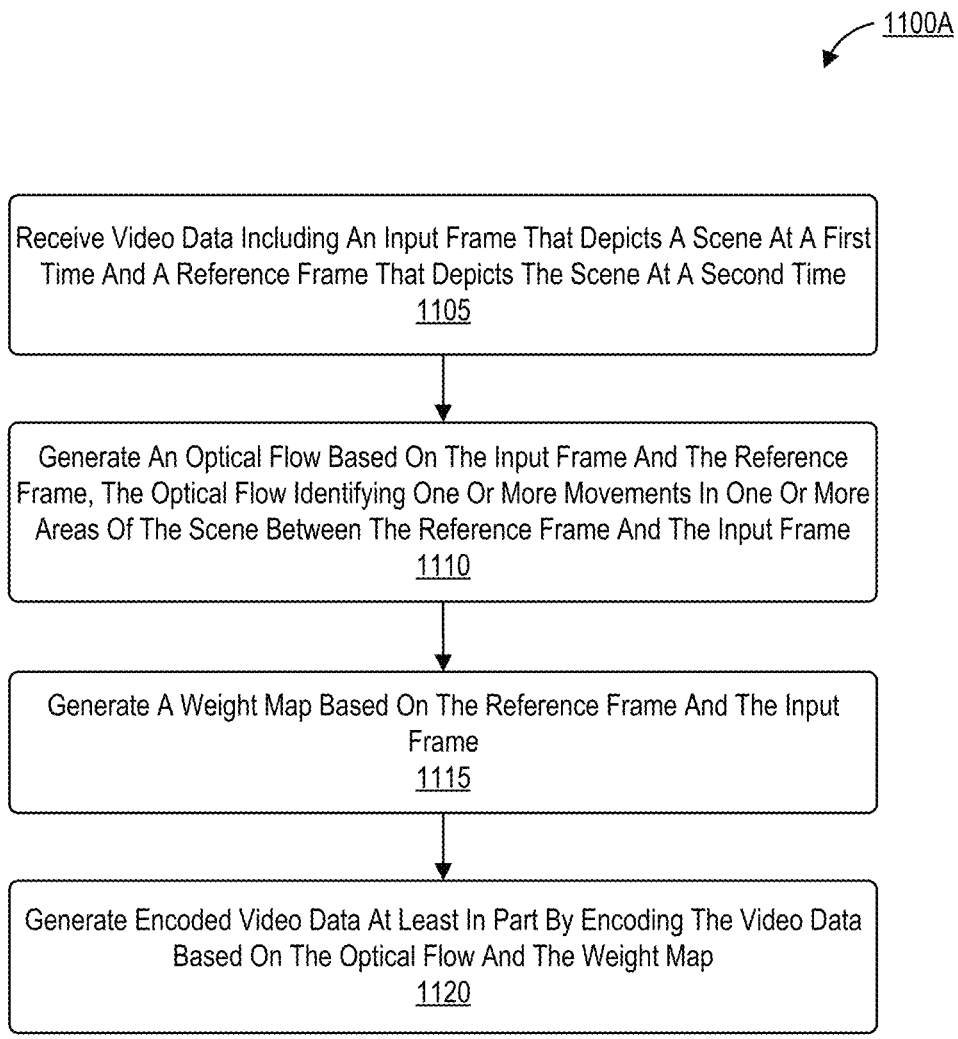
FIG. 11A is a flow diagram illustrating an example of a process for data encoding, in accordance with some examples.

FIG. 11A is a flow diagram illustrating an example of a process 1100A for data encoding, in accordance with some examples. The process 1100A illustrated by the flow diagram of FIG. 11A may be performed by a codec device. The codec device may be, or may include, an encoding device 104, a decoding device 112, a video source 102, a video destination device 122, a codec system 295, an autoencoder 260, an encoder 250, a decoder 255, a codec system 395A, a codec system 395B, an autoencoder 360, an encoder 350, a decoder 355, an OptFlow2D engine 325, a Warp2D engine 310A, a Warp2D engine 310B, a Warp2D engine 310C, a codec system 495A, a codec system 495B, an autoencoder 460, an encoder 450, a decoder 455, an OptFlowMS engine 425, a WarpMS engine 410A, a WarpMS engine 410B, a WarpMS engine 410C, a neural network (NN) 800, a convolutional neural network (CNN) 900, a multi-scale warping engine 1000A, a multi-scale warping engine 1000B, an image capture device, a video capture device, an image processing device, a video processing device, an image capture and processing device, a video capture and processing device, a camera, a mobile handset, a wearable device, a head-mounted display (HMD) device, a vehicle, one or more network servers of a cloud service, a computing system 1200, another type of system or device discussed herein, or some combination thereof.

At operation 1105, the codec device receives video data including an input frame that depicts a scene at a first time and a reference frame that depicts the scene at a second time. For example, the codec device can receive the video data from a video source 102, such as a camera, and image capture device, an image processing device, or a combination thereof. Examples of the input frame of operation 1105 include the input frame 220 ($v$), the input frame 320 ($v$), the input frame 420 ($v$), input frame 1010 at time t ($v_t$), another input frame described herein, or a combination thereof. Examples of the reference frame of operation 1105 include the reference frame 305 ($\hat{v}_{ref}$), the reference frame 405 ($\hat{v}_{ref}$), the reference frame 505 ($\hat{v}_{ref}$) the reference frame 1005 at time t−1 ($v_{t-1}$), another reference frame described herein, or a combination thereof.

In some examples, the first time is after the second time. For instance, the time t of FIGS. 10A-10B is an example of the first time. The time t−1 of FIGS. 10A-10B is an example of the second time. In some examples, the first time is before the second time. In some examples, the first time is contemporaneous with the second time (e.g., if the input frame and the reference frame are captured using different cameras and/or different image sensors).

In some examples, the reference frame is encoded as an intra-coded frame in the encoded video data. In some examples, the input frame is encoded as an intra-coded frame in the encoded video data. For instance, the input frame is encoded as an intra-coded frame in FIG. 2. In some examples, the input frame is encoded as an inter-coded frame in the encoded video data. For instance, the input frame is encoded as an in inter-coded frame in FIGS. 3A-3B, in FIGS. 4A-4B, and in FIGS. 10A-10B.

At operation 1110, the codec device generates an optical flow based on the input frame and the reference frame. The optical flow identifies one or more movements in one or more areas of the scene between the reference frame and the input frame. Examples of the optical flow of operation 1110 include the 2D optical flow 330 ($f_{2D}$), the reconstructed 2D optical flow 335 ($\hat{f}_{2D}$), the 2D optical flow component of the MS optical flow 430 ($f_{MS}$), the 2D optical flow component of the reconstructed MS optical flow 435 ($\hat{f}_{MS}$), the 2D optical flow 515 ($f_{xy}$), the reconstructed optical flow 1030 ($\hat{f}_t$) (and/or a 2D optical flow component thereof), another type of optical flow discussed herein, or a combination thereof. The codec device can downscale the optical flow, for instance using downscaling 520. The codec device can adjust the amplitudes in the optical flow, for instance using amplitude adjustment 525.

In some examples, the codec device generates the optical flow based on the input frame and the reference frame using one or more trained neural networks. For instance, codec device can generate the optical flow using one or more trained NNs of the encoding device 104, one or more trained NNs of the decoding device 112, one or more trained NNs of the autoencoder 260, one or more trained NNs of the encoder 250, one or more trained NNs of the decoder 255, one or more trained NNs of the OptFlow2D engine 325, one or more trained NNs of the autoencoder 360, one or more trained NNs of the encoder 350, one or more trained NNs of the decoder 355, one or more trained NNs of the OptFlowMS engine 425, one or more trained NNs of the autoencoder 460, one or more trained NNs of the encoder 450, one or more trained NNs of the decoder 455, one or more of the NN 800, one or more of the CNN 900, one or more NNs of the mutli-scale warping engine 1000A, one or more NNs of the mutli-scale warping engine 1000B, another NN discussed herein, or a combination thereof.

In some examples, the optical flow of operation 1110 is a two-dimensional optical flow, such as the 2D optical flow 330 ($f_{2D}$), the reconstructed 2D optical flow 335 ($\hat{f}_{2D}$), the 2D optical flow component of the MS optical flow 430 ($f_{MS}$), the 2D optical flow component of the reconstructed MS optical flow 435 ($\hat{f}_{MS}$), the 2D optical flow 515 ($f_{xy}$), the reconstructed optical flow 1030 ($\hat{f}_t$) (and/or a 2D optical flow component thereof), another type of optical flow discussed herein, or a combination thereof. The one or more movements that the optical flow identify can be movements along a plane having two perpendicular dimensions. The two perpendicular dimensions can be a vertical dimension (y) and a horizontal dimension (x). In some aspects, the optical flow identifies a direction of movement and an amplitude of movement for each pixel of the input frame. In some aspects, the optical flow is identified and/or stored using an optical flow image. The direction of movement can be identified based on a hue in the optical flow image. The amplitude of movement can identified based on a saturation in the optical flow image. The 2D optical flow 515 ($f_{xy}$) of FIG. 5 is illustrated as an optical flow image, with darker areas representing areas having a higher saturation, and with the hue of darkened areas identified through text overlaid over the darkened areas.

At operation 1115, the codec device generates a weight map based on the reference frame and the input frame. Examples of the weight map of operation 1115 include the weight map component ($f_z$) of the MS optical flow 430 ($f_{MS}$), the reconstructed weight map component ($\hat{f}_z$) of the reconstructed MS optical flow 435 ($\hat{f}_{MS}$), the weight map 530 ($f_z$), the weight map 530 ($f_z$) that is differentially indexed using differential indexing 535, the differentially indexed weight map $f_{z\_0}$ of FIG. 5, differentially indexed weight map $f_{z\_1}$ of FIG. 5, differentially indexed weight map $f_{z\_2}$ of FIG. 5, differentially indexed weight map $f_{z\_3}$ of FIG. 5, the weight map 630 ($f_z$), the weight map 630 ($f_z$) differentially indexed using differential indexing 640, the finest ($0^{th}$) scale weight map 650A ($f_{z\_0}$), the fine ($1^{st}$) scale weight map 650B ($f_{z\_1}$), the coarse ($2^{nd}$) scale weight map 650C ($f_{z\_2}$), the coarsest (3rd) scale weight map 650D ($f_{z\_3}$), reconstructed weight map component ($\hat{f}_z$) of the reconstructed optical flow 1030 ($\hat{f}_t$), another type of weight map discussed herein, or a combination thereof. The codec device can downscale the weight map, for instance using downscaling 540. In some examples, the weight map may be identified and/or stored using a weight map image, with higher weights appearing darker in the weight map image and lower weights appearing brighter in the weight map image (or vice versa). Examples of the weight map image are provided in the illustrations of the weight map 530 ($f_z$), the differentially indexed weight map $f_{z\_0}$ of FIG. 5, differentially indexed weight map $f_{z\_1}$ of FIG. 5, differentially indexed weight map $f_{z\_2}$ of FIG. 5, differentially indexed weight map $f_{z\_3}$ of FIG. 5, the weight map 630 ($f_z$), the finest ($0^{th}$) scale weight map 650A ($f_{z\_0}$), the fine ($1^{st}$) scale weight map 650B ($f_{z\_1}$), the coarse ($2^{nd}$) scale weight map 650C ($f_{z\_2}$), and the coarsest (3rd) scale weight map 650D ($f_{z\_3}$).

In some examples, the codec device generates the weight map based on the input frame and the reference frame using one or more trained neural networks. For instance, codec device can generate the weight map using one or more trained NNs of the encoding device 104, one or more trained NNs of the decoding device 112, one or more trained NNs of the autoencoder 260, one or more trained NNs of the encoder 250, one or more trained NNs of the decoder 255, one or more trained NNs of the OptFlow2D engine 325, one or more trained NNs of the autoencoder 360, one or more trained NNs of the encoder 350, one or more trained NNs of the decoder 355, one or more trained NNs of the OptFlowMS engine 425, one or more trained NNs of the autoencoder 460, one or more trained NNs of the encoder 450, one or more trained NNs of the decoder 455, one or more of the NN 800, one or more of the CNN 900, one or more NNs of the mutli-scale warping engine 1000A, one or more NNs of the mutli-scale warping engine 1000B, another NN discussed herein, or a combination thereof.

At operation 1120, the codec device generates encoded video data at least in part by encoding the video data based on the optical flow and the weight map. In some examples, the encoded video data is decodable using a decoder compliant with one or more video coding standards. In some examples, the codec device may behave as an encoding device 104, and may send the encoded video data to a decoding device 112 over a communications link 120. In some examples, the codec device can send the encoded video data to a video destination device 122. Examples of the encoded video data of operation 1120 include the encoded frame data 285 ($v_e$), the encoded frame data 385 ($v_e$), the encoded frame data 485 ($v_e$), other encoded frame data discussed herein, other encoded video data discussed herein, or a combination thereof. Encoding of the video data to generate the encoded video data may be performed by an encoder portion of the codec device. Examples of the encoder include the encoding device 104, the encoder 250, the encoder 350, the encoder 450, an encoder portion of the mutli-scale warping engine 1000A, an encoder portion of the mutli-scale warping engine 1000B, another encoder discussed herein, or a combination thereof. In some aspects, encoding the video data based on the optical flow and the weight map includes compressing the video data based on the optical flow and the weight map. Compressing the video data based on the optical flow and the weight map may be performed using any compression scheme.

In some examples, the codec device can generate a prediction frame at least in part by warping the reference frame based on the optical flow and the weight map. For instance, the codec system 495B generates the prediction frame 415C ($\hat{v}_C$) by warping the reference frame 405 ($\hat{v}_{ref}$) based on the 2D optical flow component ($f_{xy}$) of the MS optical flow 430 ($f_{MS}$) and the weight map component ($f_z$) of the MS optical flow 430 ($f_{MS}$) using the WarpMS engine 410C. Examples of the prediction frame can include the prediction frame 315A ($\hat{v}$), the prediction frame 315B ($\hat{v}_B$), the prediction frame 315C ($\hat{v}_C$), the prediction frame 415A ($\hat{v}$), the prediction frame 415B ($\hat{v}_B$), the prediction frame 415C ($\hat{v}_C$), the prediction frame 565 ($\hat{v}$), the prediction frame 1040 ($\hat{v}$), another prediction frame described herein, or a combination thereof. The codec device can generate a residual based on a difference between the input frame and the prediction frame. For instance, the codec system 495B generates the residual 440 ($r$) based on a difference (calculated by the subtractor 465) between the input frame 420 ($v$) and the prediction frame 415C ($\hat{v}_C$). Examples of the residual include the residual 340 ($\hat{r}$), the reconstructed residual 345 ($\hat{r}$), the residual 440 ($r$), the reconstructed residual 445 ($\hat{r}$), a residual ($r$) (not pictured) of FIG. 10A, a residual ($r$) (not pictured) of FIG. 10B, the reconstructed residual 1035 ($\hat{r}_t$), another residual described herein, or a combination thereof. Encoding the video data based on the optical flow and the weight map as in operation 1120 can include encoding the video data based on the residual.

The codec device can warp the reference frame based on the optical flow and the weight map using one or more trained neural networks using one or more trained neural networks. For instance, codec device can warp the reference frame based on the optical flow and the weight map using one or more trained NNs of the encoding device 104, one or more trained NNs of the decoding device 112, one or more trained NNs of the autoencoder 260, one or more trained NNs of the encoder 250, one or more trained NNs of the decoder 255, one or more trained NNs of the OptFlow2D engine 325, one or more trained NNs of the Warp2D engine 310A, one or more trained NNs of the Warp2D engine 310B, one or more trained NNs of the Warp2D engine 310C, one or more trained NNs of the autoencoder 360, one or more trained NNs of the encoder 350, one or more trained NNs of the decoder 355, one or more trained NNs of the OptFlowMS engine 425, one or more trained NNs of the WarpMS engine 410A, one or more trained NNs of the WarpMS engine 410B, one or more trained NNs of the WarpMS engine 410C, one or more trained NNs of the autoencoder 460, one or more trained NNs of the encoder 450, one or more trained NNs of the decoder 455, or more trained NNs of the warp engine 550, one or more of the NN 800, one or more of the CNN 900, one or more NNs of the mutli-scale warping engine 1000A, one or more NNs of the mutli-scale warping engine 1000B, another NN discussed herein, or a combination thereof.

In some examples, the codec device warping the reference frame based on the optical flow and the weight map includes several operations itself. For instance, the codec device can generate at least a first differentially indexed weight map and a second differentially indexed weight map based on the weight map. Examples of the first differentially indexed weight map and/or the second differentially indexed weight map include the differentially indexed weight map $f_{z\_0}$ of FIG. 5, differentially indexed weight map $f_{z\_1}$ of FIG. 5, differentially indexed weight map $f_{z\_2}$ of FIG. 5, differentially indexed weight map $f_{z\_3}$ of FIG. 5, the finest ($0^{th}$) scale weight map 650A ($f_{z\_0}$), the fine ($1^{st}$) scale weight map 650B ($f_{z\_1}$), the coarse ($2^{nd}$) scale weight map 650C ($f_{z\_2}$), and the coarsest ($3^{rd}$) scale weight map 650D ($f_{z\_3}$). The codec device can generate the first differentially indexed weight map and/or the second differentially indexed weight map using differentiable indexing 535, differentiable indexing 640, or a combination thereof. The codec device can generate the first differentially indexed weight map and/or the second differentially indexed weight map using differentiable indexing 535, differentiable indexing 640, or a combination thereof. The codec device can generate a first warped frame at least in part by warping the reference frame based on the optical flow. The codec device can generate a second warped frame at least in part by warping a downscaled variant of the reference frame based on a downscaled variant of the optical flow. Referring to the warping operation 550 of FIG. 5, the codec device can generate the first warped frame and/or the second warped frame using the following portion of the formula: warp2D($\hat{v}_{ref\_i}$, $f_{xy\_i}$). The first warped frame and the second warped frame may differ because different values of i are used in the formula. For instance, for the first warped frame, i can be zero, while for the second warped frame, i can be a positive integer greater than zero (e.g., 1, 2, 3).

The codec device can downscale the downscaled variant of the reference frame using the downscaling 510. The codec device can downscale the downscaled variant of the optical flow using the downscaling 520. In some aspects, the codec device can also adjust amplitudes 525 of the downscaled variant of the optical flow, before or after downscaling using the downscaling 520. The codec device can determine a first product of the first warped frame and the first differentially indexed weight map. The codec device can determine a second product of the second warped frame and the second differentially indexed weight map. Referring to the warping operation 550 of FIG. 5, the codec device can generate the first product and/or the second product using the formula $f_{z\_i}$·warp2D($\hat{v}_{ref\_i}$·$f_{xy\_i}$) The first product and the second product may differ because different values of i are used in the formula. For instance, for the first product, i can be zero, while for the second product, i can be a positive integer greater than zero (e.g., 1, 2, 3). The codec device can determine a sum of the first product and an upscaled variant of the second product. The codec device can perform the upscaling for the upscaled variant of the second product using the upscaling 555. The codec device can determine the sum using the sum 560. The sum may produce the prediction frame. For instance, in reference to FIG. 5, the sum 560 produces the prediction frame 565 ($\tilde{v}$).

In some examples, the codec device can generate a reconstructed optical flow based on the optical flow. For instance, the codec system 495A generates the reconstructed MS optical flow 435 ($\hat{f}_{MS}$) based on the MS optical flow 430 ($f_{MS}$). The codec system 495A generates the reconstructed 2D optical flow component ($\hat{f}_{xy}$) of the reconstructed MS optical flow 435 ($\hat{f}_{MS}$) based on the 2D optical flow component ($\hat{f}_{xy}$) of the MS optical flow 430 ($f_{MS}$). The codec device can generate a reconstructed weight map based on the weight map. For instance, the codec system 495A generates the reconstructed MS optical flow 435 ($f_{MS}$) based on the MS optical flow 430 ($f_{MS}$). The codec system 495A generates the reconstructed weight map component ($\hat{f}_z$) of the reconstructed MS optical flow 435 ($f_{MS}$) based on the weight map component ($f_z$) of the MS optical flow 430 ($f_{MS}$). The codec device generates a prediction frame at least in part by warping the reference frame based on the reconstructed optical flow and the reconstructed weight map. For instance, the codec system 495A generates the prediction frame 415A ($\hat{v}$) by warping the reference frame 405 ($\hat{v}_{ref}$) based on the reconstructed MS optical flow 435 ($\hat{f}_{MS}$) using the WarpMS engine 410A. The codec system 495A can generate the prediction frame 415A ($\hat{v}$) by warping the reference frame 405 ($\hat{v}_{ref}$) based on reconstructed 2D optical flow component ($\hat{f}_{xy}$) of the reconstructed MS optical flow 435 ($\hat{f}_{MS}$) and the reconstructed weight map component ($\hat{f}_z$) of the reconstructed MS optical flow 435 ($\hat{f}_{MS}$) using the WarpMS engine 410A. Examples of the prediction frame can include the prediction frame 315A ($\hat{v}$), the prediction frame 315B ($\hat{v}_B$), the prediction frame 315C ($\hat{v}_C$), the prediction frame 415A ($\hat{v}$), the prediction frame 415B ($\hat{v}_B$), the prediction frame 415C ($\hat{v}_C$), the prediction frame 565 ($\tilde{v}$), the prediction frame 1040 ($\hat{v}$), another prediction frame described herein, or a combination thereof. The codec device can generate a residual based on a difference between the input frame and the prediction frame. For instance, the codec system 495A generates the residual 440 ($r$) based on a difference (calculated by the subtractor 465) between the input frame 420 ($v$) and the prediction frame 415A ($\hat{v}$). Examples of the residual include the residual 340 ($r$), the reconstructed residual 345 ($\hat{r}$), the residual 440 ($r$), the reconstructed residual 445 ($\hat{r}$), a residual (r) (not pictured) of FIG. 10A, a residual (r) (not pictured) of FIG. 10B, the reconstructed residual 1035 ($\hat{r}_t$), another residual described herein, or a combination thereof. Encoding the video data based on the optical flow and the weight map as in operation 1120 can include encoding the video data based on the residual.

Encoding the video data based on the optical flow and the weight map as in operation 1120 can include encoding the video data using an autoencoder. Examples of the autoencoder include the system 100, the autoencoder 260, the autoencoder 360, the autoencoder 460, one or more autoencoders of the mutli-scale warping engine 1000A, one or more autoencoders of the mutli-scale warping engine 1000B, another autoencoder discussed herein, another encoder discussed herein, another decoder discussed herein, or a combination thereof.

The codec device can warp the reference frame based on the reconstructed optical flow and the reconstructed weight map using one or more trained neural networks using one or more trained neural networks. For instance, codec device can warp the reference frame based on the optical flow and the weight map using one or more trained NNs of the encoding device 104, one or more trained NNs of the decoding device 112, one or more trained NNs of the autoencoder 260, one or more trained NNs of the encoder 250, one or more trained NNs of the decoder 255, one or more trained NNs of the OptFlow2D engine 325, one or more trained NNs of the Warp2D engine 310A, one or more trained NNs of the Warp2D engine 310B, one or more trained NNs of the Warp2D engine 310C, one or more trained NNs of the autoencoder 360, one or more trained NNs of the encoder 350, one or more trained NNs of the decoder 355, one or more trained NNs of the OptFlowMS engine 425, one or more trained NNs of the WarpMS engine 410A, one or more trained NNs of the WarpMS engine 410B, one or more trained NNs of the WarpMS engine 410C, one or more trained NNs of the autoencoder 460, one or more trained NNs of the encoder 450, one or more trained NNs of the decoder 455, or more trained NNs of the warp engine 550, one or more of the NN 800, one or more of the CNN 900, one or more NNs of the mutli-scale warping engine 1000A, one or more NNs of the mutli-scale warping engine 1000B, another NN discussed herein, or a combination thereof.

In some examples, the codec device warping the reference frame based on the reconstructed optical flow and the reconstructed weight map includes several operations itself. For instance, the codec device can generate at least a first differentially indexed weight map and a second differentially indexed weight map based on the reconstructed weight map. Examples of the first differentially indexed weight map and/or the second differentially indexed weight map include the differentially indexed weight map $f_{z\_0}$ of FIG. 5, differentially indexed weight map $f_{z\_1}$ of FIG. 5, differentially indexed weight map $f_{z\_2}$ of FIG. 5, differentially indexed weight map $f_{z\_1}$ of FIG. 5, the finest ($0^{th}$) scale weight map 650A ($f_{z\_0}$), the fine ($1^{st}$) scale weight map 650B ($f_{z\_1}$), the coarse ($2^{nd}$) scale weight map 650C ($f_{z\_2}$), and the coarsest ($3^{rd}$) scale weight map 650D ($f_{z\_3}$). The codec device can generate the first differentially indexed weight map and/or the second differentially indexed weight map using differentiable indexing 535, differentiable indexing 640, or a combination thereof. The codec device can generate a first warped frame at least in part by warping the reference frame based on the reconstructed optical flow. The codec device can generate a second warped frame at least in part by warping a downscaled variant of the reference frame based on a downscaled variant of the reconstructed optical flow. Referring to the warping operation 550 of FIG. 5, the codec device can generate the first warped frame and/or the second warped frame using the following portion of the formula: warp2D 13 ($\hat{v}_{ref\_i} \cdot f_{xy\_i}$) The first warped frame and the second warped frame may differ because different values of i are used in the formula. For instance, for the first warped frame, i can be zero, while for the second warped frame, i can be a positive integer greater than zero (e.g., 1, 2, 3).

The codec device can downscale the downscaled variant of the reference frame using the downscaling 510. The codec device can downscale the downscaled variant of the reconstructed optical flow using the downscaling 520. In some aspects, the codec device can also adjust amplitudes 525 of the downscaled variant of the reconstructed optical flow, before or after downscaling using the downscaling 520. The codec device can determine a first product of the first warped frame and the first differentially indexed weight map. The codec device can determine a second product of the second warped frame and the second differentially indexed weight map. Referring to the warping operation 550 of FIG. 5, the codec device can generate the first product and/or the second product using the formula $f_{z\_i}$ warp2D($\hat{v}_{ref\_i} \cdot f_{xy\_i}$). The first product and the second product may differ because different values of i are used in the formula. For instance, for the first product, i can be zero, while for the second product, i can be a positive integer greater than zero (e.g., 1, 2, 3). The codec device can determine a sum of the first product and an upscaled variant of the second product. The codec device can perform the upscaling for the upscaled variant of the second product using the upscaling 555. The codec device can determine the sum using the sum 560. The sum may produce the prediction frame. For instance, in reference to FIG. 5, the sum 560 produces the prediction frame 565 ($\hat{v}$).

In some examples, the weight map generated in operation 1115 (and/or a reconstructed variant thereof) includes values greater than a threshold for a first region of the reference frame and includes values less than a threshold for a second region of the reference frame. The encoded video data generated in operation 1120 can include data corresponding to the first region encoded at a fine level of detail, and can include data corresponding to the second region encoded at a coarse level of detail. For example, the threshold may be 0.25, 0.50, or 0.75 in reference to FIG. 6, since these values are used for the differentiable indexing 640 to differenatiably index the weight map 630 to different scaled weight maps 650A-650D with different levels of fineness and coarseness. The threshold may be an inflection point, an intersection point, a maximum, a minimum, or some combination thereof for any one or more of the curves 710, 715, 720, or 725 of FIGS. 7A-7B. For instance, the threshold may be 0.1, 0.2, 0.25, 0.3, 0.4, 0.5, 0.6, 0.7, 0.75, 0.8, 0.9, a value less than 0.1, a value greater than 0.9, or a value in between any two previously listed values.

In some examples, the encoded video data is decodable using a decoder. The decoder may be compliant with one or more video decoder standards. Examples of the decoder include the decoding device 112, the decoder 255, the decoder 355, the decoder 455, a decoder portion of the mutli-scale warping engine 1000A, a decoder portion of the mutli-scale warping engine 1000B, the codec device that performs operation 1100A, the codec device that performs operation 1100B, another decoder discussed herein, or a combination thereof.

Figure 11B:
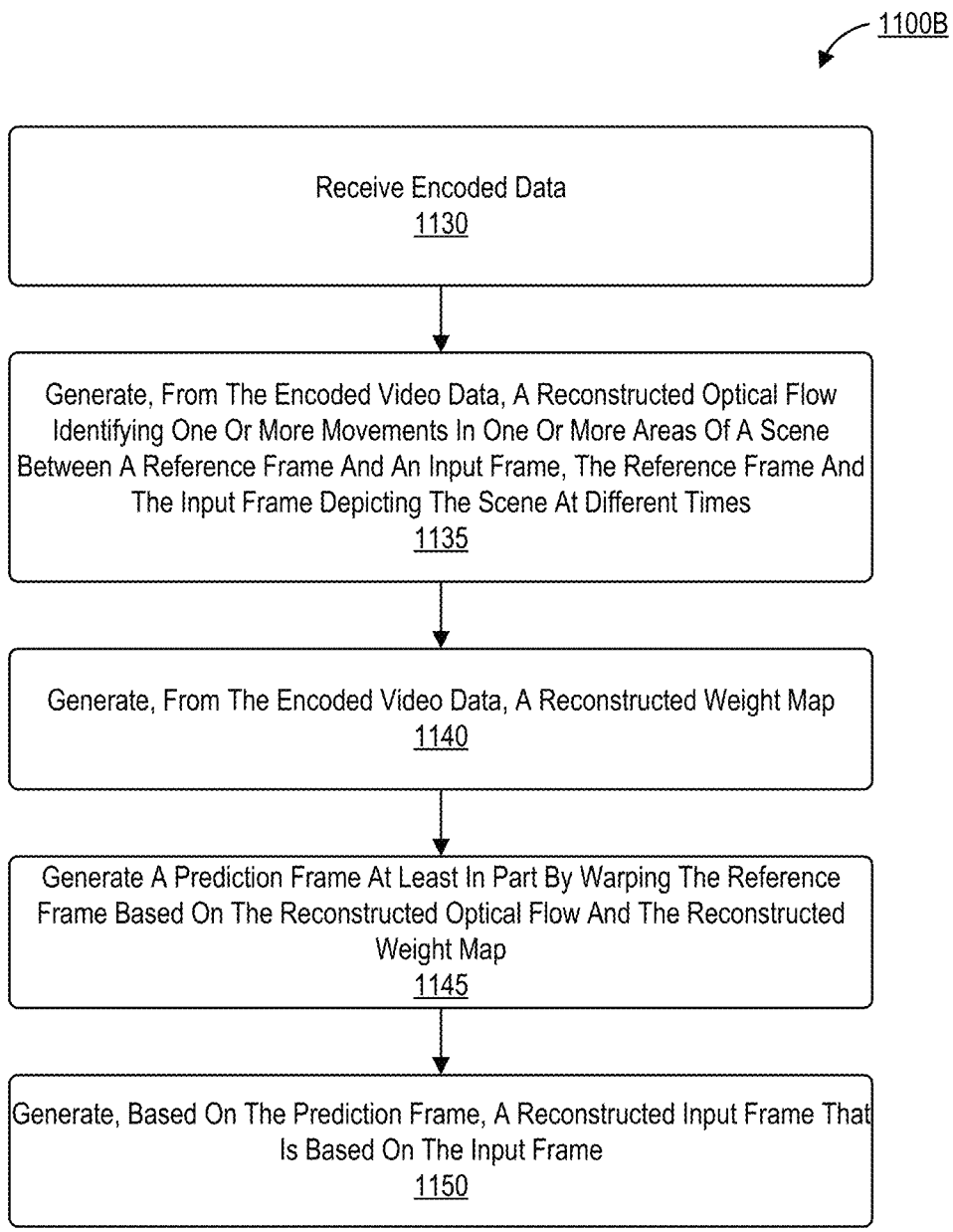
FIG. 11B is a flow diagram illustrating an example of a process for data decoding, in accordance with some examples.

FIG. 11B is a flow diagram illustrating an example of a process 1100B for data decoding, in accordance with some examples. The process 1100B illustrated by the flow diagram of FIG. 11B may be performed by a codec device. The codec device may be, or may include, an encoding device 104, a decoding device 112, a video source 102, a video destination device 122, a codec system 295, an autoencoder 260, an encoder 250, a decoder 255, a codec system 395A, a codec system 395B, an autoencoder 360, an encoder 350, a decoder 355, an OptFlow2D engine 325, a Warp2D engine 310A, a Warp2D engine 310B, a Warp2D engine 310C, a codec system 495A, a codec system 495B, an autoencoder 460, an encoder 450, a decoder 455, an OptFlowMS engine 425, a WarpMS engine 410A, a WarpMS engine 410B, a WarpMS engine 410C, a neural network (NN) 800, a convolutional neural network (CNN) 900, a multi-scale warping engine 1000A, a multi-scale warping engine 1000B, an image capture device, a video capture device, an image processing device, a video processing device, an image capture and processing device, a video capture and processing device, a camera, a mobile handset, a wearable device, a head-mounted display (HMD) device, a vehicle, one or more network servers of a cloud service, a computing system 1200, another type of system or device discussed herein, or some combination thereof. In some examples, the codec device that performs the process 1100B of FIG. 11B may be the same codec device that performs the process 1100A of FIG. 11A. In some examples, the codec device that performs the process 1100B of FIG. 11B may be a different codec device than the codec device that performs the process 1100A of FIG. 11A.

At operation 1130, the codec device receives encoded data. In some examples, the encoded data received at operation 1130 of the process 1100B of FIG. 11B may be the encoded data generated in operation 1120 of the process 1100A of FIG. 11A. In some examples, the codec device that performs the process 1100B of FIG. 11B is the same codec device that performs the process 1100A of FIG. 11A, and the codec device receiving the encoded data at operation 1130 includes the codec device receiving the encoded data from an encoder component of the codec device. In some examples, the codec device that performs the process 1100B of FIG. 11B is a different codec device than the codec device that performs the process 1100A of FIG. 11A, and the codec device receiving the encoded data at operation 1130 includes the codec device that performs the process 1100B of FIG. 11B receiving the encoded data from the codec device that performs the process 1100A of FIG. 11A, or from an intermediate device that receives the encoded data from the codec device that performs the process 1100A of FIG. 11A.

In some examples, the encoded video data is encoded using an encoder. In some examples, the encoder may be compliant with one or more video encoder standards. Examples of the encoder include the encoding device 104, the encoder 250, the encoder 350, the encoder 450, a encoder portion of the mutli-scale warping engine 1000A, a encoder portion of the mutli-scale warping engine 1000B, the codec device that performs operation 1100A, the codec device that performs operation 1100B, another decoder discussed herein, or a combination thereof.

At operation 1135, the codec device generates, from the encoded video data, a reconstructed optical flow. The reconstructed optical flow identifies one or more movements in one or more areas of a scene between a reference frame and an input frame. The reference frame and the input frame can depict the scene at different times. In some examples, the reconstructed optical flow of operation 1135 can be based on the optical flow generated in the operation 1110. For instance, the reconstructed optical flow of operation 1135 can be a reconstruction of the optical flow of operation 1110 that is reconstructed and/or decoded from the encoded video data. The reconstructed optical flow of operation 1135 can include differences from the optical flow that the reconstructed optical flow is a reconstruction of. Such differences may be caused by the reconstruction process, for instance if the encoded video data is compressed using lossy compression and the reconstruction process generates the reconstructed optical flow by decompressing at least a portion of the encoded video data.

In some examples, the reference frame and the input frame of operation 1135 can be the reference frame and the input frame of operation 1105. Examples of the input frame of operation 1135 include the input frame 220 (v), the input frame 320 (v), the input frame 420 (v), input frame 1010 at time t ($v_t$), another input frame described herein, or a combination thereof. Examples of the reference frame of operation 1135 include the reference frame 305 ($\hat{v}_{ref}$), the reference frame 405 ($\hat{v}_{ref}$), the reference frame 505 ($\hat{v}_{ref}$), the reference frame 1005 at time t−1 ($v_{t-1}$), another reference frame described herein, or a combination thereof.

Examples of the reconstructed optical flow of operation 1135 include the reconstructed 2D optical flow 335 ($\hat{f}_{2D}$), the 2D optical flow component of the reconstructed MS optical flow 435 ($\hat{f}_{MS}$), the 2D optical flow 515 ($f_{xy}$) (which may be a reconstructed optical flow as discussed with respect to FIG. 5), the reconstructed optical flow 1030 ($\hat{f}_t$) (and/or a 2D optical flow component thereof), another type of reconstructed optical flow discussed herein, or a combination thereof. The codec device can downscale the reconstructed optical flow, for instance using downscaling 520. The codec device can adjust the amplitudes in the reconstructed optical flow, for instance using amplitude adjustment 525.

In some examples, the codec device generates the reconstructed optical flow from the encoded video data using one or more trained neural networks. For instance, codec device can generate the optical flow using one or more trained NNs of the encoding device 104, one or more trained NNs of the decoding device 112, one or more trained NNs of the autoencoder 260, one or more trained NNs of the encoder 250, one or more trained NNs of the decoder 255, one or more trained NNs of the OptFlow2D engine 325, one or more trained NNs of the autoencoder 360, one or more trained NNs of the encoder 350, one or more trained NNs of the decoder 355, one or more trained NNs of the OptFlowMS engine 425, one or more trained NNs of the autoencoder 460, one or more trained NNs of the encoder 450, one or more trained NNs of the decoder 455, one or more of the NN 800, one or more of the CNN 900, one or more NNs of the mutli-scale warping engine 1000A, one or more NNs of the mutli-scale warping engine 1000B, another NN discussed herein, or a combination thereof.

In some examples, the reconstructed optical flow of operation 1135 is a two-dimensional optical flow, such as the reconstructed 2D optical flow 335 ($\hat{f}_{2D}$), the 2D optical flow component of the reconstructed MS optical flow 435 ($\hat{f}_{MS}$), the 2D optical flow 515 ($f_{xy}$), the reconstructed optical flow 1030 ($\hat{f}_t$) (and/or a 2D optical flow component thereof), another type of reconstructed optical flow discussed herein, or a combination thereof. The one or more movements that the reconstructed optical flow identify can be movements along a plane having two perpendicular dimensions. The two perpendicular dimensions can be a vertical dimension (y) and a horizontal dimension (x). In some aspects, the reconstructed optical flow identifies a direction of movement and an amplitude of movement for each pixel of the input frame. In some aspects, the reconstructed optical flow is identified and/or stored using an optical flow image. The direction of movement can be identified based on a hue in the optical flow image. The amplitude of movement can identified based on a saturation in the optical flow image. The 2D optical flow 515 ($f_{xy}$) of FIG. 5 is illustrated as an optical flow image, with darker areas representing areas having a higher saturation, and with the hue of darkened areas identified through text overlaid over the darkened areas.

At operation 1140, the codec device generates, from the encoded video data, a reconstructed weight map. In some examples, the reconstructed weight map of operation 1140 can be based on the weight map generated in the operation 1115. For instance, the reconstructed weight map of operation 1140 can be a reconstruction of the weight map of operation 1115 reconstructed and/or decoded from the encoded video data. The reconstructed weight map of operation 1140 can include differences from the weight map that the reconstructed weight map is a reconstruction of. Such differences may be caused by the reconstruction process, for instance if the encoded video data is compressed using lossy compression and the reconstruction process generates the reconstructed weight map by decompressing at least a portion of the encoded video data.

Examples of the reconstructed weight map of operation 1140 include the reconstructed weight map component ($\hat{f}_z$) of the reconstructed MS optical flow 435 ($\hat{f}_{MS}$), the weight map 530 ($f_z$), the weight map 530 ($\hat{f}_z$) that is differentially indexed using differential indexing 535, the differentially indexed weight map $f_{z\_0}$ of FIG. 5, differentially indexed weight map $f_{z\_1}$ of FIG. 5, differentially indexed weight map $f_{z\_2}$ of FIG. 5, differentially indexed weight map $f_{z\_3}$ of FIG. 5, the weight map 630 ($f_z$), the weight map 630 ($\hat{f}_z$) differentially indexed using differential indexing 640, the finest ($0^{th}$) scale weight map 650A ($f_{z\_0}$), the fine ($1^{st}$) scale weight map 650B ($f_{z\_1}$), the coarse ($2^{nd}$) scale weight map 650C ($f_{z\_2}$), the coarsest ($3^{rd}$) scale weight map 650D ($f_{z\_3}$), reconstructed weight map component ($\hat{f}_z$) of the reconstructed optical flow 1030 ($\hat{f}_t$), another type of reconstructed weight map discussed herein, or a combination thereof. The codec device can downscale the reconstructed weight map, for instance using downscaling 540. In some examples, the reconstructed weight map may be identified and/or stored using a weight map image, with higher weights appearing darker in the weight map image and lower weights appearing brighter in the weight map image (or vice versa). Examples of the weight map image are provided in the illustrations of the weight map 530 ($f_z$), the differentially indexed weight map $f_{z\_0}$ of FIG. 5, differentially indexed weight map $f_{z\_1}$ of FIG. 5, differentially indexed weight map $f_{z\_2}$ of FIG. 5, differentially indexed weight map $f_{z\_3}$ of FIG. 5, the weight map 630 ($f_z$), the finest ($0^{th}$) scale weight map 650A ($f_{z\_0}$), the fine ($1^{st}$) scale weight map 650B ($f_{z\_1}$), the coarse ($2^{nd}$) scale weight map 650C ($f_{z\_2}$), and the coarsest ($3^{rd}$) scale weight map 650D ($f_{z\_3}$).

In some examples, the codec device generates the reconstructed weight map based on the input frame and the reference frame using one or more trained neural networks. For instance, codec device can generate the reconstructed weight map using one or more trained NNs of the encoding device 104, one or more trained NNs of the decoding device 112, one or more trained NNs of the autoencoder 260, one or more trained NNs of the encoder 250, one or more trained NNs of the decoder 255, one or more trained NNs of the OptFlow2D engine 325, one or more trained NNs of the autoencoder 360, one or more trained NNs of the encoder 350, one or more trained NNs of the decoder 355, one or more trained NNs of the OptFlowMS engine 425, one or more trained NNs of the autoencoder 460, one or more trained NNs of the encoder 450, one or more trained NNs of the decoder 455, one or more of the NN 800, one or more of the CNN 900, one or more NNs of the mutli-scale warping engine 1000A, one or more NNs of the mutli-scale warping engine 1000B, another NN discussed herein, or a combination thereof.

At operation 1145, the codec device generates a prediction frame at least in part by warping the reference frame based on the reconstructed optical flow and the reconstructed weight map. Examples of the prediction frame of operation 1145 include the prediction frame 315A ($\hat{v}$), the prediction frame 315B ($\hat{v}_B$), the prediction frame 315C ($\hat{v}_C$), the prediction frame 415A ($\hat{v}$), the prediction frame 415B ($\hat{v}_B$), the prediction frame 415C ($\hat{v}_C$), the prediction frame 565 ($\hat{v}$), the prediction frame 1040 ($\hat{v}$), another prediction frame described herein, or a combination thereof. In the context of operations 1135 and 1145, the reference frame may be a reconstructed reference frame. For instance, the reference frame may have been reconstructed prior to the process 1100B using the process 1100B with the reference frame in the place of the input frame, and with a second reference frame in place of the reference frame.

The codec device can warp the reference frame based on the reconstructed optical flow of operation 1135 and the reconstructed weight map of operation 1140 using one or more trained neural networks using one or more trained neural networks. For instance, codec device can warp the reference frame based on the reconstructed optical flow of operation 1135 and the reconstructed weight map of operation 1140 using one or more trained NNs of the encoding device 104, one or more trained NNs of the decoding device 112, one or more trained NNs of the autoencoder 260, one or more trained NNs of the encoder 250, one or more trained NNs of the decoder 255, one or more trained NNs of the OptFlow2D engine 325, one or more trained NNs of the Warp2D engine 310A, one or more trained NNs of the Warp2D engine 310B, one or more trained NNs of the Warp2D engine 310C, one or more trained NNs of the autoencoder 360, one or more trained NNs of the encoder 350, one or more trained NNs of the decoder 355, one or more trained NNs of the OptFlowMS engine 425, one or more trained NNs of the WarpMS engine 410A, one or more trained NNs of the WarpMS engine 410B, one or more trained NNs of the WarpMS engine 410C, one or more trained NNs of the autoencoder 460, one or more trained NNs of the encoder 450, one or more trained NNs of the decoder 455, or more trained NNs of the warp engine 550, one or more of the NN 800, one or more of the CNN 900, one or more NNs of the mutli-scale warping engine 1000A, one or more NNs of the mutli-scale warping engine 1000B, another NN discussed herein, or a combination thereof.

In some examples, the codec device warping the reference frame based on the reconstructed optical flow of operation 1135 and the reconstructed weight map of operation 1140 includes several operations itself. For instance, the codec device can generate at least a first differentially indexed weight map and a second differentially indexed weight map based on the reconstructed weight map of operation 1140. Examples of the first differentially indexed weight map and/or the second differentially indexed weight map include the differentially indexed weight map $f_{z\_0}$ of FIG. 5, the differentially indexed weight map $f_{z\_1}$ of FIG. 5, differentially indexed weight map $f_{z\_2}$ of FIG. 5, the differentially indexed weight map $f_{z\_3}$ of FIG. 5, the finest ($0^{th}$) scale weight map 650A ($f_{z\_0}$), the fine ($1^{st}$) scale weight map 650B ($f_{z\_1}$), the coarse ($2^{nd}$) scale weight map 650C ($f_{z\_2}$), and the coarsest ($3^{rd}$) scale weight map 650D ($f_{z\_3}$). The codec device can generate the first differentially indexed weight map and/or the second differentially indexed weight map using differentiable indexing 535, differentiable indexing 640, or a combination thereof. The codec device can generate a first warped frame at least in part by warping the reference frame based on the reconstructed optical flow. The codec device can generate a second warped frame at least in part by warping a downscaled variant of the reference frame based on a downscaled variant of the reconstructed optical flow. Referring to the warping operation 550 of FIG. 5, the codec device can generate the first warped frame and/or the second warped frame using the following portion of the formula: warp2D($\hat{v}_{ref\_i} \cdot f_{xy\_i}$). The first warped frame and the second warped frame may differ because different values of i are used in the formula. For instance, for the first warped frame, i can be zero, while for the second warped frame, i can be a positive integer greater than zero (e.g., 1, 2, 3).

The codec device can downscale the downscaled variant of the reference frame using the downscaling 510. The codec device can downscale the downscaled variant of the reconstructed optical flow using the downscaling 520. In some aspects, the codec device can also adjust amplitudes 525 of the downscaled variant of the reconstructed optical flow, before or after downscaling using the downscaling 520. The codec device can determine a first product of the first warped frame and the first differentially indexed weight map. The codec device can determine a second product of the second warped frame and the second differentially indexed weight map. Referring to the warping operation 550 of FIG. 5, the codec device can generate the first product and/or the second product using the formula $f_{z\_i} \cdot$warp2D($\hat{v}_{ref\_i} \cdot f_{xy\_i}$). The first product and the second product may differ because different values of i are used in the formula. For instance, for the first product, i can be zero, while for the second product, i can be a positive integer greater than zero (e.g., 1, 2, 3). The codec device can determine a sum of the first product and an upscaled variant of the second product. The codec device can perform the upscaling for the upscaled variant of the second product using the upscaling 555. The codec device can determine the sum using the sum 560. The sum may produce the prediction frame of operation 1145. For instance, in reference to FIG. 5, the sum 560 produces the prediction frame 565 ($\hat{v}$).

In some examples, the reconstructed weight map generated in operation 1140 includes values greater than a threshold for a first region of the reference frame and includes values less than a threshold for a second region of the reference frame. The encoded video data received in operation 1130 can include data corresponding to the first region encoded at a fine level of detail, and can include data corresponding to the second region encoded at a coarse level of detail. For example, the threshold may be 0.25, 0.50, or 0.75 in reference to FIG. 6, since these values are used for the differentiable indexing 640 to differenatiably index the weight map 630 to different scaled weight maps 650A-650D with different levels of fineness and coarseness. The threshold may be an inflection point, an intersection point, a maximum, a minimum, or some combination thereof for any one or more of the curves 710, 715, 720, or 725 of FIGS. 7A-7B. For instance, the threshold may be 0.1, 0.2, 0.25, 0.3, 0.4, 0.5, 0.6, 0.7, 0.75, 0.8, 0.9, a value less than 0.1, a value greater than 0.9, or a value in between any two previously listed values.

At operation 1150, the codec device generates, based on the prediction frame a reconstructed input frame that is based on the input frame. The reconstructed input frame being based on the input frame can include the reconstructed input frame being a reconstruction of the input frame. In some examples, the reconstructed input frame of operation 1150 can be based on the input frame of operation 1105. For instance, the reconstructed input frame of operation 1140 can be a reconstruction of the input frame of operation 1105 that is reconstructed based on the prediction frame (and, in some examples, the reconstructed residual). The reconstructed input frame of operation 1150 can include differences from the input frame that the reconstructed input frame is a reconstruction of. Such differences may be caused by the reconstruction process, for instance if the encoded video data is compressed using lossy compression, and the reconstructed input frame is generated using a prediction frame that is based on reconstructed data decompressed from at least a portion of the encoded video data.

In some examples, the codec device generates, from the encoded video data, a reconstructed residual that is based on a residual. To generate the reconstructed input frame at operation 1150, the one or more processors can be configured to, and can, generate the reconstructed input frame based on the prediction frame (of operation 1145) and the reconstructed residual. The reconstructed residual being based on the residual can include the reconstructed residual being a reconstruction of the residual that the codec device reconstruct from at least a portion of the encoded video data. The reconstructed residual can include differences from the residual that the reconstructed residual is a reconstruction of Such differences may be caused by the reconstruction process, for instance if the encoded video data is compressed using lossy compression and the reconstruction process generates the reconstructed residual by decompressing at least a portion of the encoded video data.

Examples of the reconstructed residual include the reconstructed residual 345 ($\hat{r}$), the reconstructed residual 445 ($\hat{v}$), the reconstructed residual 1035 ($\hat{v}_t$), another reconstructed residual described herein, or a combination thereof. Examples of the residual include the residual 340 ($r$), the residual 440 ($r$), a residual (r) (not pictured) of FIG. 10A, a residual (r) (not pictured) of FIG. 10B, another residual described herein, or a combination thereof.

In some examples, the residual is based on a difference between the input frame and the prediction frame. Examples of such a residual include the residual 340 ($r$) of FIG. 3A and the residual 440 ($r$) of FIG. 4A.

In some examples, the residual based on a difference between the input frame and a second prediction frame. The second prediction frame is a variant of the reference frame that is warped based on an optical flow and a weight map. The optical flow and the weight map can have been generated based on the reference frame and the input frame. Examples of such a residual include the residual 340 ($r$) of FIG. 3B and the residual 440 ($r$) of FIG. 4B. In the context of FIG. 3B, the prediction frame 315C ($\hat{v}_C$) may be an example of the second prediction frame, while the prediction frame 315B ($\hat{v}_B$) may be an example of the prediction frame of operation 1145. In the context of FIG. 3B, the second prediction frame can be a variant of the reference frame 305 ($\hat{v}_{ref}$) that is warped based on the optical flow 330 ($f_{2D}$) and/or a weight map (not pictured in FIG. 3B). In the context of FIG. 4B, the second prediction frame can be a variant of the reference frame 405 ($\hat{v}_{ref}$) that is warped based on the optical flow component and the weight map component of the multi-scale flow 430 ($f_{MS}$).

In some examples, the codec device that performs the process 1100B of FIG. 11B can perform, as part of the process 1100B of FIG. 11B, one or more operations that are described herein as part of the process 1100A of FIG. 11A. In some examples, the codec device that performs the process 1100A of FIG. 11A can perform, as part of the process 1100BA of FIG. 11A, one or more operations that are described herein as part of the process 1100B of FIG. 11B.

In some cases, at least a subset of the process 1100A illustrated by the flow diagram of FIGS. 11A-11B and the techniques illustrated in the conceptual diagrams of FIGS. 1, 2, 3A, 3B, 4A, 4B, 5, 6, 8, 9, 10A, and 10B may be performed remotely by one or more network servers of a cloud service. In some examples, the processes described herein (e.g., the processes 1100A, 1100B, and/or the techniques illustrated in the conceptual diagrams of FIGS. 1, 2, 3A, 3B, 4A, 4B, 5, 6, 8, 9, 10A, and 10B, and/or other processes described herein) may be performed by a computing system or apparatus. In some example, the processes 1100A, 1100B, and/or the techniques illustrated in the conceptual diagrams of FIGS. 1, 2, 3A, 3B, 4A, 4B, 5, 6, 8, 9, 10A, and 10B can be performed by one or more of an encoding device 104, a decoding device 112, a video source 102, a video destination device 122, a codec system 295, an autoencoder 260, an encoder 250, a decoder 255, A codec system 395A, a codec system 395B, an autoencoder 360, an encoder 350, a decoder 355, an OptFlow2D engine 325, a Warp2D engine 310A, a Warp2D engine 310B, a Warp2D engine 310C, a codec system 495A, a codec system 495B, an autoencoder 460, an encoder 450, a decoder 455, an OptFlow3D engine 425, a WarpMS engine 410A, a WarpMS engine 410B, a WarpMS engine 410C, a neural network (NN) 800, a convolutional neural network (CNN) 900, a multi-scale warping engine 1000A, a multi-scale warping engine 1000B, an image capture device, a video capture device, an image processing device, a video processing device, an image capture and processing device, a video capture and processing device, a camera, a mobile handset, a wearable device, a head-mounted display (HMD) device, a vehicle, one or more network servers of a cloud service, a computing system 1200, another type of system or device discussed herein, or some combination thereof. The processes 1100A, 1100B, and/or the techniques illustrated in the conceptual diagrams of FIGS. 1, 2, 3A, 3B, 4A, 4B, 5, 6, 8, 9, 10A, and 10B can be performed by a computing system with the architecture of the computing system 1200 shown in FIG. 12. The computing system can include any suitable device, such as a mobile device (e.g., a mobile phone), a desktop computing system, a tablet computing system, a wearable device (e.g., a VR headset, an AR headset, AR glasses, a network-connected watch or smartwatch, or other wearable device), a camera device, a server computer, a vehicle or computing system of a vehicle, an unmanned vehicle or computing system of an unmanned vehicle, a robotic device, a television, and/or any other computing system with the resource capabilities to perform the processes described herein, including the processes 1100A, 1100B, and/or the techniques illustrated in the conceptual diagrams of FIGS. 1, 2, 3A, 3B, 4A, 4B, 5, 6, 8, 9, 10A, and 10B. In some cases, the computing system or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing system may include a display, a network interface configured to communicate and/or receive the data, any combination thereof, and/or other component(s). The network interface may be configured to communicate and/or receive Internet Protocol (IP) based data or other type of data.

The components of the computing system can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams of FIGS. 1, 2, 3A, 3B, 4A, 4B, 5, 6, 8, 9, 10A, and 10B, and the flow diagrams of FIGS. 11A-11B, are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams of FIGS. 1, 2, 3A, 3B, 4A, 4B, 5, 6, 8, 9, 10A, and 10B, and flow diagrams of FIGS. 11A-11B, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
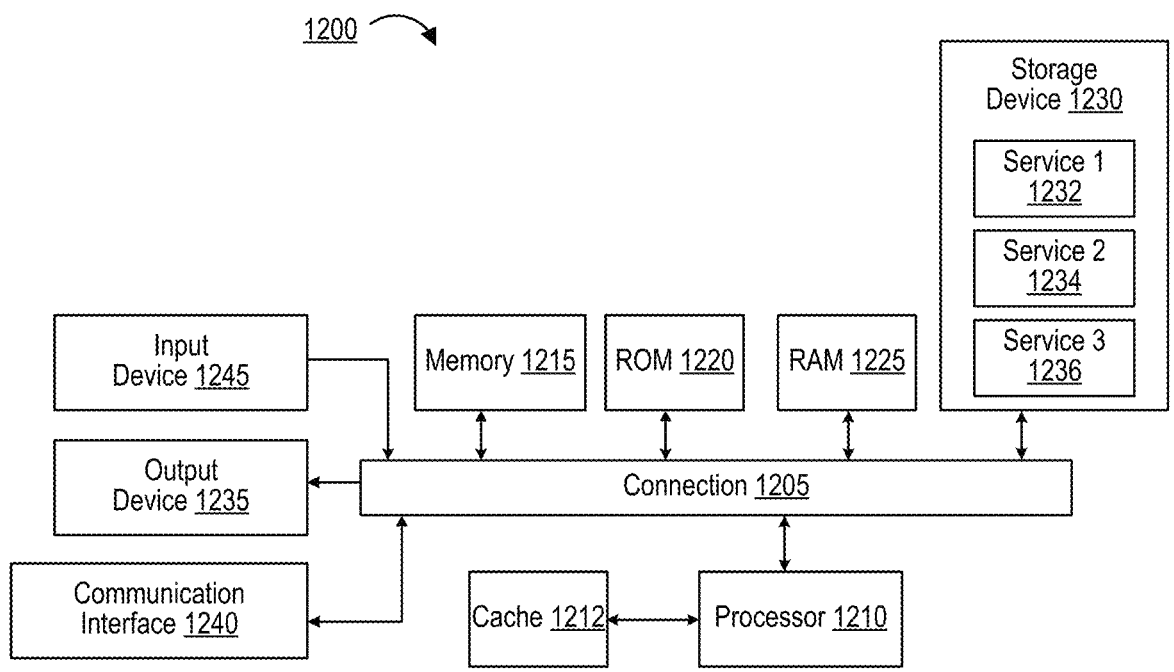
FIG. 12 is a diagram illustrating an example of a system for implementing certain aspects of the present technology.

FIG. 12 is a diagram illustrating an example of a system for implementing certain aspects of the present technology.

In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for data encoding, the apparatus comprising: a memory; and one or more processors coupled to the memory, the one or more processors configured to: receive video data including an input frame that depicts a scene at a first time and a reference frame that depicts the scene at a second time; generate an optical flow based on the input frame and the reference frame, the optical flow identifying one or more movements in one or more areas of the scene between the reference frame and the input frame; generate a weight map based on the reference frame and the input frame; and generate encoded video data at least in part by encoding the video data based on the optical flow and the weight map.

Aspect 2: The apparatus of Aspect 1, wherein the first time is after the second time.

Aspect 3: The apparatus of any of Aspects 1 to 2, wherein the reference frame is encoded as an intra-coded frame in the encoded video data, wherein the input frame is encoded as an inter-coded frame in the encoded video data.

Aspect 4: The apparatus of any of Aspects 1 to 3, wherein the one or more processors are configured to: generate a prediction frame at least in part by warping the reference frame based on the optical flow and the weight map; and generate a residual based on a difference between the input frame and the prediction frame, wherein to encode the video data based on the optical flow and the weight map, the one or more processors are configured to encode the video data based on the residual.

Aspect 5: The apparatus of any of Aspects 1 to 4, wherein, to warp the reference frame based on the optical flow and the weight map, the one or more processors are configured to use one or more trained neural networks.

Aspect 6: The apparatus of any of Aspects 1 to 5, wherein, to warp the reference frame based on the optical flow and the weight map, the one or more processors are configured to: generate at least a first differentially indexed weight map and a second differentially indexed weight map based on the weight map; generate a first warped frame at least in part by warping the reference frame based on the optical flow; generate a second warped frame at least in part by warping a downscaled variant of the reference frame based on a downscaled variant of the optical flow; determine a first product of the first warped frame and the first differentially indexed weight map; determine a second product of the second warped frame and the second differentially indexed weight map; and determine a sum of the first product and an upscaled variant of the second product.

Aspect 7: The apparatus of any of Aspects 1 to 6, wherein the one or more processors are configured to: generate a reconstructed optical flow based on the optical flow; generate a reconstructed weight map based on the weight map; generate a prediction frame at least in part by warping the reference frame based on the reconstructed optical flow and the reconstructed weight map; and generate a residual based on a difference between the input frame and the prediction frame, wherein to encode the video data based on the optical flow and the weight map, the one or more processors are configured to encode the video data based on the residual.

Aspect 8: The apparatus of any of Aspects 1 to 7, wherein, to generate the reconstructed optical flow based on the optical flow, the one or more processors are configured to use an autoencoder.

Aspect 9: The apparatus of any of Aspects 1 to 8, wherein, to warp the reference frame based on the reconstructed optical flow and the reconstructed weight map, the one or more processors are configured to use one or more trained neural networks.

Aspect 10: The apparatus of any of Aspects 1 to 9, wherein, to warp the reference frame based on the reconstructed optical flow and the reconstructed weight map, the one or more processors are configured to: generate at least a first differentially indexed weight map and a second differentially indexed weight map based on the reconstructed weight map; generate a first warped frame at least in part by warping the reference frame based on the reconstructed optical flow; generate a second warped frame at least in part by warping a downscaled variant of the reference frame based on a downscaled variant of the reconstructed optical flow; determine a first product of the first warped frame and the first differentially indexed weight map; determine a second product of the second warped frame and the second differentially indexed weight map; and determine a sum of the first product and an upscaled variant of the second product.

Aspect 11: The apparatus of any of Aspects 1 to 10, wherein the weight map includes values greater than a threshold for a first region of the reference frame, wherein the weight map includes values less than a threshold for a second region of the reference frame, wherein the encoded video data includes data corresponding to the first region encoded at a fine level of detail, and wherein the encoded video data includes data corresponding to the second region encoded at a coarse level of detail.

Aspect 12: The apparatus of any of Aspects 1 to 11, wherein the optical flow is a two-dimensional optical flow, and the one or more movements are along a plane having two perpendicular dimensions.

Aspect 13: The apparatus of any of Aspects 1 to 12, wherein the optical flow identifies a direction of movement and an amplitude of movement for each pixel of the input frame.

Aspect 14: The apparatus of any of Aspects 1 to 13 wherein the optical flow is identified using an optical flow image, wherein the direction of movement is identified based on a hue in the optical flow image, and wherein the amplitude of movement is identified based on a saturation in the optical flow image.

Aspect 15: The apparatus of any of Aspects 1 to 14, wherein, to generate the optical flow, the one or more processors are configured to use one or more trained neural networks.

Aspect 16: The apparatus of any of Aspects 1 to 15, wherein, to generate the weight map, the one or more processors are configured to use one or more trained neural networks.

Aspect 17: The apparatus of any of Aspects 1 to 16, wherein the encoded video data is decodable using a decoder compliant with one or more video decoder standards.

Aspect 18: The apparatus of any of Aspects 1 to 17, wherein, to encode the video data based on the optical flow and the weight map, the one or more processors are configured to compress the video data based on the optical flow and the weight map.

Aspect 19: The apparatus of any of Aspects 1 to 18, wherein the apparatus is one of a mobile device, a wireless communication device, and a camera device.

Aspect 20: The apparatus of any of Aspects 1 to 19, wherein the apparatus includes a camera, wherein the video data is captured by the camera.

Aspect 21: A method of data encoding, the method comprising: receiving video data including an input frame that depicts a scene at a first time and a reference frame that depicts the scene at a second time; generating an optical flow based on the input frame and the reference frame, the optical flow identifying one or more movements in one or more areas of the scene between the reference frame and the input frame; generating a weight map based on the reference frame and the input frame; and generating encoded video data at least in part by encoding the video data based on the optical flow and the weight map.

Aspect 22: The method of Aspect 21, wherein the first time is after the second time.

Aspect 23: The method of any of Aspects 21 to 22, wherein the reference frame is encoded as an intra-coded frame in the encoded video data, wherein the input frame is encoded as an inter-coded frame in the encoded video data.

Aspect 24: The method of any of Aspects 21 to 23, further comprising: generating a prediction frame at least in part by warping the reference frame based on the optical flow and the weight map; and generating a residual based on a difference between the input frame and the prediction frame, wherein encoding the video data based on the optical flow and the weight map includes encoding the video data based on the residual.

Aspect 25: The method of any of Aspects 21 to 24, wherein warping the reference frame based on the optical flow and the weight map includes warping the reference frame using one or more trained neural networks based on the optical flow and the weight map.

Aspect 26: The method of any of Aspects 21 to 25, wherein warping the reference frame based on the optical flow and the weight map includes: generating at least a first differentially indexed weight map and a second differentially indexed weight map based on the weight map; generating a first warped frame at least in part by warping the reference frame based on the optical flow; generating a second warped frame at least in part by warping a downscaled variant of the reference frame based on a downscaled variant of the optical flow; determining a first product of the first warped frame and the first differentially indexed weight map; determining a second product of the second warped frame and the second differentially indexed weight map; and determining a sum of the first product and an upscaled variant of the second product.

Aspect 27: The method of any of Aspects 21 to 26, further comprising: generating a reconstructed optical flow based on the optical flow; generating a reconstructed weight map based on the weight map; generating a prediction frame at least in part by warping the reference frame based on the reconstructed optical flow and the reconstructed weight map; and generating a residual based on a difference between the input frame and the prediction frame, wherein encoding the video data based on the optical flow and the weight map includes encoding the video data based on the residual.

Aspect 28: The method of any of Aspects 21 to 27, wherein warping the reference frame based on the optical flow and the weight map includes warping the reference frame using an autoencoder based on the optical flow and the weight map.

Aspect 29: The method of any of Aspects 21 to 24, wherein warping the reference frame based on the optical flow and the weight map includes warping the reference frame using one or more trained neural networks based on the optical flow and the weight map.

Aspect 30: The method of any of Aspects 21 to 29, wherein warping the reference frame based on the reconstructed optical flow and the reconstructed weight map includes: generating at least a first differentially indexed weight map and a second differentially indexed weight map based on the reconstructed weight map; generating a first warped frame at least in part by warping the reference frame based on the reconstructed optical flow; generating a second warped frame at least in part by warping a downscaled variant of the reference frame based on a downscaled variant of the reconstructed optical flow; determining a first product of the first warped frame and the first differentially indexed weight map; determining a second product of the second warped frame and the second differentially indexed weight map; and determining a sum of the first product and an upscaled variant of the second product.

Aspect 31: The method of any of Aspects 21 to 30, wherein the weight map includes values greater than a threshold for a first region of the reference frame, wherein the weight map includes values less than a threshold for a second region of the reference frame, wherein the encoded video data includes data corresponding to the first region encoded at a fine level of detail, and wherein the encoded video data includes data corresponding to the second region encoded at a coarse level of detail.

Aspect 32: The method of any of Aspects 21 to 31, wherein the optical flow is a two-dimensional optical flow, and the one or more movements are along a plane having two perpendicular dimensions.

Aspect 33: The method of any of Aspects 21 to 32, wherein the optical flow identifies a direction of movement and an amplitude of movement for each pixel of the input frame.

Aspect 34: The method of any of Aspects 21 to 33, wherein the optical flow is identified using an optical flow image, wherein the direction of movement is identified based on a hue in the optical flow image, and wherein the amplitude of movement is identified based on a saturation in the optical flow image.

Aspect 35: The method of any of Aspects 21 to 34, wherein generating the optical flow based on the input frame and the reference frame includes generating the optical flow using one or more trained neural networks based on the input frame and the reference frame.

Aspect 36: The method of any of Aspects 21 to 35, wherein generating the weight map based on the reference frame and the input frame includes generating the weight map using one or more trained neural networks based on the reference frame and the input frame.

Aspect 37: The method of any of Aspects 21 to 36, wherein the encoded video data is decodable using a decoder compliant with one or more video decoder standards.

Aspect 38: The method of any of Aspects 21 to 37, wherein encoding the video data based on the optical flow and the weight map includes compressing the video data based on the optical flow and the weight map.

Aspect 39: An apparatus for data decoding, the apparatus comprising: a memory; and one or more processors coupled to the memory, the one or more processors configured to:

receive encoded video data; generate, from the encoded video data, a reconstructed optical flow identifying one or more movements in one or more areas of a scene between a reference frame and an input frame, the reference frame and the input frame depicting the scene at different times; generate, from the encoded video data, a reconstructed weight map; generate a prediction frame at least in part by warping the reference frame based on the reconstructed optical flow and the reconstructed weight map; and generate, based on the prediction frame, a reconstructed input frame that is based on the input frame.

Aspect 40: The apparatus of Aspect 39, wherein the one or more processors are configured to: generate, from the encoded video data, a reconstructed residual that is based on a residual, wherein, to generate the reconstructed input frame, the one or more processors are configured to generate the reconstructed input frame based on the prediction frame and the reconstructed residual.

Aspect 41: The apparatus of Aspect 40, wherein the residual is based on a difference between the input frame and the prediction frame.

Aspect 42: The apparatus of Aspect 40, wherein the residual based on a difference between the input frame and a second prediction frame, wherein the second prediction frame is a variant of the reference frame that is warped based on an optical flow and a weight map, the optical flow and the weight map having been generated based on the reference frame and the input frame.

Aspect 43: The apparatus of any of Aspects 39 to 42, wherein, to warp the reference frame based on the reconstructed optical flow and the reconstructed weight map, the one or more processors are configured to: generate at least a first differentially indexed weight map and a second differentially indexed weight map based on the reconstructed weight map; generate a first warped frame at least in part by warping the reference frame based on the reconstructed optical flow; generate a second warped frame at least in part by warping a downscaled variant of the reference frame based on a downscaled variant of the reconstructed optical flow; determine a first product of the first warped frame and the first differentially indexed weight map; determine a second product of the second warped frame and the second differentially indexed weight map; and determine a sum of the first product and an upscaled variant of the second product.

Aspect 44: The apparatus of any of Aspects 39 to 43, wherein, to warp the reference frame based on the reconstructed optical flow and the reconstructed weight map, the one or more processors are configured to use one or more trained neural networks.

Aspect 45: The apparatus of any of Aspects 39 to 44, wherein, to generate the reconstructed optical flow from the encoded video data, the one or more processors are configured to use one or more trained neural networks.

Aspect 46: The apparatus of any of Aspects 39 to 45, wherein, to generate the reconstructed weight map from the encoded video data, the one or more processors are configured to use one or more trained neural networks.

Aspect 47: A method for data decoding, the method comprising: receiving encoded video data; generating, from the encoded video data, a reconstructed optical flow identifying one or more movements in one or more areas of a scene between a reference frame and an input frame, the reference frame and the input frame depicting the scene at different times; generating, from the encoded video data, a reconstructed weight map; generating a prediction frame at least in part by warping the reference frame based on the reconstructed optical flow and the reconstructed weight map; and generating, based on the prediction frame, a reconstructed input frame that is based on the input frame.

Aspect 48: The method of Aspect 47, further comprising: generating, from the encoded video data, a reconstructed residual that is based on a residual, wherein generating the reconstructed input frame includes generating the reconstructed input frame based on the prediction frame and the reconstructed residual.

Aspect 49: The method of Aspect 48, wherein the residual is based on a difference between the input frame and the prediction frame.

Aspect 50: The method of Aspect 48, wherein the residual based on a difference between the input frame and a second prediction frame, wherein the second prediction frame is a variant of the reference frame that is warped based on an optical flow and a weight map, the optical flow and the weight map having been generated based on the reference frame and the input frame.

Aspect 51: The method of any of Aspects 47 to 50, wherein warping the reference frame based on the reconstructed optical flow and the reconstructed weight map includes: generating at least a first differentially indexed weight map and a second differentially indexed weight map based on the reconstructed weight map; generating a first warped frame at least in part by warping the reference frame based on the reconstructed optical flow; generating a second warped frame at least in part by warping a downscaled variant of the reference frame based on a downscaled variant of the reconstructed optical flow; determining a first product of the first warped frame and the first differentially indexed weight map; determining a second product of the second warped frame and the second differentially indexed weight map; and determining a sum of the first product and an upscaled variant of the second product.

Aspect 52: The method of any of Aspects 47 to 51, wherein warping the reference frame based on the reconstructed optical flow and the reconstructed weight map includes warping the reference frame using one or more trained neural networks based on the reconstructed optical flow and the reconstructed weight map.

Aspect 53: The method of any of Aspects 47 to 52, wherein generating the reconstructed optical flow from the encoded video data includes generating the reconstructed optical flow from the encoded video data using one or more trained neural networks.

Aspect 54: The apparatus of any of Aspects 47 to 53, wherein generating the reconstructed weight map from the encoded video data includes generating the reconstructed weight map from the encoded video data using one or more trained neural networks.

Aspect 55: An apparatus for digital imaging, the apparatus comprising means for performing operations according to any of Aspects to 21 to 38 and/or any of Aspects 47 to 54.

Aspect 56: A computer-readable storage medium storing instructions that, when executed, cause one or more processors to perform operations according to any of Aspects to 21 to 38 and/or any of Aspects 47 to 54.

What is claimed is:

1. An apparatus for data encoding, the apparatus comprising:
a memory; and
one or more processors coupled to the memory, the one or more processors configured to:
receive video data including an input frame that depicts a scene at a first time and a reference frame that depicts the scene at a second time;

generate an optical flow based on the input frame and the reference frame, the optical flow identifying one or more movements in one or more areas of the scene between the reference frame and the input frame;

generate a weight map based on the reference frame and the input frame, the weight map identifying a degree of certainty in the optical flow and including a first set of values corresponding to a first region of the reference frame and a second set of values corresponding to a second region of the reference frame, the second set of values being different than the first set of values; and generate encoded video data at least in part by encoding the video data based on the optical flow and the weight map, the encoded video data including:

a first set of data corresponding to the first region of the reference frame and encoded at a first level of detail based on the first set of values from the weight map; and a second set of data corresponding to the second region of the reference frame and encoded at a second level of detail based on the second set of values from the weight map, the second level of detail being different than the first level of detail.

2. The apparatus of claim 1, wherein the first time is after the second time.

3. The apparatus of claim 1, wherein the reference frame is encoded as an intra-coded frame in the encoded video data, wherein the input frame is encoded as an inter-coded frame in the encoded video data.

4. The apparatus of claim 1, wherein the one or more processors are configured to:

generate a prediction frame at least in part by warping the reference frame based on the optical flow and the weight map; and generate a residual based on a difference between the input frame and the prediction frame, wherein to encode the video data based on the optical flow and the weight map, the one or more processors are configured to encode the video data based on the residual.

5. The apparatus of claim 4, wherein, to warp the reference frame based on the optical flow and the weight map, the one or more processors are configured to use one or more trained neural networks.

6. The apparatus of claim 4, wherein, to warp the reference frame based on the optical flow and the weight map, the one or more processors are configured to:

generate at least a first differentially indexed weight map and a second differentially indexed weight map based on the weight map;

generate a first warped frame at least in part by warping the reference frame based on the optical flow;

generate a second warped frame at least in part by warping a downscaled variant of the reference frame based on a downscaled variant of the optical flow;

determine a first product of the first warped frame and the first differentially indexed weight map;

determine a second product of the second warped frame and the second differentially indexed weight map; and determine a sum of the first product and an upscaled variant of the second product.

7. The apparatus of claim 1, wherein the one or more processors are configured to:

generate a reconstructed optical flow based on the optical flow;

generate a reconstructed weight map based on the weight map;

generate a prediction frame at least in part by warping the reference frame based on the reconstructed optical flow and the reconstructed weight map; and generate a residual based on a difference between the input frame and the prediction frame, wherein to encode the video data based on the optical flow and the weight map, the one or more processors are configured to encode the video data based on the residual.

8. The apparatus of claim 7, wherein, to generate the reconstructed optical flow based on the optical flow, the one or more processors are configured to use an autoencoder.

9. The apparatus of claim 7, wherein, to warp the reference frame based on the reconstructed optical flow and the reconstructed weight map, the one or more processors are configured to:

generate at least a first differentially indexed weight map and a second differentially indexed weight map based on the reconstructed weight map;

generate a first warped frame at least in part by warping the reference frame based on the reconstructed optical flow;

generate a second warped frame at least in part by warping a downscaled variant of the reference frame based on a downscaled variant of the reconstructed optical flow;

determine a first product of the first warped frame and the first differentially indexed weight map;

determine a second product of the second warped frame and the second differentially indexed weight map; and determine a sum of the first product and an upscaled variant of the second product.

10. The apparatus of claim 1, wherein the first set of values of the weight map includes values greater than a threshold for a first region of the reference frame, wherein the second set of values of the weight map includes values less than a threshold for a second region of the reference frame.

11. The apparatus of claim 1, wherein the optical flow is a two-dimensional optical flow, and the one or more movements are along a plane having two perpendicular dimensions.

12. The apparatus of claim 1, wherein the optical flow identifies a direction of movement and an amplitude of movement for each pixel of the input frame.

13. The apparatus of claim 1, wherein, to generate the optical flow, the one or more processors are configured to use one or more trained neural networks.

14. The apparatus of claim 1, wherein, to generate the weight map, the one or more processors are configured to use one or more trained neural networks.

15. An apparatus for data decoding, the apparatus comprising:

a memory; and one or more processors coupled to the memory, the one or more processors configured to:

receive encoded video data, the encoded video data including a first set of data corresponding to a first region of a reference frame and encoded at a first level of detail based on a first set of values from a weight map and a second set of data corresponding to a second region of the reference frame and encoded at a second level of detail based on a second set of values from the weight map, the second level of detail being different than the first level of detail, wherein the weight map identifies a degree of certainty in an optical flow associated with the encoded video data;

generate, from the encoded video data, a reconstructed optical flow identifying one or more movements in one or more areas of a scene between the reference frame and an input frame, the reference frame and the input frame depicting the scene at different times;

generate, from the encoded video data, a reconstructed weight map;

generate a prediction frame at least in part by warping the reference frame based on the reconstructed optical flow and the reconstructed weight map; and generate, based on the prediction frame, a reconstructed input frame that is based on the input frame.

16. The apparatus of claim 15, wherein the one or more processors are configured to:

generate, from the encoded video data, a reconstructed residual that is based on a residual, wherein, to generate the reconstructed input frame, the one or more processors are configured to generate the reconstructed input frame based on the prediction frame and the reconstructed residual.

17. The apparatus of claim 16, wherein the residual is based on a difference between the input frame and the prediction frame.

18. The apparatus of claim 16, wherein the residual is based on a difference between the input frame and a second prediction frame, wherein the second prediction frame is a variant of the reference frame that is warped based on an optical flow and a weight map, the optical flow and the weight map having been generated based on the reference frame and the input frame.

19. The apparatus of claim 15, wherein, to warp the reference frame based on the reconstructed optical flow and the reconstructed weight map, the one or more processors are configured to:

generate at least a first differentially indexed weight map and a second differentially indexed weight map based on the reconstructed weight map;

generate a first warped frame at least in part by warping the reference frame based on the reconstructed optical flow;

generate a second warped frame at least in part by warping a downscaled variant of the reference frame based on a downscaled variant of the reconstructed optical flow;

determine a first product of the first warped frame and the first differentially indexed weight map;

determine a second product of the second warped frame and the second differentially indexed weight map; and determine a sum of the first product and an upscaled variant of the second product.

20. The apparatus of claim 15, wherein, to warp the reference frame based on the reconstructed optical flow and the reconstructed weight map, the one or more processors are configured to use one or more trained neural networks.

21. The apparatus of claim 15, wherein, to generate the reconstructed optical flow from the encoded video data, the one or more processors are configured to use one or more trained neural networks.

22. The apparatus of claim 15, wherein, to generate the reconstructed weight map from the encoded video data, the one or more processors are configured to use one or more trained neural networks.

23. A method for data decoding, the method comprising:

receiving encoded video data, the encoded video data including a first set of data corresponding to a first region of a reference frame and encoded at a first level of detail based on a first set of values from a weight map and a second set of data corresponding to a second region of the reference frame and encoded at a second level of detail based on a second set of values from the weight map, the second level of detail being different than the first level of detail, wherein the weight map identifies a degree of certainty in an optical flow associated with the encoded video data;

generating, from the encoded video data, a reconstructed optical flow identifying one or more movements in one or more areas of a scene between the reference frame and an input frame, the reference frame and the input frame depicting the scene at different times;

generating, from the encoded video data, a reconstructed weight map;

generating a prediction frame at least in part by warping the reference frame based on the reconstructed optical flow and the reconstructed weight map; and generating, based on the prediction frame, a reconstructed input frame that is based on the input frame.

24. The method of claim 23, further comprising:

generating, from the encoded video data, a reconstructed residual that is based on a residual, wherein generating the reconstructed input frame includes generating the reconstructed input frame based on the prediction frame and the reconstructed residual.

25. The method of claim 24, wherein the residual is based on a difference between the input frame and the prediction frame.

26. The method of claim 24, wherein the residual is based on a difference between the input frame and a second prediction frame, wherein the second prediction frame is a variant of the reference frame that is warped based on an optical flow and a weight map, the optical flow and the weight map having been generated based on the reference frame and the input frame.

27. The method of claim 23, wherein warping the reference frame based on the reconstructed optical flow and the reconstructed weight map includes:

generating at least a first differentially indexed weight map and a second differentially indexed weight map based on the reconstructed weight map;

generating a first warped frame at least in part by warping the reference frame based on the reconstructed optical flow;

generating a second warped frame at least in part by warping a downscaled variant of the reference frame based on a downscaled variant of the reconstructed optical flow;

determining a first product of the first warped frame and the first differentially indexed weight map;

determining a second product of the second warped frame and the second differentially indexed weight map; and determining a sum of the first product and an upscaled variant of the second product.

28. The method of claim 23, wherein warping the reference frame based on the reconstructed optical flow and the reconstructed weight map includes warping the reference frame using one or more trained neural networks based on the reconstructed optical flow and the reconstructed weight map.

29. The method of claim 23, wherein generating the reconstructed optical flow from the encoded video data includes generating the reconstructed optical flow from the encoded video data using one or more trained neural networks.

30. The method of claim 23, wherein generating the reconstructed weight map from the encoded video data includes generating the reconstructed weight map from the encoded video data using one or more trained neural networks.

* * * * *